United States Patent
Kawai

(10) Patent No.: US 10,685,441 B2
(45) Date of Patent: Jun. 16, 2020

(54) SYSTEM FOR PREDICTING OCCURRENCE OF DEFECTIVE IMAGE AND NON-TRANSITORY COMPUTER READABLE MEDIUM

(71) Applicant: KONICA MINOLTA, INC., Chiyoda-ku, Tokyo (JP)

(72) Inventor: Natsuko Kawai, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 130 days.

(21) Appl. No.: 15/908,011

(22) Filed: Feb. 28, 2018

(65) Prior Publication Data
US 2018/0253850 A1    Sep. 6, 2018

(30) Foreign Application Priority Data
Mar. 2, 2017 (JP) ................................. 2017-038930

(51) Int. Cl.
*G06T 7/11* (2017.01)
*G06K 9/48* (2006.01)
(Continued)

(52) U.S. Cl.
CPC ............... *G06T 7/11* (2017.01); *G06K 9/03* (2013.01); *G06K 9/48* (2013.01); *G06K 15/027* (2013.01); *G06T 7/0002* (2013.01); *G06T 7/0004* (2013.01); *G06T 7/168* (2017.01); *G06K 15/00* (2013.01); *G06K 2009/485* (2013.01); *G06T 2207/20021* (2013.01); *G06T 2207/20056* (2013.01); *G06T 2207/20076* (2013.01); *G06T 2207/30144* (2013.01)

(58) Field of Classification Search
None
See application file for complete search history.

(56) References Cited

U.S. PATENT DOCUMENTS 9,076,201 B1 *   7/2015   Negahdar ............. G06T 7/0012
2012/0182566 A1 * 7/2012   Sawano ................... B41J 29/38
                                                              358/1.12

(Continued)

FOREIGN PATENT DOCUMENTS

JP    S63-137251 A    6/1988
JP    H10-56570 A     2/1998
(Continued)

Primary Examiner — Delomia L Gilliard
(74) Attorney, Agent, or Firm — Buchanan Ingersoll & Rooney PC

(57) ABSTRACT

A system for predicting occurrence of a defective image includes an observation distance obtainer which obtains an observation distance of an image to be formed by an image forming apparatus. The system (i) divides image data input to the image forming apparatus as an original of the image into regions of interest having a size determined based on the observation distance, (ii) analyzes a spatial frequency of a gradient distribution of the image with respect to each of the regions of interest, and (iii) calculates a probability of a target density irregularity being conspicuous in the image to be formed by the image forming apparatus based on the image data by using a correlation index between a result of the analysis and an evaluation value of the density irregularity.

48 Claims, 31 Drawing Sheets

(51) Int. Cl.
  *G06K 9/03*   (2006.01)
  *G06T 7/00*   (2017.01)
  *G06T 7/168*  (2017.01)
  *G06K 15/02*  (2006.01)
  *G06K 15/00*  (2006.01)

(56) References Cited

U.S. PATENT DOCUMENTS

| | | | | |
|---|---|---|---|---|
| 2013/0142396 A1* | 6/2013 | Fletcher | ............... | G06T 7/32 |
| | | | | 382/106 |
| 2017/0236036 A1* | 8/2017 | Kawai | ............... | G06K 9/036 |
| | | | | 382/170 |

FOREIGN PATENT DOCUMENTS

| JP | 2012-039424 A | 2/2012 |
|---|---|---|
| JP | 2016-026691 A | 8/2017 |

* cited by examiner

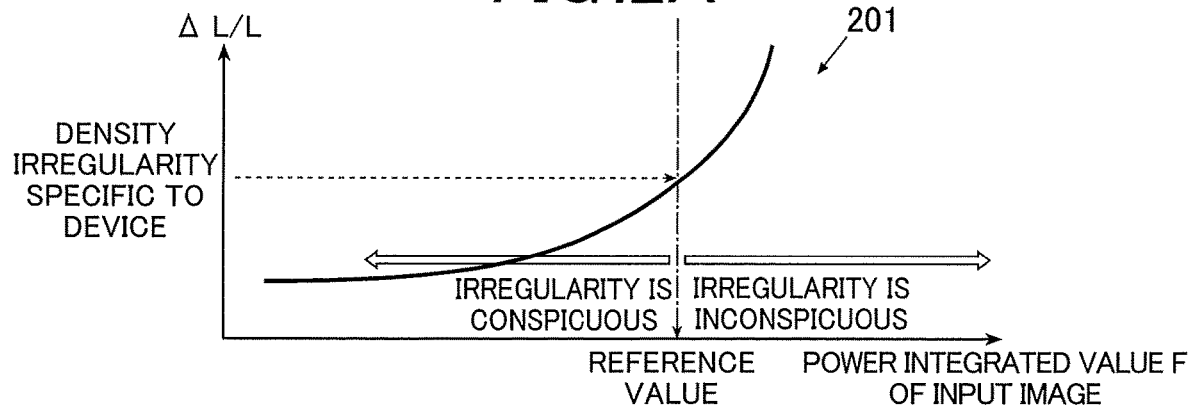
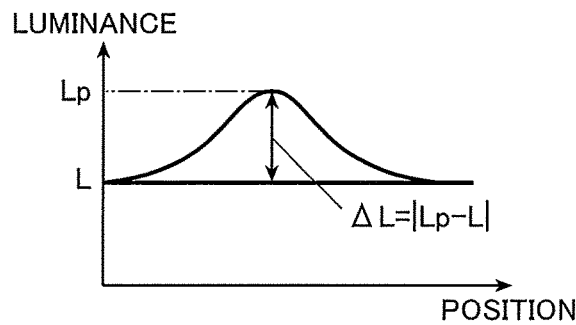
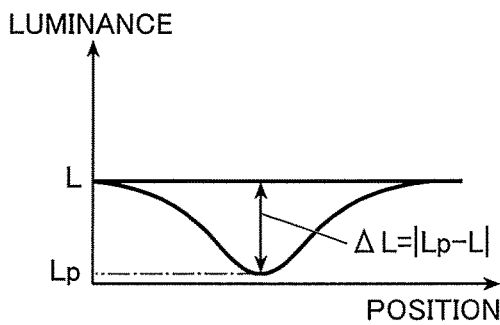
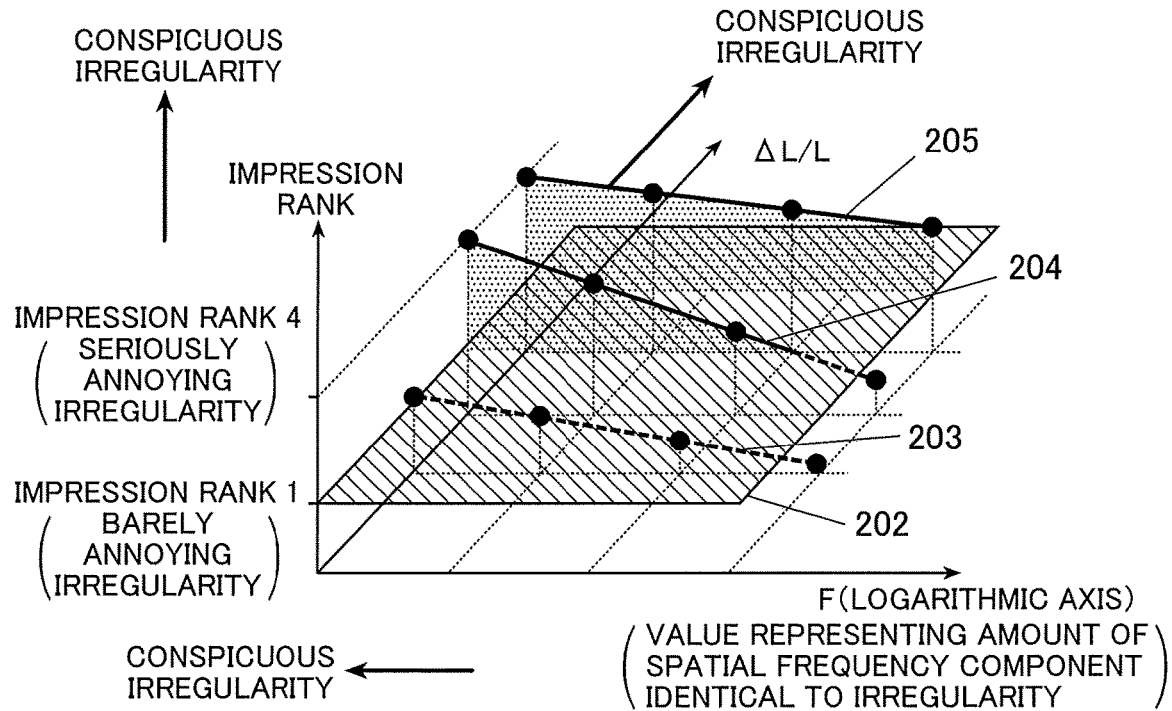

Δf: 0.2 TO 0.25 cycle/mm

FIG.21
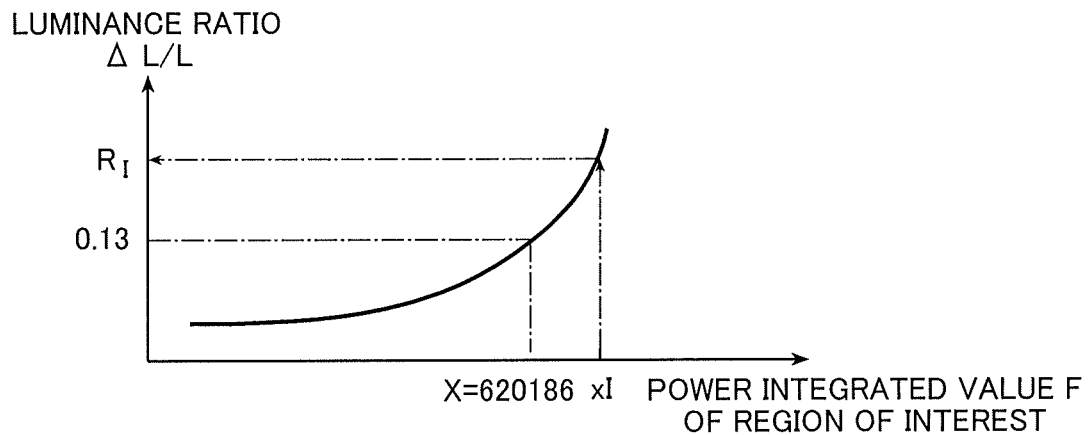
FIG.22A
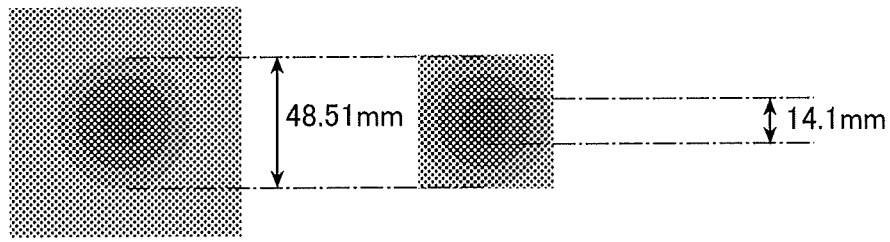
FIG.22B
FIG.22C
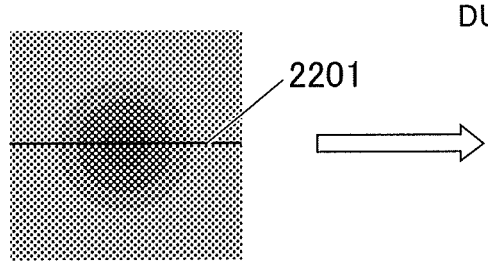
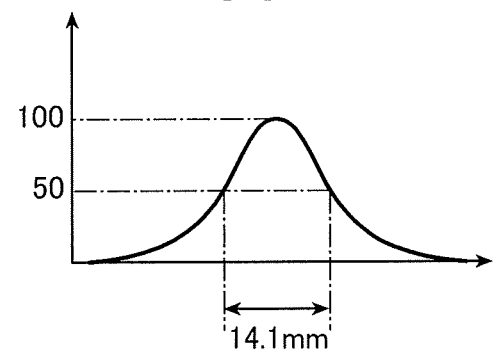

2301

2302

VARIATION OF LIGHTNESS DUE TO IRREGULARITY[%]

(WIDTH OF CENTRAL PART OF IRREGULARITY)

FIG. 32

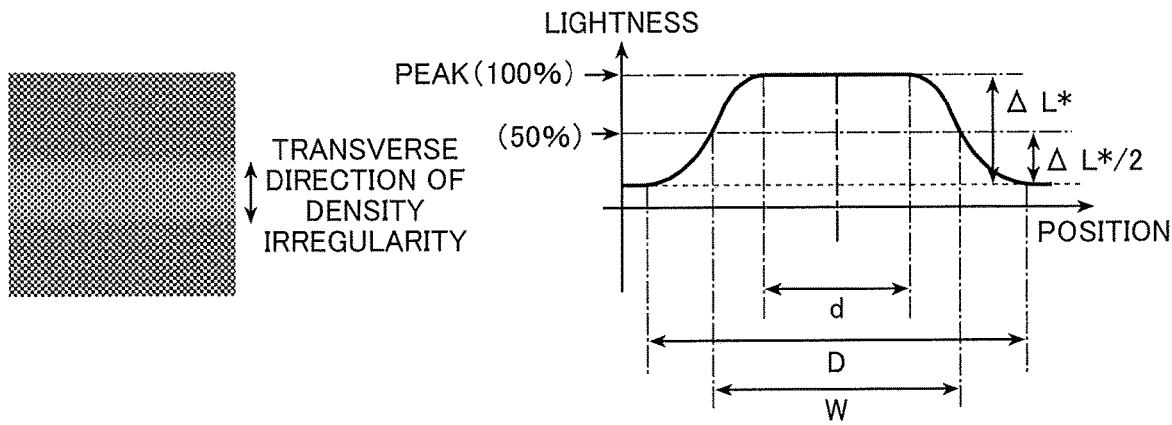

FIG. 33

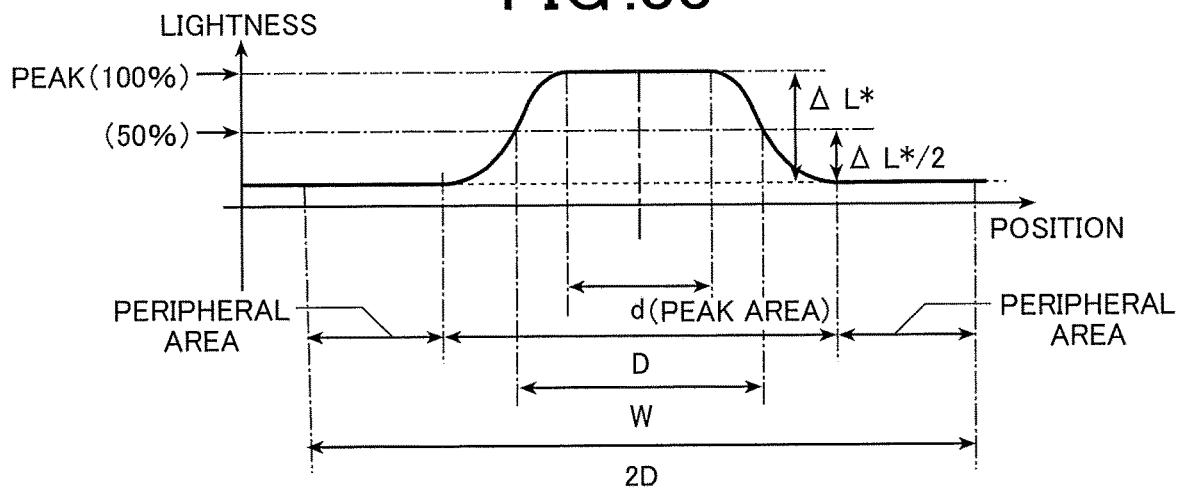

FIG. 34

| LIGHTNESS CHANGING METHOD | WHITE IRREGULARITY | BLACK IRREGULARITY | |
|---|---|---|---|
| LIGHTNESS CONTRAST ΔL*/L* | SMALL (E.G. LESS THAN 0.07) | MEDIUM (E.G. 0.07-0.15) | LARGE (E.G. 0.15 OR MORE) |
| FULL WIDTH OF DENSITY IRREGULARITY WHERE LIGHTNESS IS CHANGED: D | SMALL (E.G. 5.7 MM) | MEDIUM (E.G. 65.2 MM) | LARGE (E.G. 124.7 MM) |
| LIGHTNESS DISTRIBUTION (DISTINCTNESS OF EDGE) WHEN EXPECTED DENSITY IRREGULARITY OCCURS IN IMAGE WITH UNIFORM DENSITY | RECTANGULAR (d/D = 1) | INTERMEDIATE (d/D = 1/2) | GAUSSIAN DISTRIBUTION (d/D < 0.2) |

REGIONS THAT AT LEAST A HALF OF SUBJECTS DETERMINE AS "PARTICULARLY CONSPICUOUS"

REGIONS THAT AT LEAST A HALF OF SUBJECTS DETERMINE AS "PARTICULARLY CONSPICUOUS"

TRANSVERSE DIRECTION OF DENSITY IRREGULARITY

LENGTH OF CYCLE
=44 mm

SYSTEM FOR PREDICTING OCCURRENCE OF DEFECTIVE IMAGE AND NON-TRANSITORY COMPUTER READABLE MEDIUM

BACKGROUND

1. Technological Field

The present invention relates to a system for predicting occurrence of defective images which analyzes image data and predicts occurrence of a density irregularity in images formed by an image forming apparatus based on the image data, and relates to a non-transitory computer readable medium for predicting occurrence of the defective images.

2. Description of the Related Art

When an image is output by an image forming apparatus, there is a possibility that a density irregularity occurs. An example of the specific density irregularity is a "firefly" which occurs circularly and is attributed to carrier particles of toner. Another example is a development-cyclic density irregularity which occurs in a belt-like shape and is attributed to deflection of a developing sleeve in a developing unit.

A level of each density irregularity depends on durability of the device or on environment and is constantly variable. In general, note that the level of each density irregularity varies extremely slowly and is almost uniform during continuous operation of the device.

When an image is printed by the image forming apparatus in which such a density irregularity occurs, the irregularity may be conspicuous or inconspicuous depending on a feature of an input image.

In a case where an image having a conspicuous density irregularity is printed, the image should be inspected and excluded by a detection device or operator as a defective image.

The inventions disclosed in JP H10-56570A and JP S63-137251A analyze image data in advance and then correct conditions of image forming processing.

The invention disclosed in JP 2012-39424A reads out images from printouts and then carries out inspection processing. Herein, a speed of transmitting the printouts during readout is changed in accordance with inspection items.

The inventions disclosed in JP H10-56570A and JP S63-137251A satisfactorily adjust a gradient characteristic in accordance with image data so as to diminish defects in the gradient. However, those inventions do not include a unit for determining whether a density irregularity in images formed by an image forming apparatus is conspicuous to human eyes. Even though an image is printed with satisfactory gradient expression, there is a possibility that a density irregularity is conspicuous. Particularly because the image is printed with the satisfactory gradient expression, there is a possibility that the satisfactory gradient expression makes a density irregularity conspicuous. Therefore, a problem of the density irregularity in images formed by the image forming apparatus may not be solved by the inventions disclosed in JP H10-56570A and JP S63-137251A.

In a case where the density irregularity is manually inspected, it is difficult to print and inspect simultaneously. Therefore, one hundred percent inspection is often carried out, which requires numerous man-hours. Accordingly, there is a demand on reducing printed materials to be inspected to a minimum.

A device for detecting printed materials disclosed in JP 2012-39424A does not include a unit for predicting occurrence of defective images based on original-image data of the printed materials. Therefore, such a device has no information for predicting on which printed material based on which original-image data the defective images easily occur. Accordingly, there is no choice but to carry out one hundred percent inspection.

The device for detecting the printed materials disclosed in JP 2012-39424A should properly set a threshold of the density irregularity for determining whether each image is the defective image. Otherwise, images having an inconspicuous density irregularity are determined as defective images, which leads to discarding the printed materials wastefully, or conversely, images having a conspicuous density irregularity are determined as non-defective images, which leads to shipping defective materials. Accordingly, there is a problem in accuracy of differentiating the non-defective materials from defective materials.

SUMMARY

The present invention has been made in light of the abovementioned problems in the related art. An object of the present invention is to predict, based on image data, conspicuity of a density irregularity which possibly occurs on images formed by an image forming apparatus based on the image data.

To achieve at least one of the abovementioned objects, according to an aspect of the present invention, a system for predicting occurrence of a defective image includes an observation distance obtainer which obtains an observation distance of an image to be formed by an image forming apparatus, wherein the system (i) divides image data input to the image forming apparatus as an original of the image into regions of interest having a size determined based on the observation distance, (ii) analyzes a spatial frequency of a gradient distribution of the image with respect to each of the regions of interest, and (iii) calculates a probability of a target density irregularity being conspicuous in the image to be formed by the image forming apparatus based on the image data by using a correlation index between a result of the analysis and an evaluation value of the density irregularity.

The "gradient distribution" to be analyzed may be that of lightness, luminance or the like.

According to another aspect of the present invention, a non-transitory computer readable medium stores a program for predicting occurrence of a defective image, the program causing a computer to perform:

obtaining an observation distance of an image to be formed by an image forming apparatus;

dividing image data input to the image forming apparatus as an original of the image into regions of interest having a size determined based on the observation distance;

analyzing a spatial frequency of a gradient distribution of the image with respect to each of the regions of interest; and calculating a probability of a target density irregularity being conspicuous in the image to be formed by the image forming apparatus based on the image data by using a correlation index between a result of the analysis and an evaluation value of the density irregularity.

The "gradient distribution" to be analyzed may be that of lightness, luminance or the like.

According to the present invention, the system for predicting occurrence of a defective image includes: an observation distance obtainer which obtains an observation distance of an image to be formed by an image forming apparatus, wherein the system divides image data input to the image forming apparatus as an original of the image into regions of interest each having a size determined based on the observation distance, analyzes a spatial frequency of a gradient distribution of the image with respect to each of the regions of interest, and calculates a probability of a target density irregularity being conspicuous in the image to be formed by the image forming apparatus based on the image data by using a correlation index between a result of the analysis and an evaluation value of the density irregularity. This enables user to reduce the number of test printing or inspection steps for detecting density irregularity by referring to the probability.

It is possible to instruct correction of conditions of image forming processing based on the "probability of the conspicuous density irregularity" calculated per image data to be input. Therefore, there is an effect that the images can be corrected properly in the image forming apparatus in accordance with a feature of each image. As a result, it is possible to diminish both excessive correction and insufficient correction which may occur in a case of setting a uniform correction amount.

It is possible to output information of setting a threshold for detecting the density irregularity based on the "probability of the conspicuous density irregularity" calculated per image data to be input. Therefore, there is an effect that the detection threshold is set properly in a density-irregularity detection system in accordance with the feature of each image. As a result, it is possible to diminish disposal of non-defective materials and failure to detect defective materials which may occur in a case of setting a uniform detection threshold.

The spatial frequency of the gradient distribution is analyzed with respect to each of the regions of interest each having a size determined based on the observation distance of the image to be formed by the image forming apparatus. Since the analyzing area is divided into small sections with a uniform size (corresponding to the view angle (2 degrees) when human gazes an object), the system can predict whether or not the irregularity is conspicuous respectively in individual sections.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 2A is a graph illustrating correlation between an analysis result (power integrated value of the original-image data) and an evaluation value of a density irregularity (luminance ratio) in order to explain an embodiment of the invention that is selectively incorporated in the present invention;

FIGS. 2B and 2C are graphs illustrating gradient distribution of density-irregularity models used in a psychophysical experiment to make a table for the correlation;

FIG. 2D is a graph illustrating the correlation between the analysis result (power integrated value of the original-image data) and the evaluation value of the density irregularity (impression rank) per value obtained by converting a density difference between a central and vicinal portion of each density-irregularity portion into the luminance ratio;

FIG. 21 is a graph illustrating correlation between an analysis result (power integrated value of original-image data) and an evaluation value of a density irregularity (luminance ratio) in Example 4 of the invention that is selectively incorporated in the present invention;

FIG. 22A is a schematic view of a circular irregularity used for making the correlation table (formula) of the impression rank and value F applicable to the invention that is selectively incorporated in the present invention;

FIG. 22B is a view illustrating a reference line of a lightness profile;

FIG. 22C is a view illustrating the lightness profile;

FIG. 24B illustrates calculation of an integrated value F;

FIG. 32 illustrates indexes (d/D, w) indicating the distinctness and the width of a density irregularity used in an experiment according to Example B of the present invention;

FIG. 33 illustrates the conditions of measuring the lightness contrast of the density irregularity used in the experiment according to Example B of the present invention;

FIG. 34 illustrates the characteristics of a target density irregularity according to Example B of the present invention;

DETAILED DESCRIPTION OF EMBODIMENTS

Figure 1A:
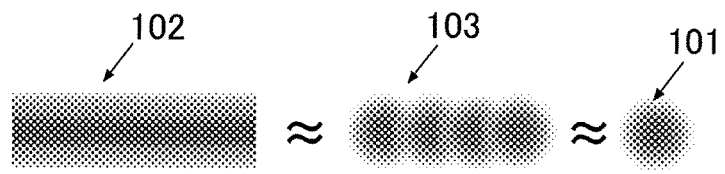
FIG. 1A is a schematic view illustrating a concept of substituting circular gradient distribution for a belt-like irregularity to explain an embodiment of the invention that is selectively incorporated in the present invention.

Hereinafter, one or more embodiments of the present invention will be described with reference to the drawings. However, the scope of the invention is not limited to the disclosed embodiments.

Table of Contents (A) The invention disclosed in Japanese Patent Application No. 2016-026691 (JP 2017-146388 A), which has a feature of analyzing the spatial frequency of the gradient distribution of an image according to the size of a density irregularity specific to individual image forming apparatuses. The invention is herein described since it is selectively incorporated in the present invention.
(B) The main invention of the present application, which has a feature of analyzing the spatial frequency of the gradient distribution of an image with respect to each of regions of interest having a size determined based on an observation distance of the image to be formed by the image forming apparatus.
Contents
(A)
Summary of System A system for predicting occurrence of defective images analyzes a spatial frequency of gradient distribution of each image in accordance with a size of a density irregularity specific to an image forming apparatus with respect to image data input to the image forming apparatus as an original. The system then calculates a probability of a density irregularity being conspicuous of the size in regard to each image formed by the image forming apparatus based on the image data. Such calculation is carried out with reference to an index of correlation between an analysis result and an evaluation value of the density irregularity. Herein, the index of correlation may be represented by any form such as a data table and correlation formula.

The image forming apparatus includes an original input device (a device for inputting image data and a unit for reading out a paper original) and an image forming unit. The image forming unit develops with toner an electrostatic latent image formed on a photoreceptor based on the image data so as to form a toner image. The image forming unit then transcripts the formed toner image to a sheet and heats the transcribed toner image so as to fix the toner image and to form an image on the sheet.

A computer program for achieving performance of the system is installed in a computer included in the image forming apparatus or in an external computer. Such a computer program is included in the present system. In order to achieve the performance of the present system by the external computer, note that the system analyzes the image data before input of the image data to the image forming apparatus as an original, or during input of the same, or after input of the same and before formation of an image. The system then calculates a probability when the original is input to the image forming apparatus and the image is formed.

Furthermore, a density-irregularity detector included in a density-irregularity detection system is attached to the image forming apparatus so as to link the system with the density-irregularity detection system. The density-irregularity detector includes a readout unit for reading out the image formed by the image forming apparatus.

In order to analyze the spatial frequency of the gradient distribution of each image in accordance with the size of the density irregularity specific to the abovementioned image forming apparatus,
(1) first, the density irregularity is replaced by circular gradient distribution 101 according to two-dimensional Gaussian distribution and having a diameter equal to one cycle of the density irregularity.

With regard to a density irregularity occurring circularly, a diameter thereof is equal to one cycle so that it is replaced by the circular gradient distribution 101 according to the two-dimensional Gaussian distribution and having the diameter equal to the diameter of the density irregularity.

As illustrated in FIG. 1A, a belt-like irregularity 102 approximates a consecutive irregularity 103 in which circular irregularities are overlapping. Furthermore, the irregularity 102 partially approximates one circular irregularity. Therefore, the belt-like irregularity 102 is also replaced by the circular gradient distribution 101 according to the two-dimensional Gaussian distribution and having the diameter equal to one cycle of the density irregularity. Due to such replacement, even though the belt-like irregularity such as a development-cyclic density irregularity occurs, it is possible to calculate that in which part of an image the irregularity becomes conspicuous.

Figure 1B:
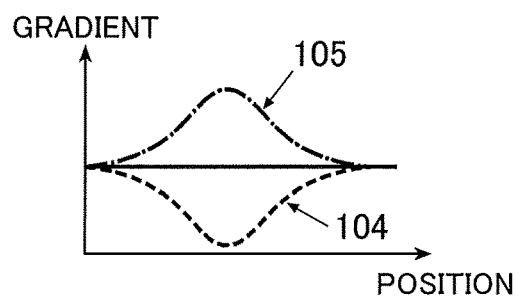
FIG. 1B is a graph illustrating the circular gradient distribution.

The replacing circular gradient distribution 101 may be shaped as a graph 104 protruding downward or as a graph 105 protruding upward in a graph illustrated in FIG. 1B, where a position is taken along the abscissa and a gradient is taken along the ordinate.
(2) Image data which the Gaussian distribution of (1) is drawn on is subject to Fourier transform so as to obtain a power spectrum of a spatial frequency of the circular gradient distribution 101.

Figure 1C:
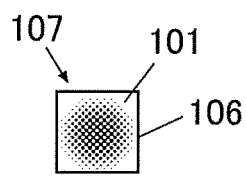
FIG. 1C is a view illustrating a square image surrounding the circular gradient distribution.
Figure 1D:
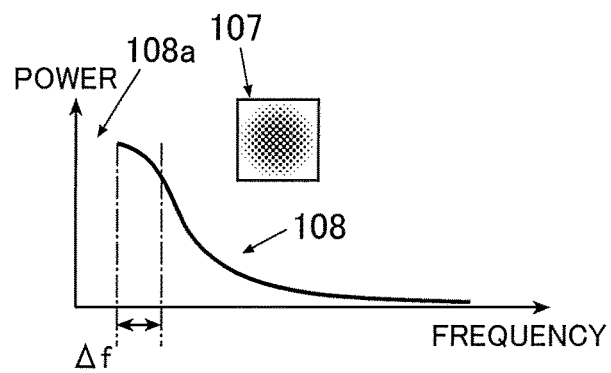
FIG. 1D is a graph illustrating the square image and a power spectrum of the same.

Herein, an image 107 is subject to the Fourier transform. As illustrated in FIG. 1C, the image 107 includes a region, that is, a square 106 having a side equal to one cycle of the density irregularity to be determined. A peak of the Gaussian distribution is drawn on a middle of the image 107.
(3) Within the power spectrum described in (2), a frequency band ranging from where power is at a peak to where the power is at a predetermined value is extracted except for a DC component. (Alternatively, the frequency at the peak is extracted). As illustrated in FIG. 1D, a power spectrum 108 of the image 107 can be obtained. Accordingly, for example, a frequency band Δf ranging from where the power is at the peak to where the power is at the predetermined value is extracted except for a frequency band 108a. The frequency band 108a herein is largely affected by the DC component having a frequency close to zero. (Alternatively, the frequency at the peak is extracted). Alternatively, the frequency band 108a in which the frequency is close to zero may be included in a case where the DC component is excluded from the power spectrum 108.

Figure 1E:
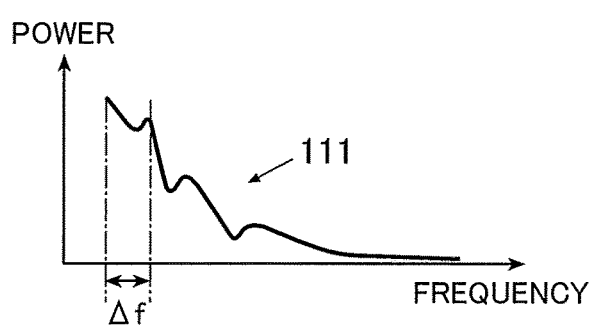
FIG. 1E is a graph illustrating an exemplary power spectrum of a region of interest of original-image data.
Figure 1F:
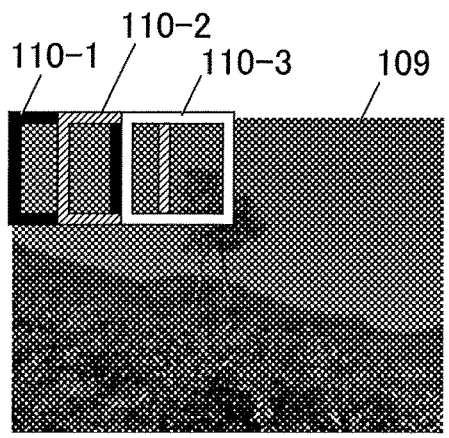
FIG. 1F is a view illustrating that the original-image data is divided into regions of interest.

(4) The image data input from the original input device (an image of such image data is, for example, an image 109 illustrated in FIG. 1F) is divided into sizes in which the Gaussian distribution of (1) can be fit (each size corresponding to the square 106) as illustrated in FIG. 1F. The divided image data are referred to as regions of interest 110 (110-1, 110-2, 110-3, ... ). With respect to the whole divided regions of interest, each power spectrum of the spatial frequency of the gradient distribution is calculated by the Fourier transform (for example, each power spectrum is calculated as similar to a power spectrum 111 illustrated in FIG. 1E) so as to obtain a value F obtained by integrating the power by the frequency band Δf extracted in (3). (Alternatively, a value F of the power at a time when the frequency is extracted in (3) is obtained).

(5) In a case where the value F of each region of interest described in (4) is larger than a predetermined reference value, the density irregularity is determined to be inconspicuous.

(5.1) The reference value corresponds to the density irregularity specific to the image forming apparatus and is measured in advance. The reference value is obtained from a correlation table 201 as illustrated in FIG. 2A obtained by a psychophysical experiment.

In the correlation table 201, a luminance ratio ΔL/L representing visibility of the density irregularity is taken along the ordinate, while a power integrated value F of each region of interest is taken along the abscissa as illustrated in FIG. 2A.

Herein, with respect to the density irregularity occurring in a background image having predetermined gradient distribution, ΔL is a value obtained by converting, into a difference of luminance, a difference between a peak gradient and a background gradient of the density irregularity having the minimum intensity visible to subjects in the psychophysical experiment carried out in advance. L is a value obtained by converting the background gradient into luminance (FIGS. 2B, 2C).

In the experiment for making the correlation table 201, luminance distribution of the density irregularity in a graph in which the position is taken along the abscissa and the luminance is taken along the ordinate may be projected upward as illustrated in FIG. 2B or projected downward as illustrated in FIG. 2C.

The luminance ratio ΔL/L which is to be a border between whether the density irregularity is conspicuous or inconspicuous, or a color difference is set in advance to a randomly selected value. Based on the correlation table 201, a power integrated value F corresponding to the luminance ration or color difference (reference value) is set to be a reference value for determining the density irregularity based on the correlation table 201.

(5.2) In stabilizing and adjusting the image forming apparatus, a density difference of an actually-occurring density irregularity is measured and the density difference is converted into a luminance ratio corresponding to the correlation table 201. The converting luminance ratio is referred as a value corresponding to the density irregularity specific to the image forming apparatus and a reference value of this value is obtained and is hereinafter used.

(5.3) The luminance ratios ΔL/L in (5.1) and (5.2) may be replaced by a color difference ΔE*ab or ΔE00.

(5.4) Furthermore, each of the luminance ratios ΔL/L in (5.1) and (5.2) may be a subjective evaluation value obtained by obtaining conspicuity of the density irregularity by a magnitude evaluation method. The reason is to improve accuracy of a correlation formula for determining the conspicuity of the density irregularity. Herein, a formula representing correlation between the subjective evaluation value and power integrated value F is preferably a logarithm approximate formula so as to obtain satisfactory accuracy.

Herein, the subjective evaluation value obtained by obtaining the conspicuity of the density irregularity by the magnitude evaluation method is a value rated in accordance with the following criteria as the subjects observing the density irregularity. Such a value is referred to as an "impression rank" in this description.

The criteria are "0/cannot be recognized as an irregularity", "1/can be recognized as an irregularity but not annoying", "2/slightly annoying", "3/annoying", "4/seriously annoying", represented by "impression rank/determination criterion". The impression rank maybe rated per 0.1.

(5.5) In a case of using the impression rank, the correlation formula between the power integrated value F and conspicuity of the density irregularity may be changed depending on a density difference of the density irregularity to be determined.

In other words, L represents a value in which density to be measured is converted into the luminance, and ΔL/L represents a value obtained by converting a density difference between a central and vicinal portion of a density-irregularity portion into a luminance ratio. Therefore, by using the "impression rank", it is possible to make correlation as illustrated in FIG. 2D.

The integrated value F represents an amount of a spatial frequency component equal to that of the irregularity. The smaller the integrated value F, the more the density irregularity becomes conspicuous as illustrated in FIG. 2D. On the other hand, ΔL/L is the value obtained by converting the density difference between the central and vicinal portion of the density-irregularity portion to be determined into the luminance ratio. When the value ΔL/L is small, the density irregularity is rated as equal to or less than the impression rank "1", and when the value ΔL/L is large, the density irregularity is rated as exceeding the impression rank "1" (higher than a plane 202 in the graph illustrated in FIG. 2D). In such manners, by changing correlation formulae (203, 204, 205 ... ) to be applied depending on the value ΔL/L of the density irregularity, it is possible to improve accuracy of predicting the conspicuity of the density irregularity.

(6) Combining the determination of (5) in regard to each region of interest, the probability of the conspicuous density irregularity is calculated with respect to each image formed by the image forming apparatus based on the image data.

(6.1) An example of the probability of the conspicuous density irregularity in each image formed by the image forming apparatus based on the image data is represented by P which is obtained by n/N, where N is a total number of the regions of interest, and n is the number of regions of interest whose density irregularity is determined to be conspicuous.

(6.2) Another example of the probability of the conspicuous density irregularity in each image formed by the image forming apparatus based on the image data is represented by a mean value of pi of a total number N, according to the Formula (1), where N is the total number of the regions of interest, and pi is an expected probability of the conspicuous irregularity to be determined which is set to be equal to zero when X−xi≤0 and set to be equal to (X−xi)/X when X−xi>0, where X is the reference value, and xi is a power integrated value F of an i-th region of interest.

$$\sum_{i=1}^{N}(pi)/N=P \quad \text{Formula (1)}$$

(7.1) When the probability of the conspicuous density irregularity calculated in such manners is determined to be equal to or higher than a predetermined value, a message recommending an inspection is displayed to a user. A position where the message is displayed is, for example, an operating panel of the image forming apparatus, and a timing when the message is displayed is when forming an image of image data whose probability of the conspicuous density irregularity is determined to be equal to or higher than the predetermined value.

(7.2) Furthermore, when the probability of the conspicuous density irregularity calculated in such manners is determined to be equal to or higher than the predetermined value, the image forming unit in the image forming apparatus is instructed to correct conditions of image forming processing in order to diminish the density irregularity.

(7.2.1) In such a case, a correction amount of the conditions of the image forming processing instructed to the image forming unit is set to be a value closest to M×P among settable values, where P is the probability of the conspicuous density irregularity, and M is a maximum correction amount.

(7.3) In a case where a plurality of density irregularities, having different sizes, such as the abovementioned "firefly" and development-cyclic density irregularity is the density irregularity specific to the image forming apparatus, a spatial frequency of gradient distribution of each image is analyzed in accordance with the size of each density irregularity with respect to the plurality of density irregularities having the different sizes so as to calculate each probability of the conspicuous density irregularity.

(7.3.1) In instructing the image forming unit in the image forming apparatus to correct the conditions of the image forming processing in order to diminish the density irregularity based on each probability of the conspicuous density irregularity, priority is given to a density irregularity having a higher probability of the conspicuous density irregularity among the plurality of density irregularities, and correction of the conditions of the image forming processing is instructed. For example, instructed are conditions of the image forming processing advantageous to diminish the density irregularity having the higher probability of the conspicuous density irregularity between the "firefly" and development-cyclic density irregularity.

(7.4) Information of setting a threshold for inspecting the density irregularity is output in accordance with the probability of the conspicuous density irregularity with respect to the density-irregularity detection system for detecting the density irregularity in each image formed by the image forming apparatus.

(7.4.1) The luminance ratio $\Delta L/L$ corresponding to the integrated value F is calculated per divided region of interest 110 (110-1, 110-2, 110-3, . . . ). In regard to each image formed by the image forming apparatus, feedback of the luminance ratio is given to the density-irregularity detection system which detects the density irregularity. The density-irregularity detection system sets the threshold for inspecting the density irregularity based on the luminance ratio $\Delta L/L$.

(7.4.2) The luminance ratio $\Delta L/L$ corresponding to the integrated value F is calculated per divided region of interest 110 (110-1, 110-2, 110-3, . . . ) and statistics such as a minimum value, mean value, and maximum value of the density difference corresponding to the luminance ratio $\Delta L/L$ is imparted to the density-irregularity detection system for detecting the density irregularity relating to each image formed by the image forming apparatus as the inspection threshold of the density irregularity. The density-irregularity detection system sets the statistic as the threshold for inspecting the density irregularity.

EXAMPLES, COMPARATIVE EXAMPLES (8) Hereinafter, the present system will be described by referring to the following Examples and comparing with the following Comparative Examples.

8.1

The following is a common condition shared by the whole Examples and Comparative Examples.

Conditions described in Examples and Comparative Examples will be applied to an electrophotographic and two-component-development type image forming apparatus.

8.2

A method for making the correlation table between the luminance ratio $\Delta L/L$ and power integrated value F will be described.

The following experiment and analysis will be carried out in order to obtain the correlation formula between the density irregularity and the feature of the input image (spatial frequency component of gradient distribution) and to make the correlation table between $\Delta L/L$ and F.

(8.2.1) Summary

An experiment is carried out in such a way that subjects are presented with images including a luminance irregularity, assumed to be the density irregularity, output by the image forming apparatus. The subjects are then asked to report whether the luminance irregularity is visible.

Based on the experiment, $\Delta L/L$ is recorded and F is calculated based on analysis of the presentation images so as to obtain the correlation view between $\Delta L/L$ and F.

(8.2.2) Experimental Conditions

Subject: nine persons (all were free from any visual impairments) (any number of subjects may be applicable)

Circumstance: darkroom

Method for presenting the images: a method of ascending limits (one of the fundamental methods of psychophysical experiments in order to obtain the smallest detectable intensity of a target stimulus by gradually increasing the intensity of the stimulus observed by a subject, in short, to obtain a threshold)

Conditions of the presentation images: a distance between each image and each subject was set to be 50 cm. The head of each subject was not fixed. A time for presenting each image was set to be four seconds. A background of each image was a grayscale natural-scene image. Two images which were 170 long×236 wide (mm$^2$) (visual field at 19° high×27° wide) were arranged in front of each subject within a visual field at approximately 500 (478 mm wide). The density irregularity (target stimulus) herein was a circular Gaussian stimulus. A visual angle of a diameter was set to be approximately 1° and a central color was black (darker than an original image). There were 192 ways prepared for the presentation images. A presentation media applied herein was a display (Maker/model specification: EIZO/ColorEdgeCG221, maximum luminance: 80 cd/m2).

(8.2.3) Experimental Procedures

Figure 3:
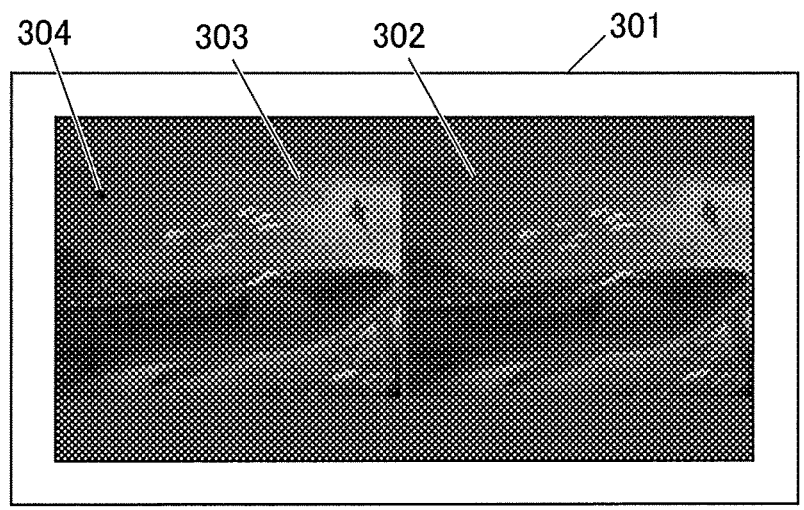
FIG. 3 is a view illustrating exemplary presentation images used in the psychophysical experiment.

As illustrated in FIG. 3, the presentation images applied herein were natural-scene images and two identical images were presented in a row. The images were displayed on a display 301.

One of the images was an original image 303 having no luminance irregularity (an input image formed by the image forming apparatus), and the other was an image 302 having a circular luminance irregularity 304 intentionally drawn on an image identical to the original image. The luminance irregularity 304 was drawn in accordance with the Gaussian distribution.

Arrangement of the image 302 having the irregularity and the original image 303 having no irregularity was randomly determined every time those images were changed.

Each subject was asked to compare the images 302 and 303 in right and left for four seconds. Once he/she found the luminance irregularity, the experiment was completed.

In a case where he/she could not find the luminance irregularity, the images were automatically changed to images including a luminance irregularity having stronger intensity. The subject then looked for the luminance irregularity again.

Figure 4:
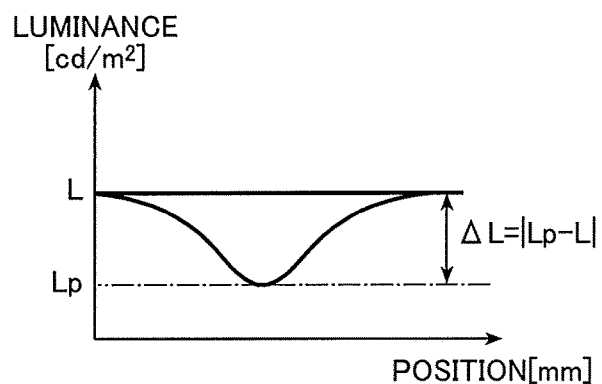
FIG. 4 is a graph illustrating gradient distribution of a density-irregularity model in the psychophysical experiment using the presentation images illustrated in FIG. 3.

The intensity of the luminance irregularity was gradually increased from a state in which contrast between the luminance irregularity and the background is small. Luminance contrast at a time when each subject visually confirmed the luminance irregularity for the first time was recorded as $\Delta L/L$. $\Delta L/L$ herein is a value corresponding to visibility of the irregularity. The larger value indicates that the irregularity is less conspicuous. Herein, as illustrated in FIG. 4, L represents mean luminance of the background image, while $\Delta L$ represents a difference between the mean luminance L and a peak of luminance distribution of the density irregularity having the lowest intensity visible to each subject.

Figure 5:
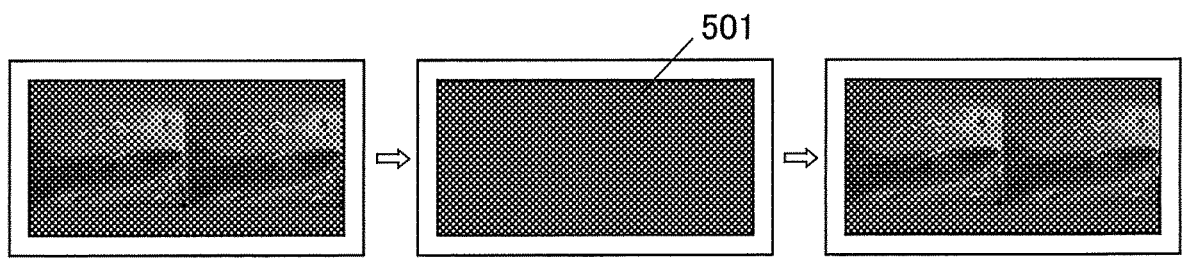
FIG. 5 is a schematic view illustrating a change of the presentation images in the psychophysical experiment using the presentation images illustrated in FIG. 3.

As illustrated in FIG. 5, when changing the presentation images to the images having stronger intensity, a uniform gray image 501 was presented for one second as an interval. The reason for presenting the interval is that a human visual system is sensitive to time variation of stimulus light. Therefore, in a case where the intensity of the irregularity is changed without any interval, the conspicuity of the irregularity in a static image cannot be measured accurately.

(8.2.4) Analytic Procedures

Figure 6:
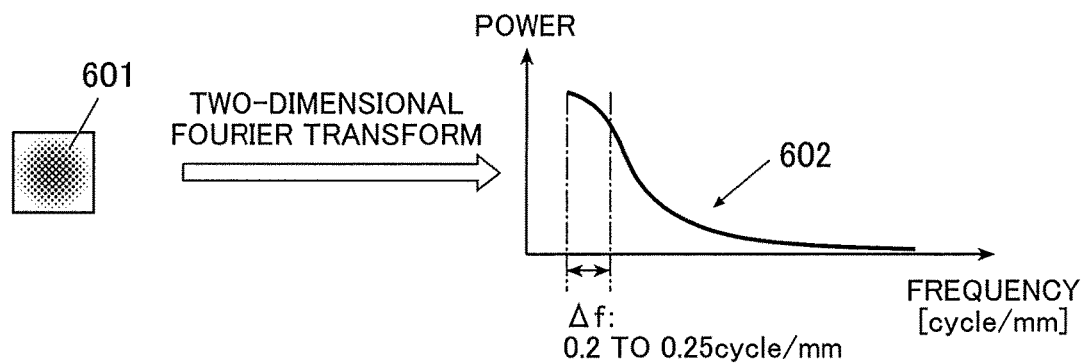
FIG. 6 is a view illustrating an image of a luminance irregularity drawn on one presentation image presented in the psychophysical experiment using the presentation images illustrated in FIG. 3 and illustrating a power spectrum of the luminance irregularity.

As illustrated in FIG. 6, the luminance irregularity drawn on one experimental presentation image was drawn on an image with uniform gradient (a white background with an 8-bit grayscale and gradient 255) and the image was cut into a square having a side equivalent to a diameter of the irregularity. The two-dimensional Fourier transform was carried out on a cutoff image 601. Then, a power spectrum 602 of a spatial frequency of gradient distribution of the image 601 was calculated.

Within the obtained power spectrum 602, a frequency band representing a feature of the irregularity was selected except for a frequency band largely affected by the DC component. Specifically, extracted was a frequency band $\Delta f$ ranging from 0.25 [cycle/mm] frequency to 0.2 [cycle/mm] frequency. The 0.25 [cycle/mm] frequency was where power became 80% of the power at 0.2 [cycle/mm] frequency.

Figure 7:
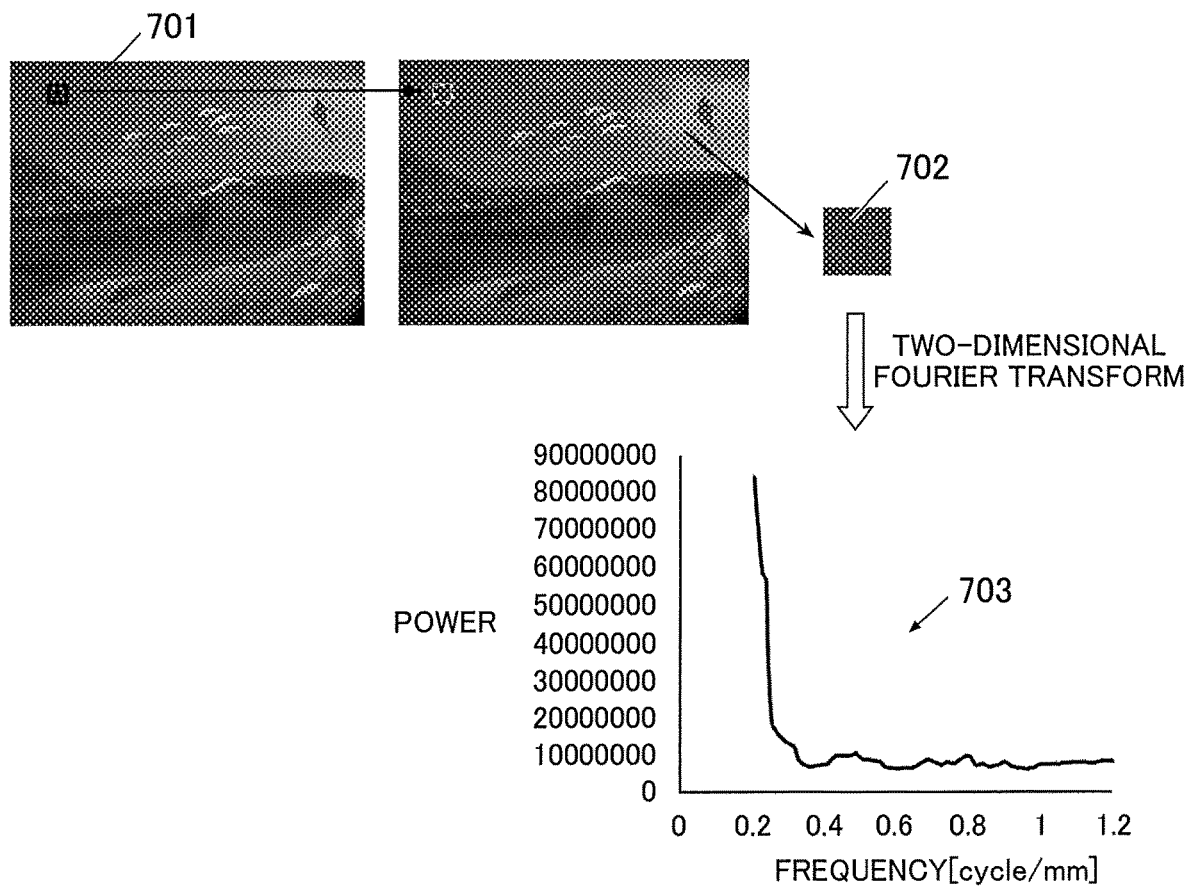
FIG. 7 is a schematic view for explaining procedures of calculating a power spectrum of a region including the image of the luminance irregularity of the presentation image presented in the psychophysical experiment using the presentation images illustrated in FIG. 3 (excluding the image of the luminance irregularity)

On the other hand, as illustrated in FIG. 7, in each image (for example, an image 701) presented in the experiment, background image (original image) data having no irregularity was cut off to a size identical to the size during the aforementioned analysis. The image data was cut off at a position where the luminance irregularity was drawn. A cutoff image 702 was subject to the two-dimensional Fourier transform so as to obtain a power spectrum 703 of a spatial frequency of gradient distribution of the image 702.

Figure 8A:
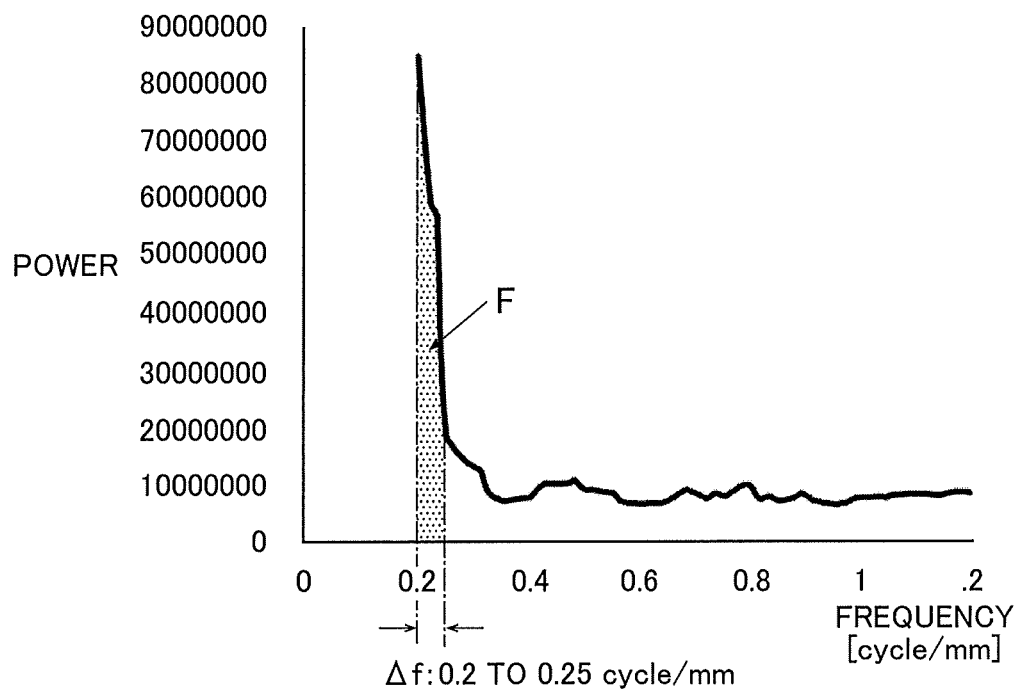
FIG. 8A is a view illustrating an example of calculating an integrated value from the power spectrum illustrated in FIG. 7.

Based on the power spectrum 703 obtained herein, a value F obtained by integrating the power by the frequency band $\Delta f$ was calculated as illustrated in FIG. 8A.

Note that the larger value F indicates that the image includes the spatial frequency component identical to the irregularity.

Figure 8B:
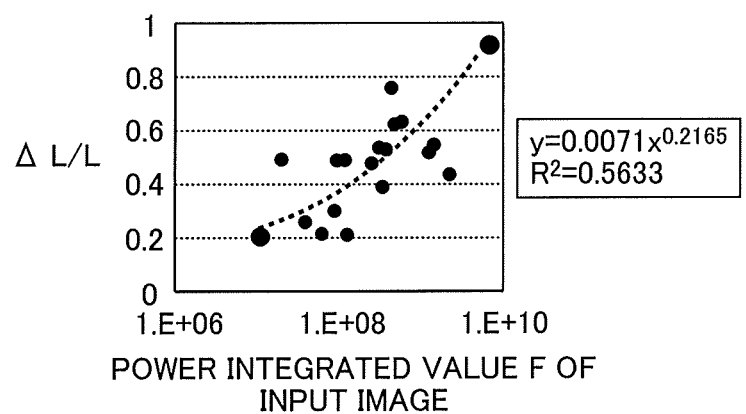
FIG. 8B is a correlation view of the luminance ratio and integrated value.

In such manners, the integrated value F per presentation image used for the experiment was calculated. By using the value of an experimental result $\Delta L/L$ obtained from each image, the correlation view between the luminance ratio $\Delta L/L$ and integrated value F was drawn as illustrated in FIG. 8B. The results plotted to the correlation view was approximated so as to obtain a correlation formula R(F). In the present Example, R(F) was equal to $\Delta L/L=0.0071\ F^{0.2165}$.

This correlation formula R (F) was referred to as an original correlation table between the luminance ratio $\Delta L/L$ and integrated value F. A specific numerical value of the correlation table was set by adjusting the original correlation formula to a specification of the image forming apparatus provided with the system for predicting occurrence of the defective images according to an embodiment of the present invention.

Figure 9A:
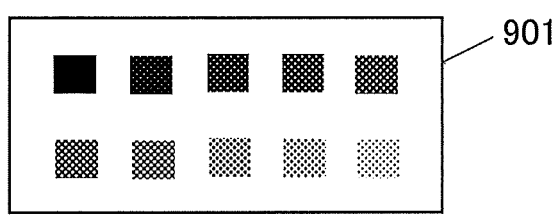
FIG. 9A is a schematic view of an image sample used in a method for converting the density difference into the luminance ratio.

(8.3) Method for Converting Density Difference into Luminance Ratio $\Delta L/L$ Before providing the image forming apparatus with the system for predicting occurrence of the defective images according to an embodiment of the present invention, an image sample 901 in which a plurality of patches having different gradients was drawn on a white background and was output on a sheet as illustrated in FIG. 9A. By using the image sample 901, density of the white background and of each patch portion and luminance of reflected light at positions identical to the white background and each patch portion were measured. Based on the correlation formula obtained from measurement results, the density and luminance were mutually converted.

Figure 9B:
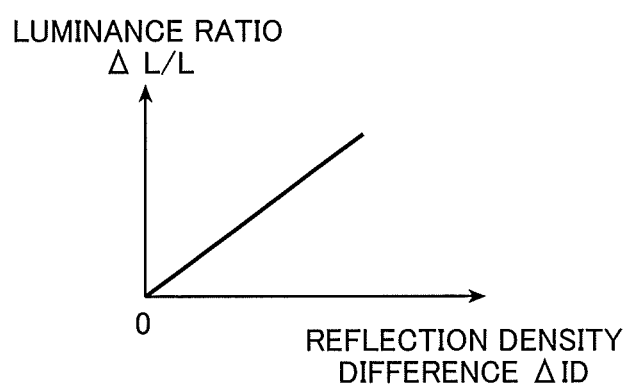
FIG. 9B is a graph illustrating a correlation between the density difference and luminance ratio.

In the present Example, by using FD-7 (made by Konica Minolta, Inc.) as a densitometer and CS-100 (made by Konica Minolta, Inc.) as a luminance measurement device, obtained was a correlation between a density difference $\Delta ID$ of the white background and each patch portion, and the luminance ratio $\Delta L/L$ as illustrated in FIG. 9B. The gradient of each patch was made into five steps from 100 to 10% per 10% based on $\Delta L=|Lp-L|$, L representing the luminance of the reflected light of the white background, and Lp representing the luminance of each patch portion.

(8.3) Example 1

Figure 10:
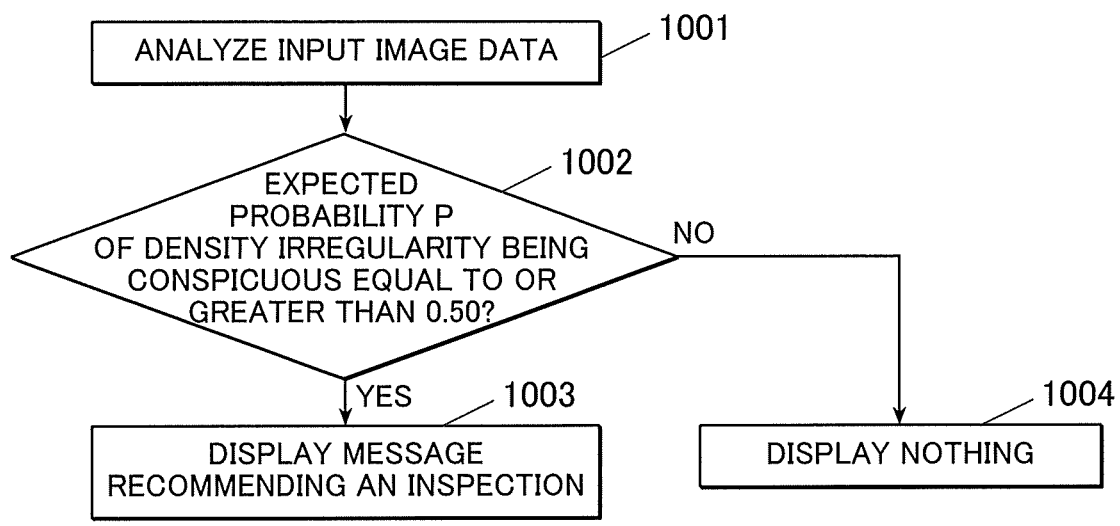
FIG. 10 is a flowchart illustrating an algorithm of displaying a message recommending an inspection according to Example 1 of the invention that is selectively incorporated in the present invention.

Example 1 is an example in which the present invention is applied to a sleeve-cyclic density irregularity which occurs due to deflection of a developing sleeve in the electrophotographic image forming apparatus. An algorithm of displaying the message recommending the inspection applied in Example 1 is illustrated in FIG. 10.

(8.3.1) Method for Calculating Probability of Conspicuous Density Irregularity

Conditions

A value obtained by converting the density difference of the density irregularity occurring in the image forming apparatus into the luminance ratio ΔL/L was set to be 0.13.

A reference value of the power integrated value F of the input image corresponding to ΔL/L was set to be 620186 based on the aforementioned correlation formula R(F).

Figure 11:
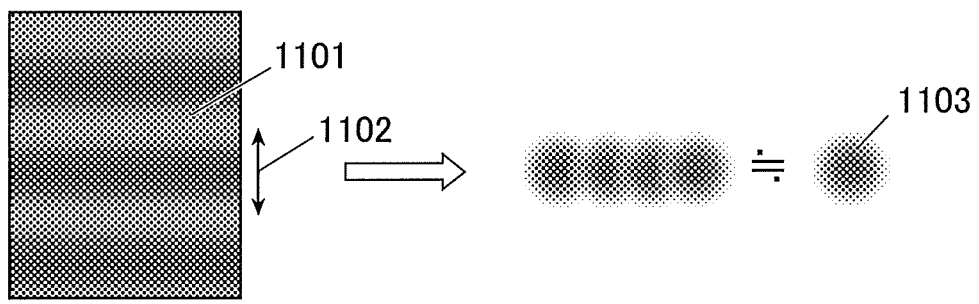
FIG. 11 is a schematic view illustrating a concept of substituting circular gradient distribution for a belt-like irregularity in Example 1 of the invention that is selectively incorporated in the present invention.

A cycle 1102 of a density irregularity (sleeve-cyclic density irregularity) 1101 to be determined as illustrated in FIG. 11 was set to be 44 mm.

The sleeve-cyclic density irregularity 1101 was replaced by a circular density irregularity 1103 having a diameter of 44 mm in which gradient distribution thereof became equal to the Gaussian distribution as illustrated in FIG. 11. Then, the following procedures were carried out.

Figure 12:
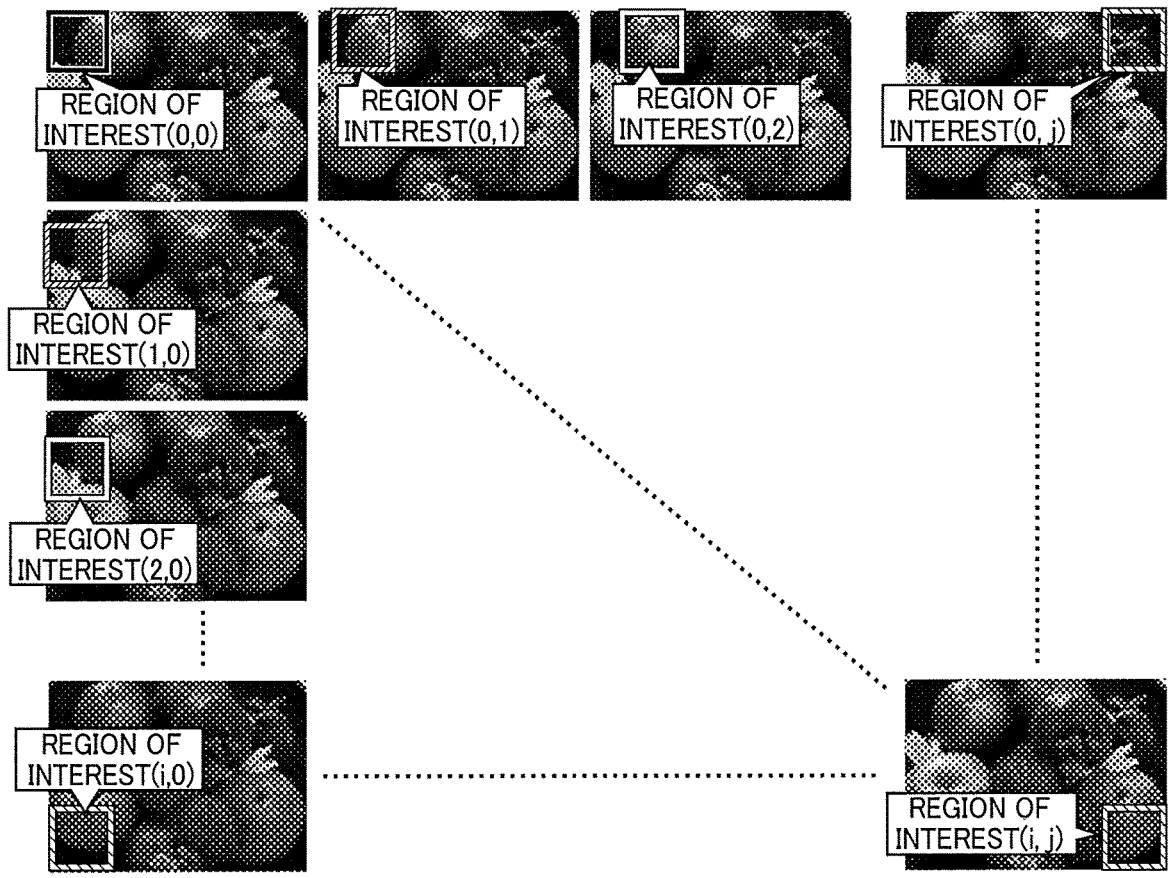
FIG. 12 is a schematic view illustrating that original-image data is divided into regions of interest in Example 1 of the invention that is selectively incorporated in the present invention.
Figure 13:
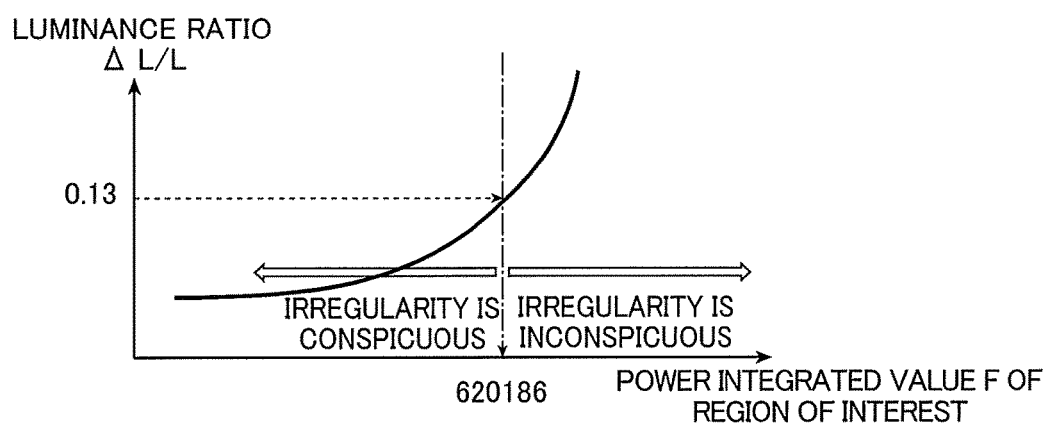
FIG. 13 is a graph illustrating correlation between an analysis result (power integrated value of original-image data) and an evaluation value of a density irregularity (luminance ratio) in Example 1 of the invention that is selectively incorporated in the present invention.

Procedures (a) Input image data was divided into a square having a side of 44 mm in length.
(b) The divided image was referred to as a region of interest as illustrated in FIG. 12. The region of interest was shifted per one pixel.
(c) In regard to an image of each divided region of interest, a size of the image was expanded or contracted so that the image size would have a pixel number equal to that of the image size when the correlation formula R(F) was derived by the aforementioned method.
(d) The two-dimensional Fourier transform was carried out on the expanded or contracted image of each region of interest so as to obtain a power spectrum.
(e) A value F was obtained by integrating the power spectrum by a frequency band similar to one at a time when the aforementioned R(F) was obtained.
(f) As illustrated in FIG. 13, when 620186≤F, the image of each region of interest was determined as an image having an "inconspicuous irregularity", and when F<620186, determined as an image having an "conspicuous irregularity."
(g) A probability P of the conspicuous density irregularity when outputting the input image was represented by n/N, n representing the number of regions of interest whose irregularity was determined to be conspicuous, and N representing the number of the whole regions of interest. ((a) to (g): Step 1001 in FIG. 10).
(h) When the probability P was equal to or more than 0.50, the message recommending the inspection was set to be displayed (YES at Step 1002 in FIG. 10-Step 1003; NO at Step 1002-Step 1004). A threshold herein may be set randomly.

(8.4) Example 2

Similar to Example 1, Example 2 is an example in which the present invention is applied to a development-cyclic density irregularity which occurs due to deflection of the developing sleeve in the electrophotographic image forming apparatus.

Figure 14A:
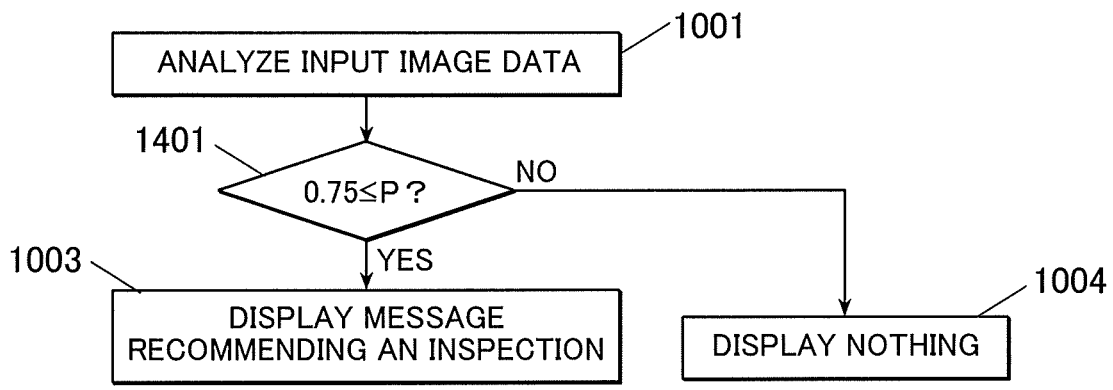
FIG. 14A is a flowchart illustrating an algorithm of displaying the message recommending the inspection according to Example 2 of the invention that is selectively incorporated in the present invention.

An algorithm of displaying the message recommending the inspection adopted in Example 2 is illustrated in FIG. 14A. An algorithm of correcting developing conditions in accordance with the probability of the conspicuous density irregularity is illustrated in FIG. 14B.

Figure 14B:
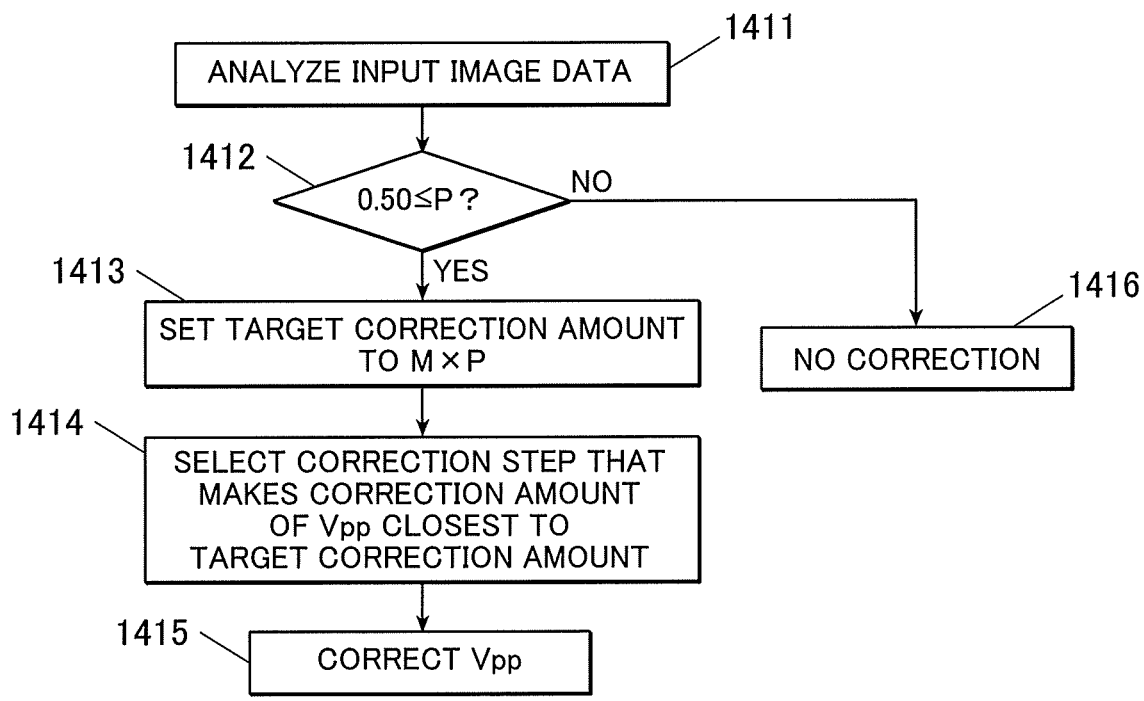
FIG. 14B is a flowchart illustrating an algorithm of correcting developing conditions in accordance with a probability of a density irregularity being conspicuous.

In FIGS. 14A and 14B, Vpp represents a peak value of developing AC bias, P represents the probability of the conspicuous density irregularity, and M represents the maximum correction amount of Vpp.

(8.4.1) Method for Calculating Probability of Conspicuous Density Irregularity

Conditions

Conditions herein conformed to the conditions in Example 1.

Procedures

The procedures until obtaining the integrated value F of the power spectrum was similar to the procedures in Example 1.

After obtaining the power integrated value F, the probability of the conspicuous density irregularity was calculated by the following procedures. A power integrated value F of an i-th region of interest was represented by xi.

A reference value of the integrated value F corresponding to ΔL/L was represented by X (herein, conditions were similar to Example 1 so that ΔL/L was equal to 0.13, and X was equal to 620186).

Figure 15:
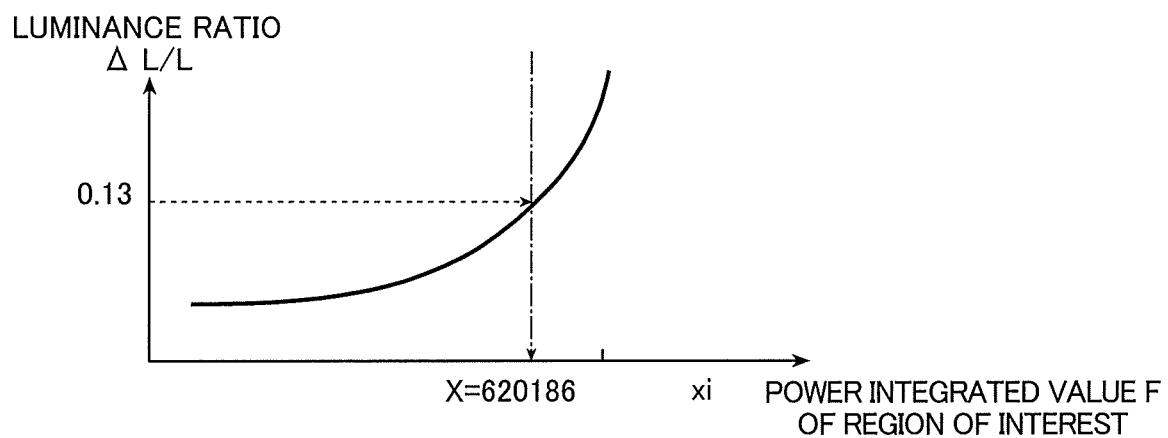
FIG. 15 is a graph illustrating a correlation between an analysis result (power integrated value of original-image data) and an evaluation value of a density irregularity (luminance ratio) in Example 2 of the invention that is selectively incorporated in the present invention.

In accordance with a correlation table in FIG. 15, when X−xi≤0, the probability pi of the conspicuous density irregularity was set to be equal to zero.

In accordance with the correlation table in FIG. 15, when X−xi>0, the probability pi of the conspicuous density irregularity was set to be equal to (X−xi)/X.

With respect to an entire input image, the probability P of the conspicuous density irregularity was represented by the following Formula (1), N representing the number of the whole divided regions of interest.

$$\Sigma_{i=1}^{N}(pi)/N=P \quad \text{Formula (1)}$$

(8.4.2) Method for Displaying Message Recommending Inspection

The message recommending the inspection was displayed as similar to Example 1. Note that when the probability P was equal to or more than 0.75, the message recommending the inspection was set to be displayed (YES at Step 1401 in FIG. 14A-Step 1003; NO at Step 1401-Step 1004).

(8.4.3) Method for Determining Correction Value of Developing AC Bias

Conditions

Table 1 represents a correction table of the peak value (Vpp) of the AC bias. The AC bias is an AC component of developing bias voltage of the image forming apparatus. The higher Vpp indicates that the density irregularity around the sleeve is less conspicuous. In the present image forming apparatus, there are four steps for correcting the peak value (Vpp) of the AC bias. The maximum correction amount M is +300 (Vpp=1180).

The probability of the conspicuous density irregularity is represented by P described in (8.4.1).

TABLE 1

| CORRECTION STEP | 0 | +1 | +2 | +3 |
|---|---|---|---|---|
| CORRECTION AMOUNT (V) | 0 | +100 | +200 | +300 |

TABLE 1-continued

| Vpp (V) | 880 | 980 | 1080 | 1180 |
|---|---|---|---|---|
| REMARKS | NO CORRECTION | >>>EFFECTIVE FOR SLEEVE-CYCLIC DENSITY IRREGULARITY | | |

Procedures

As illustrated in FIG. 14B, the input image was analyzed so as to calculate the probability P (Step 1411). When the probability P was less than 0.50, no correction was required (NO at Step 1412-Step 1416). When the probability P was equal to or more than 0.50, a target value of the correction amount of Vpp was set to be M×P (YES at Step 1412-Step 1413), and a correction value closest to M×P was selected from the correction table (Table 1) of Vpp (Step 1414) and Vpp was corrected (Step 1415). Table 2 illustrates some examples obtained herein.

TABLE 2

| PROBABILITY P | 0.24 | 0.8 | 0.45 | 0.87 |
|---|---|---|---|---|
| M × P | 72 | 240 | 135 | 261 |
| CORRECTION STEP | +1 | +2 | +1 | +3 |
| CORRECTION AMOUNT (V) | 100 | 200 | 100 | 300 |
| CORRECTED Vpp (V) | 980 | 1080 | 980 | 1180 |

(8.5) Example 3

Figure 16:
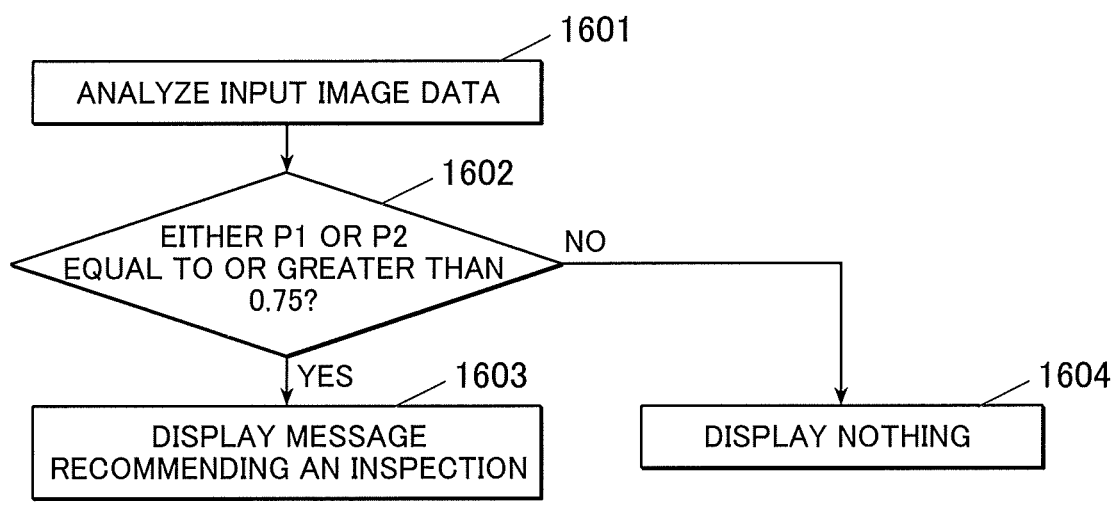
FIG. 16 is a flowchart illustrating an algorithm of displaying the message recommending the inspection according to Example 3 of the invention that is selectively incorporated in the present invention.
Figure 17:
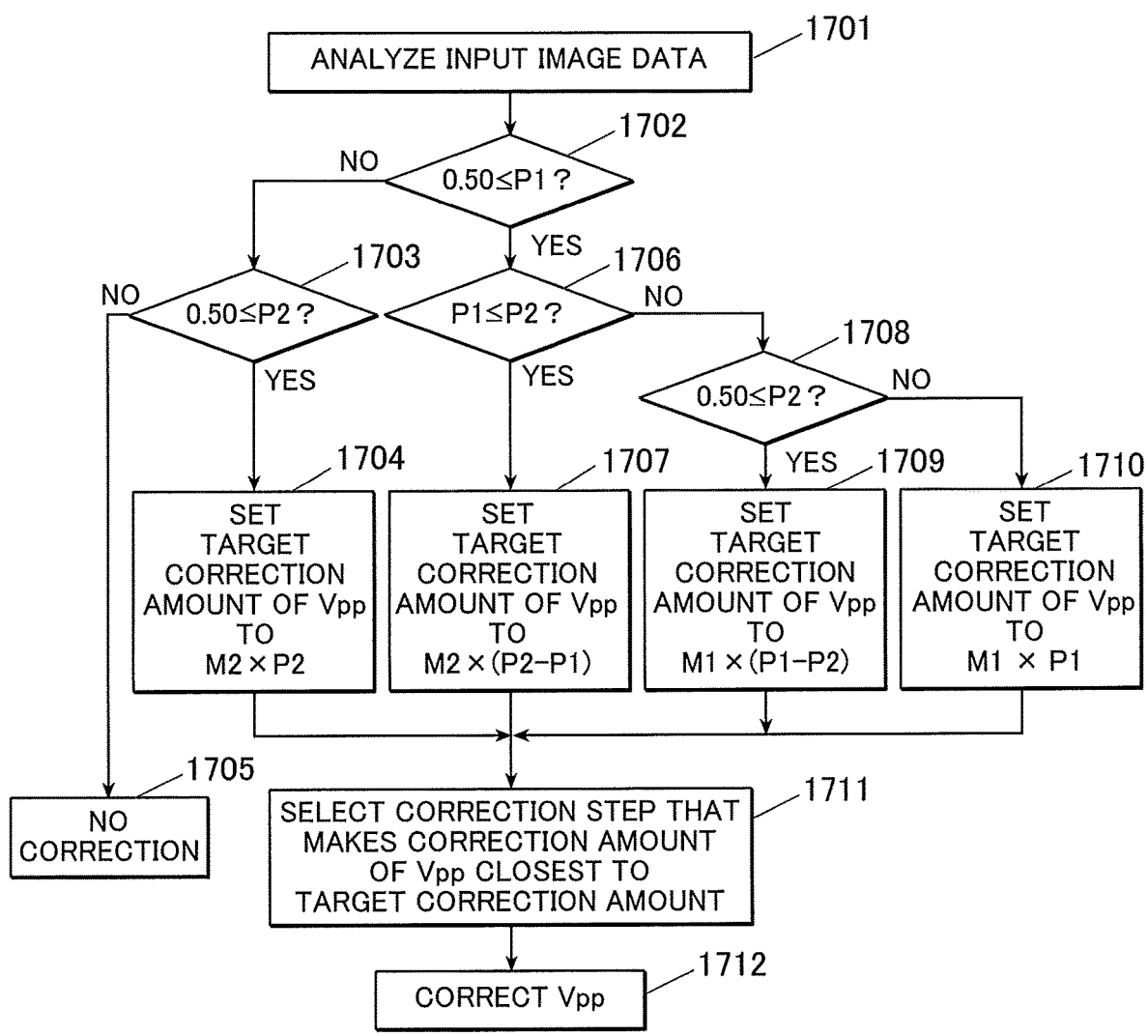
FIG. 17 is a flowchart illustrating an algorithm of correcting developing conditions in accordance with the probability of the conspicuous density irregularity according to Example 3 of the invention that is selectively incorporated in the present invention.

Example 3 is an example in which the present invention is applied to the following two types of density irregularities which are in trade-off relationship in the electrophotographic image forming apparatus. An algorithm of displaying the message recommending the inspection adopted in Example 3 is illustrated in FIG. 16. An algorithm of correcting developing conditions in accordance with the probability of the conspicuous density irregularity is illustrated in FIG. 17.

(8.5.1) Definition of Terms

Vpp: the peak value of the developing AC bias
Irregularity 1: a development-cyclic density irregularity which occurs due to deflection of the developing sleeve
Irregularity 2: a circular density irregularity referred to as the "firefly" attributing to carrier adhesion P1: an expected probability of a conspicuous irregularity 1

P2: an expected probability of a conspicuous irregularity 2

M1: a correction amount of Vpp when a correction width becomes the largest

M2: the correction amount of Vpp when the correction width becomes the narrowest (8.5.2) Method for Calculating Probability of Conspicuous Density Irregularity A method similar to Example 2 was applied to the irregularity 1 and irregularity 2. Note that sizes of regions of interest adjusted to the two types of the density irregularities to be determined were respectively set to the following values.

Figure 18A:
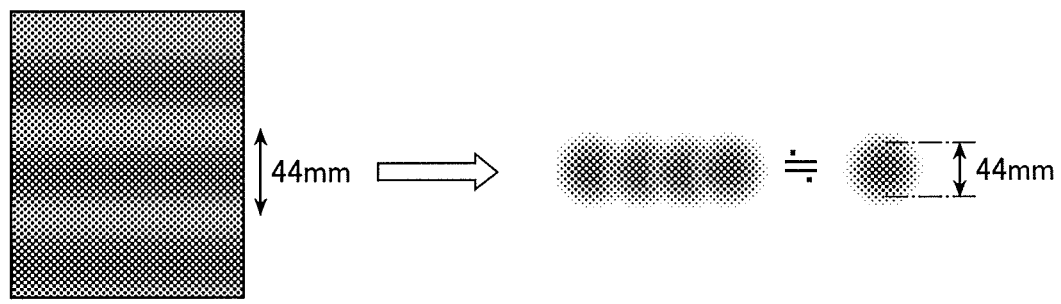
FIG. 18A is a schematic view illustrating that a size of a region of interest corresponding to a belt-like irregularity is set in Example 3 of the invention that is selectively incorporated in the present invention.
Figure 18B:
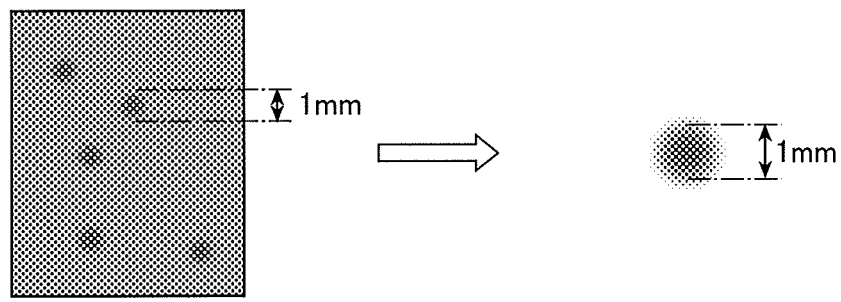
FIG. 18B is a schematic view illustrating that a size of a region of interest corresponding to a circular irregularity is set.

In other words, a side of a region of interest (square) was set to be 44 mm in regard to the irregularity 1, while it was set to be 1 mm in regard to the irregularity 2. The former irregularity was based on that a cycle of an irregularity occurring in a belt-like shape was 44 mm as illustrated in FIG. 18A, while the latter was based on that a diameter of an irregularity occurring in a circular shape was 1 mm as illustrated in FIG. 18B.

Input image data was analyzed so as to calculate the probability P1 and probability P2 (Step 1601, 1701).

(8.5.3) Method for Displaying Message Recommending Inspection

The message recommending the inspection was displayed as similar to Example 1. Note that the message recommending the inspection was set to be displayed when one of the probability P1 and probability P2 was equal to or more than 0.75 (YES in Step 1602 of FIG. 16-Step 1603; NO in Step 1602-Step 1604).

(8.5.4) Method for Determining Correction Value of Developing Ac Bias

Conditions

Table 3 represents a correction table of the peak value (Vpp) of the AC bias. M1 and M2 were respectively set to be equal to 300 [V] and −300 [V]. The higher Vpp makes the irregularity 1 inconspicuous, while the lower Vpp makes the irregularity 2 inconspicuous. They are in the trade-off relationship. Herein, as illustrated in the following procedures (algorithm in FIG. 17), priority was given to a density irregularity having a high probability of the conspicuous density irregularity and correction of the conditions of the image forming processing were instructed.

TABLE 3

| | CORRECTION STEP | | | | | | |
|---|---|---|---|---|---|---|---|
| | −3 | −2 | −1 | 0 | +1 | +2 | +3 |
| CORRECTION AMOUNT | −300 | −200 | −100 | 0 | +100 | +200 | +300 |
| Vpp [V] | 580 | 680 | 780 | 880 | 980 | 1080 | 1180 |
| REMARKS | EFFECTIVE FOR CARRIER ADHESION | <<< | | NO CORRECTION | | >>> | EFFECTIVE FOR SLEEVE-CYCLIC DENSITY IRREGULARITY |

Procedures

The expected probability of the conspicuous irregularity 1 was calculated by a method similar to Example 1 and was referred to as P1.

The expected probability of the conspicuous irregularity 2 was calculated by a method similar to Example 1 except that a size of each region of interest was set to be a square having a side of 1 mm when dividing an input image and was referred to as P2.

In accordance with a flowchart illustrated in FIG. 17, a target value of the correction amount of Vpp was determined and a correction step was selected so that the target value became a correction amount closest to the target value.

In other words, the input image was analyzed and probability P1 and probability P2 were calculated as illustrated in FIG. 17 (Step 1701). When the probability P1 was less than 0.50 (NO in Step 1702) and also when the probability P2 was less than 0.50, no correction was required (NO in Step 1703-Step 1705). When the probability P1 was less than 0.50 (NO in Step 1702) and when the probability P2 was equal to or more than 0.50, the target value of the correction amount of Vpp was set to be M2×P2 (YES in Step 1703-Step 1704). When the probability P1 was equal to or more than 0.50 (YES in Step 1702) and when the probability P2 was equal to or more than the probability P1, the target value of the correction amount of Vpp was set to be M2×(P2−P1) (YES in Step 1706-Step 1707). When the probability P1 was equal to or more than 0.50 (YES in Step 1702) and when the probability P2 was less than the probability P1 and the probability P2 was also equal to or more than 0.50, the target value of the correction amount of Vpp was set to be M1×(P1−P2) (NO in Step 1706-YES in Step 1708-Step 1709). When the probability P1 was equal to or more than 0.50 (YES in Step 1702) and when the probability P2 was less than the probability P1 and the probability P2 was less than 0.50, the target value of the correction amount of Vpp was set to be M1×P1 (NO in Step 1706-NO in Step 1708-Step 1710).

After determination of each target value, the correction value closest to the target value among the correction table of Vpp (Table 3) was selected (Step 1711) and Vpp was corrected (Step 1712). Table 4 illustrates some examples obtained herein.

As mentioned above, when both of the probability P1 and probability P2 were less than 0.50, no correction was required. However, those equal to or more than 0.50 required to be corrected. When both of the probability P1 and probability P2 were equal to or more than 0.50, in order not to extremely emphasize the irregularity having comparatively low probability, the target value was set so as to make a difference of the probability, for example, as M2×(P2−P1) in Step 1706 and M1×(P1−P2) in Step 1708.

TABLE 4

|  | CASE 1 | CASE 2 | CASE 3 | CASE 4 | CASE 5 |
|---|---|---|---|---|---|
| P1 | 0.61 | 0.78 | 0.95 | 0.45 | 0.24 |
| P2 | 0.80 | 0.59 | 0.31 | 0.55 | 0.28 |
| TARGET VALUE OF CORRECTION AMOUNT (FORMULA) | M2 × (P2 − P1) | M1 × (P1 − P2) | M1 × P1 | M2 × P2 | NONE |
| TARGET VALUE OF CORRECTION AMOUNT (V) | −57 | 57 | 285 | −165 | 0 |
| CORRECTION STEP | −1 | +1 | +3 | −2 | 0 |
| CORRECTION AMOUNT (V) | −100 | +100 | +300 | −200 | 0 |
| CORRECTED Vpp (V) | 780 | 980 | 1180 | 680 | 880 |

(8.6) Comparative Example 1

On the contrary to the abovementioned Examples, an electrophotographic image forming apparatus without involving the system for predicting occurrence of the defective images (performance of the system for predicting occurrence of the defective images was turned off) was operated as Comparative Example 1, and the following comparative evaluation was carried out.

(8.6.1) Evaluation 1

A time required from input of image data according to printing jobs to completion of inspection was compared among Examples 1 to 3 and Comparative Example 1.
Conditions Inspection was manually carried out on printed materials on which the message recommending the inspection was displayed.

The following is a common operation condition of the image forming apparatus.

Linear velocity was set to be 100 ppm (velocity excluding a time required for adjusting and stabilizing an image).

In regard to contents of the printing jobs, see Table 5.

TABLE 5

|  | JOB 1 | JOB 2 | JOB 3 |
|---|---|---|---|
| SIZE | A4 | A3 | POSTCARD |
| NUMBER OF PAGES | 5 | 5 | 2000 |
| NUMBER OF COPIES | 2000 | 2000 | 5 |

Results

Figure 19:
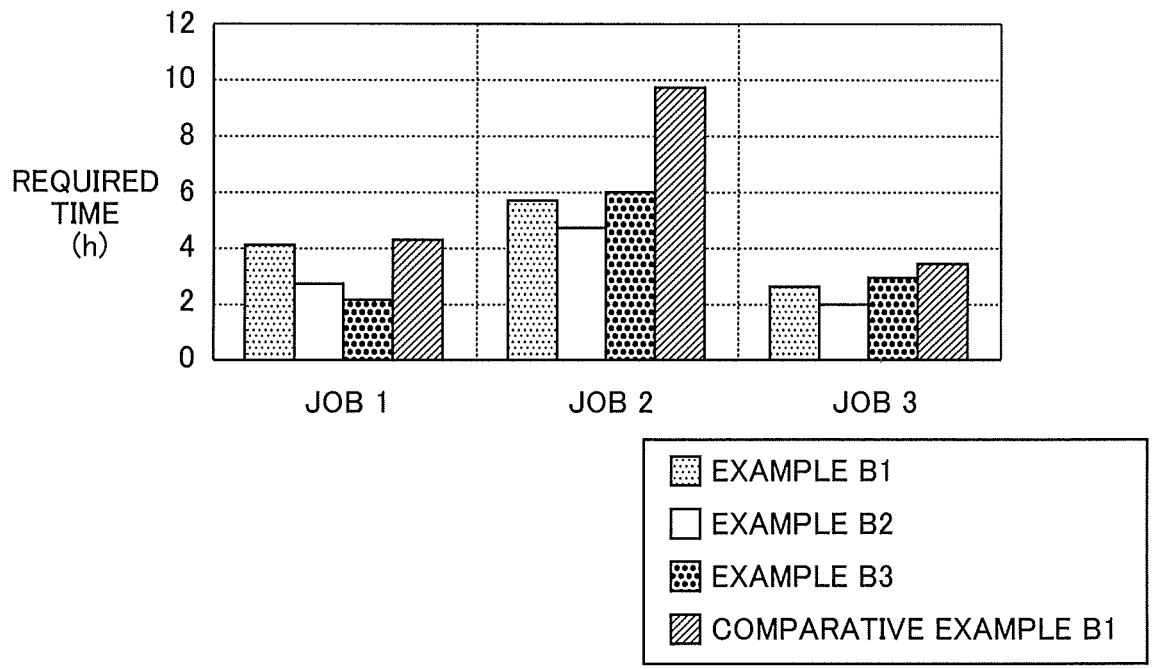
FIG. 19 is a graph for comparing a time required from printing to inspection in regard to Examples 1 to 3 and Comparative Example 1 of the invention that is selectively incorporated in the present invention.

A graph illustrated in FIG. 19 represents the time required for printing and inspection.

All the Examples 1 to 3 required the time shorter than Comparative Example 1.

In Example 1, the number of materials to be inspected were larger than in Examples 2 and 3 and a difference between Comparative Example 1 was small in Job 1, in which an A4-size sheet was used. However, the time required could be diminished in all Jobs comparing with Comparative Example 1.

In Example 3, a time required for calculation in the system for predicting occurrence of the defective images was the longest so that a difference between Comparative Example 1 was small in Job 3, in which many types of originals (the large number of pages) were used. However, the time required could be diminished in all Jobs comparing with Comparative Example 1.

In Job 2, in which a large A3-size sheet was used, the time required could be diminished remarkably in each Example comparing with Comparative Example 1.

(8.7) Example 4

Similar to Example 1, Example 4 is an example in which the present invention is applied to a development-cyclic density irregularity which occurs due to deflection of the developing sleeve in the electrophotographic image forming apparatus.

The image forming apparatus includes the density-irregularity detection system which reads out the density difference from each formed image. The image forming apparatus further detects and excludes the density irregularity.

Figure 20:
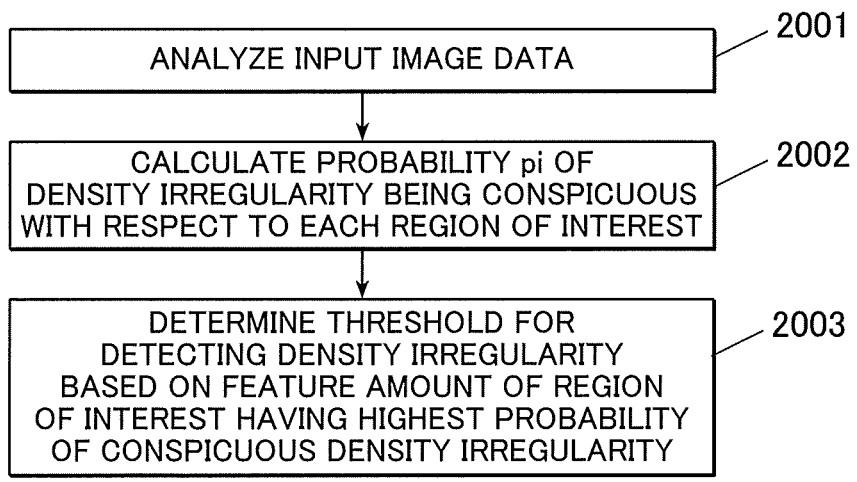
FIG. 20 is a flowchart illustrating an algorithm of setting a threshold for detecting density irregularity in accordance with input image data according to Example 4 of the invention that is selectively incorporated in the present invention.

FIG. 20 illustrates an algorithm of setting a threshold of the density difference for determining the density irregularity by the density-irregularity detection system in accordance with input image data.

(8.7.1) Method for Calculating Expected Probability of Conspicuous Density Irregularity Applying a method similar to Example 2, the image data input as an original was divided to be analyzed per region of interest so as to obtain the expected probability pi of the i-th region of interest (Step 2001, 2002).

(8.7.2) Method for Determining Threshold of Density Difference for Determining Density Irregularity A region of interest I having the largest pi was selected per image data input as an original.

Based on a correlation view between the luminance ratio ΔL/L of the density irregularity and power integrated value F of the region of interest illustrated in FIG. 21, when the density irregularity to be determined (in this Example, the development-cyclic density irregularity) occurs in the region of interest I, calculated was a luminance ratio RI of the irregularity at the minimum value in which the irregularity was visible.

By the method described in (8.3), the luminance ratio RI was converted into a density difference DI. DI was referred to as the threshold of the density difference for determining the density irregularity by the density-irregularity detection system (Step 2003).

In place of the minimum value, other statistics such as a mean value and maximum value may be applicable.

(8.8) Comparative Example 2

On contrary to the abovementioned Example 4, the electrophotographic image forming apparatus without involving the system for predicting occurrence of the defective images (performance of the system for predicting occurrence of the defective images was turned off) was operated as Comparative Example 2, and the following comparative evaluation was carried out.

The luminance ratio which was to be the threshold for detecting the density irregularity was fixed to 0.13.

(8.8.1) Evaluation 2

In Example 4 and Comparative Example 2, printed materials which had gone through an automatic inspection by the density-irregularity detection system and printed materials excluded as including the density irregularity were all visually observed so as to evaluate whether the density irregularity was conspicuous. Accordingly, accuracy of inspecting the defective images was evaluated.

Conditions

Inspection was carried out by the density-irregularity detection system.

In regard to contents of a printing job, the number of originals was set to be 5000 and one copy of one original was printed on an A3-size sheet.

In regard to determination whether the irregularity was conspicuous, when the determination differs between the automatic inspection by the density-irregularity detection system and the visual evaluation by a human being, the determination obtained by the automatic inspection was considered to be an error.

Procedures

With respect to the accepted printed materials and the printed materials excluded by the automatic inspection carried out by the density-irregularity detection system, a rate of incorrect determination of inspecting the density irregularity was calculated and estimated by the following Formula.

In other words, a rate of incorrect determination of rejected images was represented by B/A× 100 (%), A representing a total number of printed materials excluded by the automatic inspection, and B representing the number of images whose density irregularity was determined to be inconspicuous by the visual observation among the total printed materials.

Furthermore, a rate of incorrect determination of accepted images was represented by B1/A1×100(%), A1 representing a total number of printed materials accepted by the automatic inspection, and B1 representing the number of images whose the density irregularity was determined to be conspicuous among the total printed materials.

Results

Table 6 illustrates evaluation results.

In Example 4, comparing with Comparative Example 2, the rate of the incorrect determination of the rejected images and the rate of the incorrect determination of the accepted images were diminished as illustrated in Table 6.

TABLE 6

|  |  | EXAMPLE 4 | COMPARATIVE EXAMPLE 2 |
|---|---|---|---|
| PRINTED MATERIALS THAT HAVE FAILED AUTOMATIC INSPECTION | TOTAL NUMBER OF SHEETS (A) | 1100 | 950 |
| | NUMBER OF SHEETS IN WHICH IRREGULARITY IS INCONSPICUOUS (B) | 13 | 171 |
| | RATE OF INCORRECT DETERMINATION OF REJECTED IMAGES (B/A)(%) | 1 | 18 |
| PRINTED MATERIALS THAT HAVE PASSED AUTOMATIC INSPECTION | TOTAL NUMBER OF SHEETS (A') | 3900 | 4050 |
| | NUMBER OF SHEETS IN WHICH IRREGULARITY IS CONSPICUOUS (B') | 0 | 137 |
| | RATE OF INCORRECT DETERMINATION OF ACCEPTED IMAGES (B'/A')(%) | 0 | 3 |

8.9

A method for making the correlation table (formula) between the impression rank and value f will be hereinafter described.

(8.9.1) how to Obtain Impression Rank

Figure 23A:
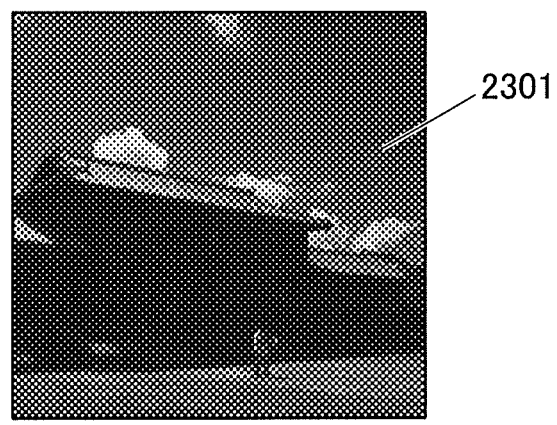
FIG. 23A is an exemplary presentation image used for making the correlation table (formula) of the impression rank and value F applicable to the invention that is selectively incorporated in the present invention.

Under the following conditions, an image having a dotted density irregularity was presented to the subjects. Each subject was asked to report the conspicuity of the density irregularity with using the "impression rank."
Conditions
Experimental environment where the image was presented: in a light booth
  Output device: PX-H10000 made by Seiko Epson Corp.
  Applicable controller: Falbard AQUA system
  Output sheet: FA Proof coat (in presenting the image, a test image was put on overlapping four pieces of J paper as an underlay)
  Image size: 300 mm×300 mm
  Color: Full color
  Type of a background image: natural-scene image
  Shape of the density irregularity: circular shape in which gradient distribution was changed in accordance with the Gaussian distribution
  Size of the density irregularity was set to be within a range of a visual field at approximately 1° of each observer.
  Herein, a target was a circular irregularity in accordance with the Gaussian distribution in which a width of a region where the gradient changed as illustrated in FIG. 22A was set to be 48.51 mm, and a width of a central portion was set to be 14.1 mm.
Procedures
  FIG. 23A illustrates an exemplary presentation image. The presentation image having a circular density irregularity 2301 as illustrated in FIG. 23A was presented to the subjects. Each subject was asked to report the conspicuity of the density irregularity with using the "impression rank." The impression rank herein conformed to one described in (5.4).

(8.9.2) Analysis of Frequency

Figure 23B:
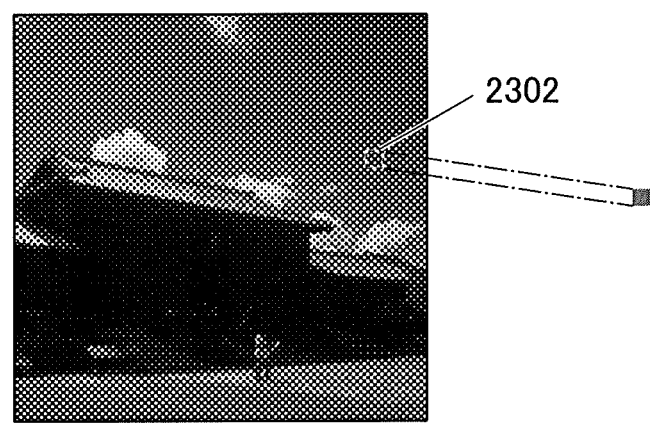
FIG. 23B is a view illustrating that a region where a circular irregularity occurs is cut off from the presentation image.
Figure 24A:
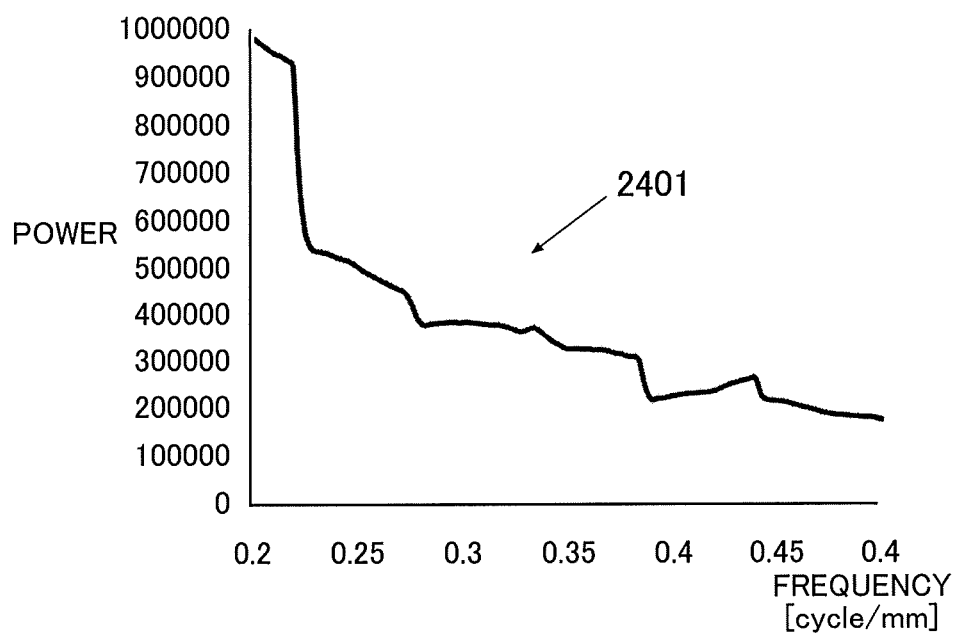
FIGS. 24A and 24B are views each illustrating a power spectrum of a spatial frequency of gradient distribution obtained by carrying out two-dimensional Fourier transform on the image cut off in FIG. 23B, where
Figure 24B:
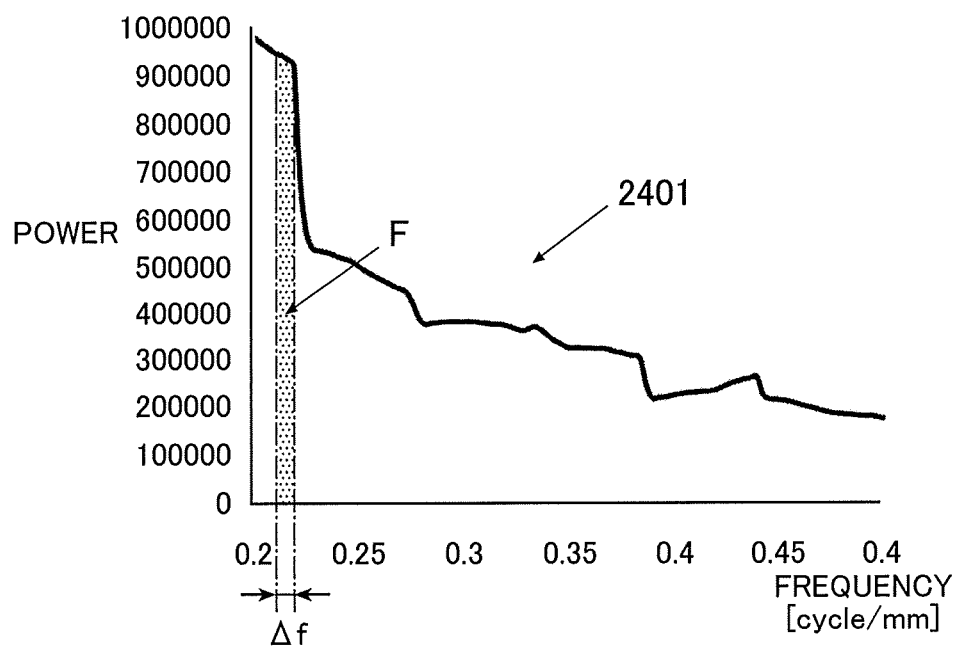

On the other hand, the following analysis was carried out with respect to a frequency of the density irregularity described in (8.9.1).
A lightness profile on a center line 2201 illustrated in FIG. 22B was obtained as illustrated in FIG. 22C. The central portion of the density irregularity was set to be a range in which variation of lightness was at a constant level or more.
A region 2302 (14.1 mm×14.1 mm) where the central portion of the irregularity was drawn was cut off from input data (original data) having no irregularity as illustrated in FIG. 23B.
The cutoff image was subject to the two-dimensional Fourier transform so as to obtain a power spectrum 2401 of the spatial frequency of the gradient distribution. FIG. 24A is a schematic view of the power spectrum to be obtained.
A range in which the frequency is from $\{(1/14.1)\times 3\}=0.213$ to $\{(1/14.1)\times 3\}=0.220$ is represented by $\Delta f$ as illustrated in FIG. 24B, and a value obtained by integrating the power spectrum 2401 by the range of $\Delta f$ is represented by F.
Herein, the value $\{(1/14.1)\times 3\}$ was obtained by selecting a range except for the DC component in the power spectrum 2401 with reference to the size of the density irregularity. Furthermore, the value was obtained when the correlation between the impression rank was especially satisfactory.
The present Example has described a case where the power was integrated as setting the range of $\Delta f$. However, without integrating the power, the power when the frequency is $\{(1/14.1)\times 3\}=0.213$ may be applied as the value F.

(8.9.3) how to Obtain Luminance Ratio of Density Irregularity

Figure 25A:
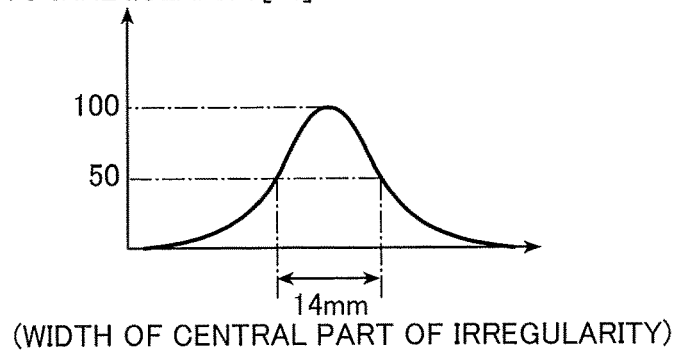
FIG. 25A is a lightness profile for determining a central portion and vicinal portion of the circular irregularity illustrated in FIG. 22A.
Figure 25B:
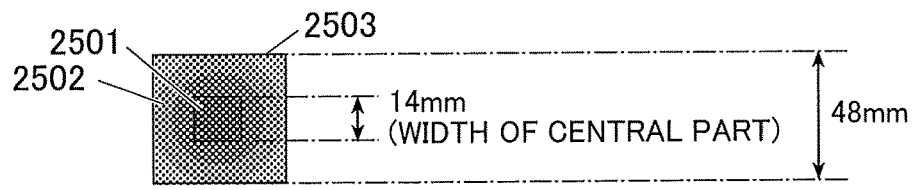
FIG. 25B is a schematic view of the circular irregularity illustrating the central portion and vicinal portion thereof.

In regard to the density irregularity described in (8.9.1), obtained was a value obtained by converting the density difference between the central and vicinal portions into the luminance ratio. An example of a method to obtain such a value is to measure the lightness profile when the density irregularity occurs on an image having uniform density, and to determine a width of a central portion 2501 of the density irregularity as illustrated in FIGS. 25A and 25B.
As illustrated in FIGS. 25A and 25B, a region in which a square 2501, or the central portion, was excluded from a square 2503 was referred to as a vicinal portion 2502. The square has a size of 48 mm×48 mm, sharing a center with the density irregularity.
The density of both central portion 2501 and vicinal portion 2502 was measured so as to obtain a difference between those two. The obtained difference was converted into the luminance ratio in accordance with the conversion method described in (8.3).

(8.9.4) Correlation Formula to be Obtained

Figure 26:
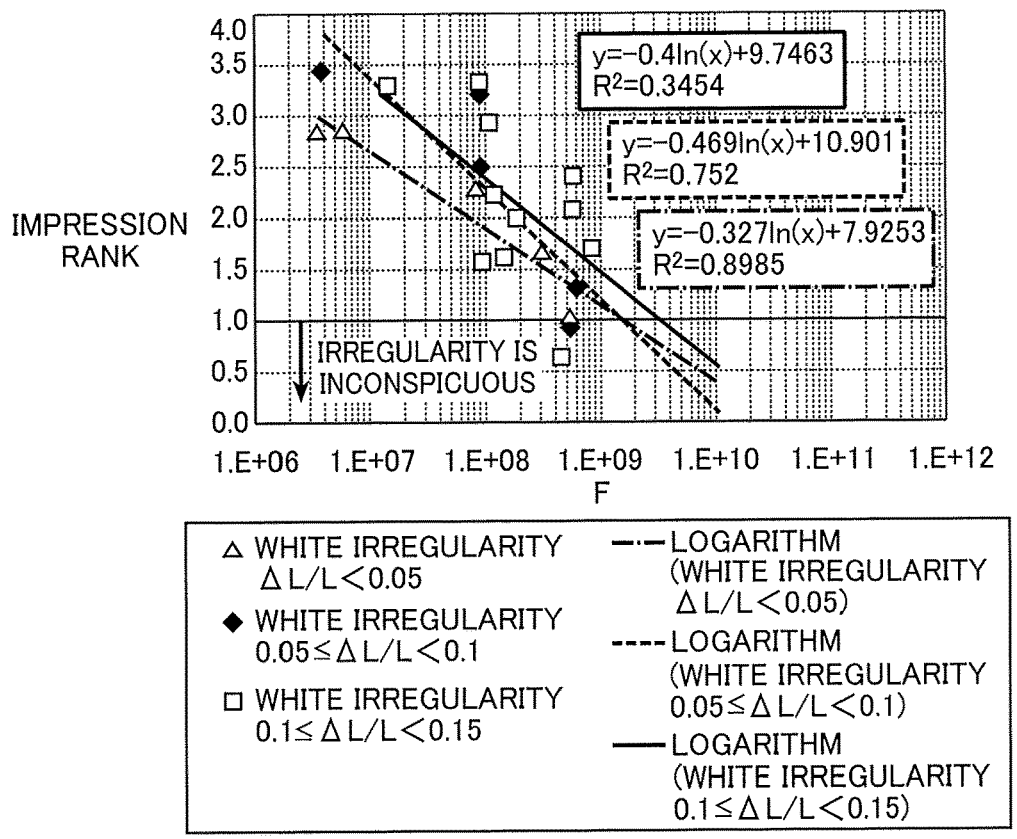
FIG. 26 is a view illustrating correlation between the value F of each presentation image used in the experiment and the impression rank obtained from subjects.

According to the abovementioned procedures from (8.9.1) to (8.9.3), the value F was calculated per presentation image used for the experiment and the correlation view was drawn as illustrated in FIG. 26 with using the "impression rank" obtained from the subjects.
Herein, $\Delta L/L$ was separated based on a predetermined range so as to draw a correlation view per separated $\Delta L/L$.
In the present Example, the obtained correlation formula R' (F) between the impression rank and value F is represented by the following three formulae per range of $\Delta L/L$.
When (i) $\Delta L/L<0.05$, (impression rank)=$-0.327$ ln (F)+ 7.9253.
When (ii) $0.05<\Delta L/L<0.1$, (impression rank)=$-0.469$ ln(F)+10.901.
When (iii) $0.1\le\Delta L/L<0.15$, (impression rank)=$-0.400$ ln(F)+9.7463.

(8.9.5) Example 5

Figure 27:
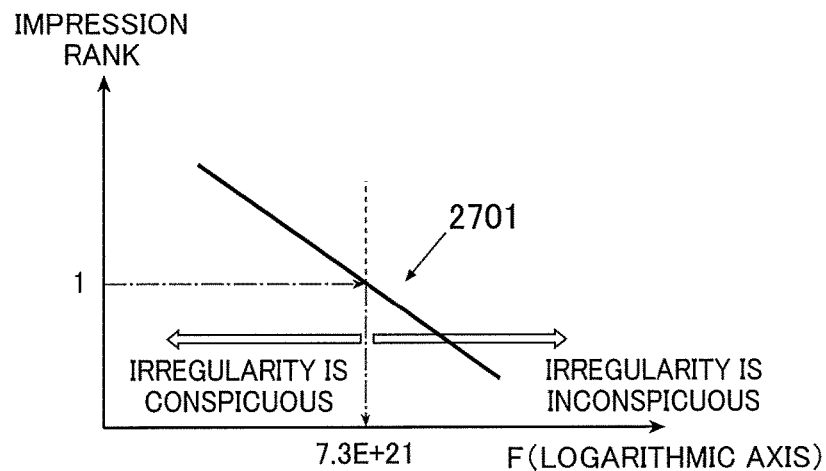
FIG. 27 is a graph illustrating the correlation between the value F and the impression rank in Example 5 of the invention that is selectively incorporated in the present invention.

Described in Example 5 is a method for applying the correlation formula R' (F) between the impression rank of (8.9.4) and value F to Example 1.
The image data input to the image forming apparatus in Example 1 was expanded or contracted so that the size 44 mm of the actually-occurring density irregularity became equal to the pixel number of "the image cut off from the input image (a central region of the density irregularity) when analyzing the frequency in order to obtain the correlation formula R' (F)."
By the method of (8.9.2), the value F of each image of interest was obtained.
In Example 1, the luminance ratio $\Delta L/L$ of the density irregularity was 0.13. In this Example, the luminance ratio was within a range of $0.1\le\Delta L/L<0.15$. Therefore, the correlation formula (iii) among the correlation formulae R' (F) was applicable. As illustrated in FIG. 27, the correlation formula (iii) is represented by a graph 2701.
Supposed that the luminance ratio of the density irregularity is $\Delta L/L<0.05$, the correlation formula (i) is applicable, and when it is $0.05\le\Delta L/L<0.1$, the formula (ii) is applicable.
When the impression rank was equal to or less than 1, the irregularity was inconspicuous. Therefore, the reference value of the value F located in the border of the conspicuous irregularity and inconspicuous irregularity was set to be $7.3\times10^{21}$ based on FIG. 27.
In each region of interest, when $7.3\times10^{21}\le F$, it was determined that "the irregularity is inconspicuous" and when $F<7.3\times10^{21}$, it is determined that "the irregularity is conspicuous."

Other procedures were carried out in a manner similar to Example 1.

(8.9.6) Example 6

Described in Example 6 is a method for applying the correlation formula R' (F) between the impression rank of (8.9.4) and value F to Example 2.

Similar to Example 5, the correlation formula (iii) corresponding to the luminance ratio $\Delta L/L=0.13$ of the density irregularity was used so as to obtain $X=7.3\times10^{21}$.

Other procedures were carried out in a manner similar to Example 2.

(B)

SUMMARY OF SYSTEM

A system for predicting occurrence of defective images includes an observation distance obtainer which obtains an observation distance of an image to be formed by the image forming apparatus. The system divides image data input to the image forming apparatus as an original of the image into regions of interest each having a size determined based on the observation distance, analyzes the spatial frequency of the gradient distribution of the image with respect to each of the regions of interest, and calculates the probability of a target density irregularity being conspicuous in the image to be formed by the image forming apparatus based on the image data by using a correlation index between the analysis result and an evaluation value of the density irregularity. Herein, the index of correlation may be represented by any form such as a data table and correlation formula.

The image forming apparatus includes an original input device (a device for inputting image data and a unit for reading out a paper original) and an image forming unit. The image forming unit develops with toner an electrostatic latent image formed on a photoreceptor based on the image data so as to form a toner image. The image forming unit then transcripts the formed toner image to a sheet and heats the transcribed toner image so as to fix the toner image and to form an image on the sheet.

A computer program for achieving performance of the system is installed in a computer included in the image forming apparatus or in an external computer. Such a computer program is included in the present system. In order to achieve the performance of the present system by the external computer, note that the system analyzes the image data before input of the image data to the image forming apparatus as an original, or during input of the same, or after input of the same and before formation of an image. The system then calculates a probability when the original is input to the image forming apparatus and the image is formed.

The observation distance obtainer is constituted by an interface for inputting data to the computer. The user inputs a value of an expected observation distance to the computer of the system through the user interface as well as the image data to be printed by the image forming apparatus. Alternatively, the user may input data file including image data and a value of an observation distance to the image forming apparatus through an interface. Furthermore, a density-irregularity detector included in a density-irregularity detection system is attached to the image forming apparatus so as to link the system with the density-irregularity detection system. The density-irregularity detector includes a readout unit for reading out the image formed by the image forming apparatus.

Figure 28:
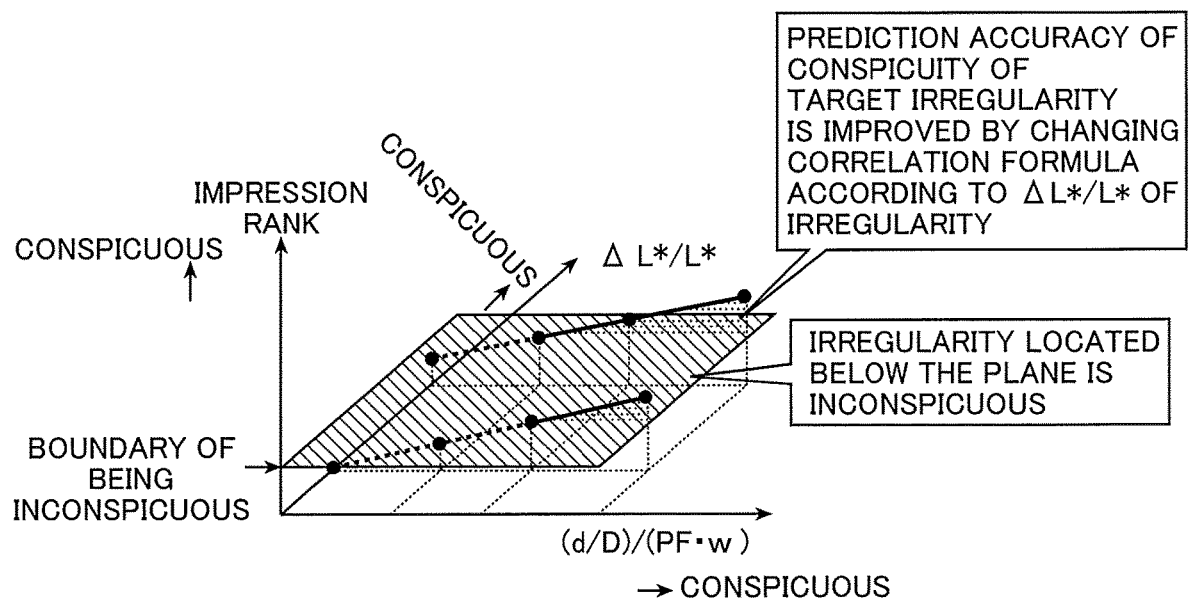
FIG. 28 illustrates an example of a correlation table between analysis results and evaluation values of density irregularity according to the present invention.
Figure 29:
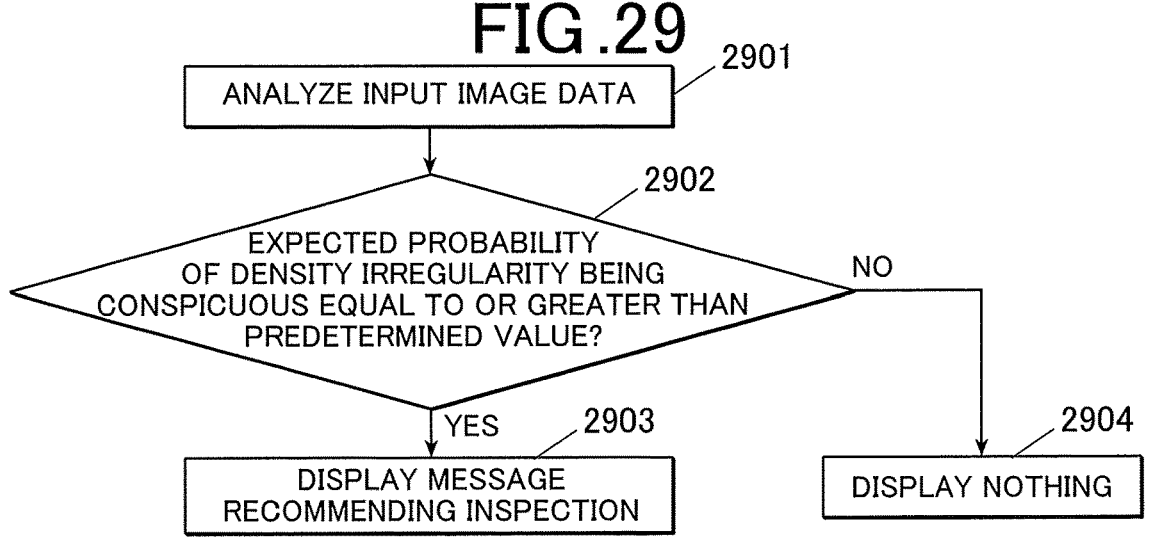
FIG. 29 illustrates a control flow of displaying a message recommending an inspection according to the present invention.
Figure 30:
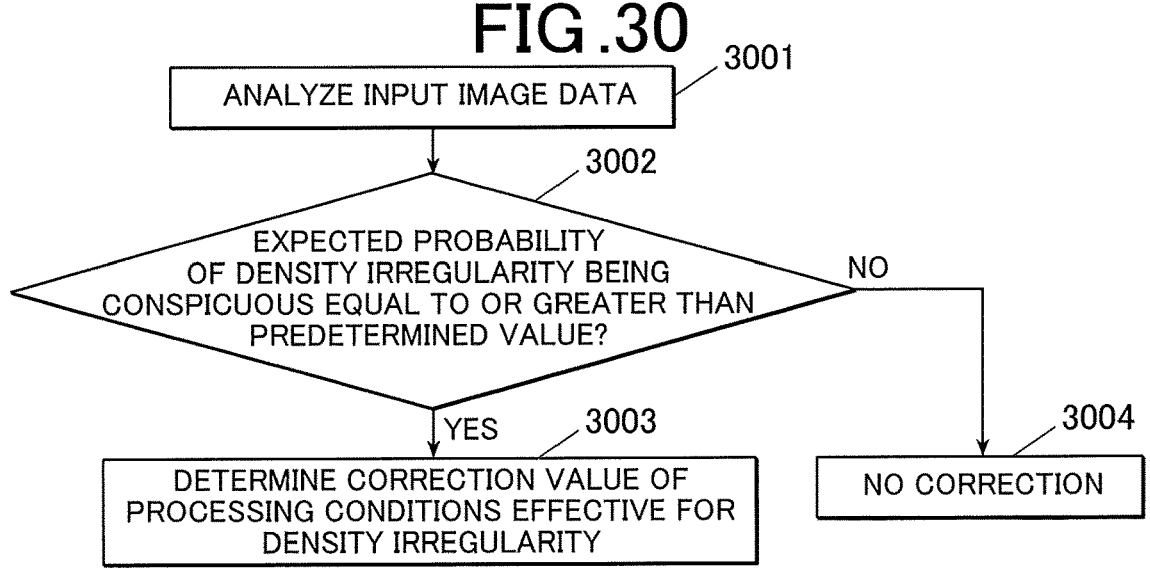
FIG. 30 illustrates a control flow of making an instruction to correct the setting of image forming processing according to the present invention.
Figure 31:
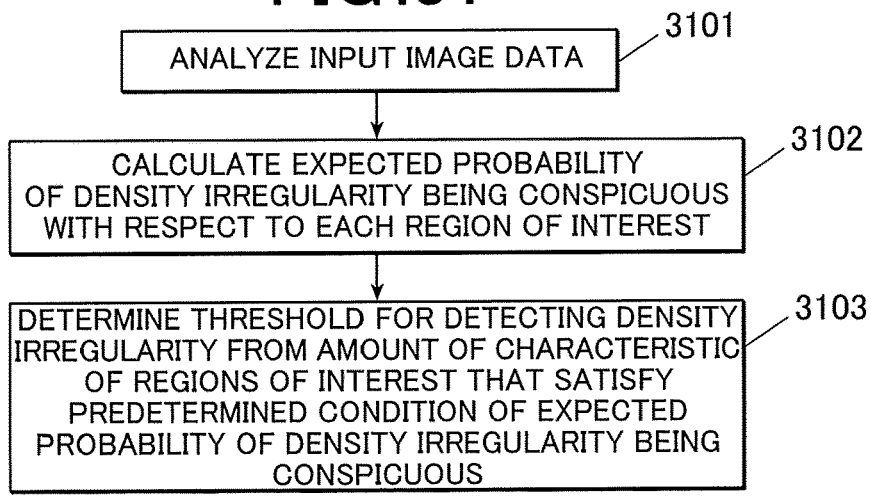
FIG. 31 illustrates a control flow of setting a detection threshold of a density-irregularity detection system according to the present invention.

In order to analyze the spatial frequency of the gradient distribution of an image with respect to regions of interest having a size determined based on the observation distance, (1) First, the system for predicting occurrence of defective images divides the image data input to the image forming apparatus as an original into regions of interest each having a size determined based on the observation distance, and analyzes the spatial frequency of the gradient distribution of the image with respect to each of the regions of interest. The system then uses the correlation table (FIG. 28) between analysis results and evaluation values of a target density irregularity to calculate the probability of the target density irregularity being conspicuous. The calculation process will be further described later. The system for predicting occurrence of defective images carries out at least one of (2) to (4).

(2) When the system for predicting occurrence of defective images determines that the probability of the density irregularity being conspicuous in (1) is equal to or greater than a predetermined value, it displays a message recommending an inspection to a user (FIG. 29, 2901 to 2904).

(3) When the system for predicting occurrence of defective images determines that the probability of the density irregularity being conspicuous in (1) is equal to or greater than a predetermined value, it instructs the image forming unit of the image forming apparatus to correct the setting of image forming processing in order to diminish the density irregularity (FIG. 30, 3001 to 3004).

(4) When the system for predicting occurrence of defective images determines that the probability of the density irregularity being conspicuous in (1) is equal to or greater than a predetermined value, it sets a detection threshold of the density-irregularity detection system (FIG. 31, 3101 to 3103).

(5) The system for predicting occurrence of defective images carries out the analysis in (1) as follows.

(a) The system for predicting occurrence of defective images divides an image into regions of interest each having a size determined based on the observation distance regardless of the size of the density irregularity, and analyzes the spatial frequency of the gradient distribution (or lightness distribution, luminance distribution) of the image with respect to each of the regions of interest.

(aa) The system for predicting occurrence of defective images sets the size of the regions of interest to a square having a side of "2×(observation distance)×tan(1°)". The length of a side of the square is denoted as $\lambda$.

(bb) The system for predicting occurrence of defective images divides image data input to the image forming apparatus into the regions of interest having the size as described in (aa). The system then calculates the power spectrum of the spatial frequency of the gradient (or lightness or luminance) distribution by means of Fourier transform with respect to each of all regions of interest, so as to determine a value PF which is a power integrated with a low-frequency band.

(b) In the system for predicting occurrence of defective images, the length of the low-frequency band $\Delta f$ selected for integrating the power in (bb) is defined based on $\lambda$ in (aa), specifically as an integral multiple of $1/\lambda$. For example, the low-frequency band $\Delta f$ is defined as $0 \leq \Delta f < A/\lambda$ or $B/\lambda \leq \Delta f < C/\lambda$, where A, B, C are integers.

A, B and C are integers that give the strongest correlation between the subjective evaluation value on the conspicuity of the density irregularity and the value PF, which are preset before the system for predicting occurrence of defective images is installed in an actual apparatus. Defining the length of the low-frequency band Δf in 1/λ increments enables suitably selecting the low-frequency band that affects the density irregularity.

(c) With regard to the processing in (bb), the Fourier transform is two-dimensional Fourier transform, and the system for predicting occurrence of defective images obtains the power spectrum of frequency components parallel to the transverse direction of the target density irregularity and integrates the obtained power for the low-frequency band Δf to determine the value PF.

(6) The subsequent process is the same as the technique described in (A). However, the value for determining whether or not the density irregularity is conspicuous (the amount of characteristic of a region of interest) is as follows.

(d) The system for predicting occurrence of defective images carries out the process in the same manner as in (A) except that it uses the value PF instead of the value F described in (A).

That is, the system carries out the process as follows:

(cc) When the value PF of a region of interest extracted in (a) is greater than a predetermined reference value, the system for predicting occurrence of defective images determines the density irregularity as inconspicuous. The system integrates the determinations on the regions of interest in (cc) so as to calculate the probability of the density irregularity being conspicuous in the image to be formed by the image forming apparatus based on the image data.

(e) As for another technique, the system for predicting occurrence of defective images carries out the following process:

(dd) With regard to the target density irregularity that is expected to appear in actual printing, the width w in the transverse direction is predetermined. When the product (PF·w) of the value PF extracted in (a) and the width w is greater than a predetermined reference value, the system determines that the density irregularity is inconspicuous, and (ee) the system integrates the determinations on the regions of interest so as to calculate the probability of the density irregularity being conspicuous in the image to be formed by the image forming apparatus based on the image data.

In this regard, when the target density irregularity has a circular shape, the system for predicting occurrence of defective images sets the width w to the diameter. When an elliptic shape, the system sets the width w to the minor axis. It should be understood well that the determination in (dd) is substantially identical to the determination that "when the reciprocal of the product of PF and w, i.e. $\{1/(PF \cdot w)\}$" is less than a predetermined reference value, the system determines the density irregularity as inconspicuous", and the determination in (dd) may be made in this way.

(f) As for yet another technique, the system for predicting occurrence of defective images carries out the following process:

(ff) With regard to the density irregularity, the system sets the full width D in the transverse direction where the lightness changes and (gg) a width d where the lightness or luminance is at its peak within the full width D, and (hh) when $\{(d/D/(PF \cdot w)\}$ is less than a predetermined reference value, the system determines the density irregularity as inconspicuous, and (ii) the system integrates the determinations in (hh) on the regions of interest so as to calculate the probability of the density irregularity being conspicuous in the image to be formed by the image forming apparatus based on the image data.

(g) When the width w in the transverse direction of the target density irregularity is less than the length of a side of the regions of interest "2×(expected observation distance)×tan (1°)" in (aa), the system for predicting occurrence of defective images uses (w/2) instead of w in the calculation of (e) or (f).

That is, when the width w in the transverse direction of the target density irregularity is equal to or greater than the value λ, the system for predicting occurrence of defective images carries out the processing of (e). When the width w is less than the value λ, and the system makes a determination as to whether the product of a half of the width w, i.e. w/2, and the value PF is greater than the predetermined reference value. If so, the system determines the density irregularity as inconspicuous. The system then calculates the probability of the density irregularity being conspicuous in the same manner. Further, when the width w in the transverse direction of the target density irregularity is equal to or greater than the value λ, the system for predicting occurrence of defective images carries out the processing of (f). When the width w is less than the value λ, the system makes a determination as to whether $\{(d/D)/(PF \cdot (w/2))\}$ is less than the predetermined reference value. Is so, the system determines the density irregularity as inconspicuous. The system then calculates the probability of the density irregularity being conspicuous in the same manner.

(7) (h) In stabilizing and adjusting, the system measures the density difference of an actually-occurring density irregularity and converts the density difference into a lightness ratio ΔL*/L* or a luminance ratio ΔY/Y. When it is equal to or greater than a predetermined value, the system corrects the imaging settings of the image forming apparatus.

(8) (i) In stabilizing and adjusting, the system measures density difference of an actually-occurring density irregularity and converts the density difference into a lightness ratio ΔL*/L* or a luminance ratio ΔY/Y. When it is less than a predetermined value, the system selects a correlation index to be used in the determinations of (cc), (dd) and (ff) based on the measurement value. The measurement may be made manually or automatically, and the measurement value is input to the system for predicting occurrence of defective images.

For this processing, the system for predicting occurrence of defective images has correlation indexes corresponding to various values of the lightness ratio ΔL*/L* of the density irregularity or the converted ratio thereof. The system selects a correlation index to be used based on the input lightness ratio ΔL*/L* or the converted ratio thereof.

(9) Instead of the density difference, the color difference ΔE*ab or ΔE00 may be measured in (h) and (i).

(10) The system for predicting occurrence of defective images makes the determinations of (cc), (dd) and (ff) on each of the regions of interest so as to calculate the probability of the density irregularity being conspicuous in the image to be formed by the image forming apparatus based on the image data.

(11) The system for predicting occurrence of defective images calculates the probability P of the density irregularity being conspicuous in the image to be formed by the image forming apparatus based on the image data, as n/N where N is the total number of the regions of interest, and n is the number of regions of interest in which the density irregularity is determined as conspicuous.

(12-1) As for another technique, the system for predicting occurrence of defective images
sets the expected probability pi of the irregularity being conspicuous to pi=0 when X−xi≤0 and sets the expected probability pi of the irregularity being conspicuous to pi=(X−xi)/X when X−xi>0, where X is the reference value used in the determination of (cc) or (dd), and xi is the amount of characteristic of the $i^{th}$ region of interest (PF in (cc), (PF·w) or (PF·(w/2)) in (dd)).

The system calculates the probability P of the density irregularity being conspicuous in the image to be formed by the image forming apparatus based on the image data, as the average (P in Mathematical Formula 1) of pi of all regions of interest, where N is the total number of regions of interest.

(12-2) As for another technique, the system for predicting occurrence of defective images sets the expected probability pi of the irregularity being conspicuous to pi=0 when X−xi≥0 and sets the expected probability pi of the irregularity being conspicuous to pi=|X−xi|/X when X−xi<0, where X is the reference value used in the determination in (gg), and xi is the amount of characteristic of the $i^{th}$ region of interest ({(d/D)/(PF·w)} or {(d/D)/(PF·(w/2))}). (It should be noted that the inequality signs are reversed in contrast to (12-1) since the PF is a reciprocal.)

The system calculates the probability P of the density irregularity being conspicuous in the image to be formed by the image forming apparatus based on the image data, as the average (P in Mathematical Formula 1) of pi of the all regions of interest, where N is the total number of the regions of interest.

(13) Carrying Out (2)

When the system for predicting occurrence of defective images determines that the probability P of the density irregularity being conspicuous is equal to or greater than the predetermined value, it displays a message recommending an inspection to a user.

(14) System for Carrying Out (3)

When the system for predicting occurrence of defective images determines that the probability P of the density irregularity being conspicuous is equal to or greater than the predetermined value, it instructs the image forming unit of the image forming apparatus to correct the setting of image forming processing in order to diminish the density irregularity.

(15) Determination of Correction Amount

The system for predicting occurrence of defective images selects a value closest to M×P as the correction amount of the processing conditions from among settable values, where M is the maximum correction amount.

(16) Processing for Different Types of Density Irregularity (j) The system for predicting occurrence of defective images performs the calculation of (6) to (12) with respect to each of two or more density irregularities that differs in the width w, so as to calculate the probability of the target density irregularities being conspicuous with respect to each of the different widths w. The system gives preference to a density irregularity having high probability of being conspicuous to instruct a correction of the setting of image forming processing.

The system for predicting occurrence of defective images performs the calculation of (6) to (12) with respect to each of two or more density irregularities that are different in at least one of the full width D and the width d, so as to calculate the probability of the target density irregularities with respect to each of the combinations of the full width D and the width d. The system gives preference to a density irregularity having high probability of being conspicuous to instruct a correction of the setting of image forming processing.

The system for predicting occurrence of defective images performs the calculation of (6) to (12) with respect to each of two or more types density irregularities that are different in at least one of the full width D, the width w and the width d so as to calculate the probability of the target density irregularities with respect to each of the combinations of the full width D, the width w and the width d. The system gives preference to a density irregularity having high probability of being conspicuous to instruct a correction of the setting of image forming processing.

(17) Carrying Out (4)

In the calculation of (5) to (12), the system for predicting occurrence of defective images calculates a subjective evaluation value on the density irregularity corresponding to the power integrated value PF with respect to each of the regions of interest and feeds it back to the density-irregularity detection system.

(18) (k) The lightness contrast caused by the density irregularity is represented by $\Delta L^*/L^*$ (or the luminance ratio $\Delta Y/Y$ of the reflection light on a sheet surface or the color difference $\Delta E^*ab$ or the color difference $\Delta E00$). The system for predicting occurrence of defective images has correlation indexes corresponding to various values of $\Delta L^*/L^*$ of the density irregularity and performs the calculation of (5) to (12) with respect to each of the correlation indexes. The system sets the threshold for the determination of the density irregularity by the density irregularity detections system to the value of $\Delta L^*/L^*$ of a correlation index that is selected when the probability of the density irregularity being conspicuous is equal to or greater than the predetermined value.

(19) The system for predicting occurrence of defective images performs the processing described in (A) when the width in the transverse direction and the width in the longitudinal direction of the target density irregularity are both less than the value λ.

The width in the transverse direction and the width in the longitudinal direction both refer to the diameter when the target density irregularity has a circular shape and to respectively the minor axis and the major axis when the target density irregularity has an elliptic shape.

(20) (m) The determination as to whether the width in the transverse direction and the width in the longitudinal direction of the density irregularity are both less than the value λ may be made manually.

(21) (n) The determination as to whether the width in the transverse direction and the width in the longitudinal direction of the density irregularity are both less than the value λ may be made automatically based on the result of automatic detection of the density irregularity.

(22) (o) The shape of the target density irregularity may be manually set by a user (a user of the image forming apparatus or a technician for maintenance).

(23) (p) The shape of the target density irregularity may be automatically detected by the density-irregularity detection system.

The above-described techniques have the following advantageous effects.

Incorporating the technique of (7) can eliminate the time required for the analysis in the system for predicting occurrence of defective images when the level of the density irregularity is clearly out of the acceptable range.

The technique of (5) and (6) is to determine the values PF as the amounts of characteristic required, which are calculated by Fourier transform on the images of the regions of interest having a standardized size regardless of the size of the density irregularity.

In contrast, the technique of (A) is to determine the values F and requires performing Fourier transform on regions of interest having a variable size that is changed according to the size of the expected density irregularity, which requires a longer processing time.

That is, the technique of (5) and (6) can reduce the processing time.

The advantageous effects of (19) are as follows.

The technique of (1) to (18) of the system is particularly suitable for density irregularities that appear in the shape of a band or a stripe.

In contrast, when the width of the target density irregularity is short both in the transverse and longitudinal directions as described in (19), the shape can be closer to a circular shape rather than a band or stripe shape.

In such cases, the technique of (A), which uses a visibility prediction model based on the visibility evaluation value of a circular density irregularity, sometimes has higher accuracy of predicting defective images than the present system of (1) to (18).

The technique of (A) requires changing the size of the regions of interest according to the size of the expected density irregularity in the analysis of an input image. When two or more types of density irregularities with different sizes are expected, it requires to repeat the process of dividing the input image into sections and performing Fourier transform on the sections multiple times corresponding to the number of types of the density irregularities. In contrast, the system of (1) to (18) can always suppress the number of the processing to one or less since the size of the regions of interest is standardized.

The prediction accuracy as high as the technique of (A) was achieved by representing the amount of characteristic of the expected density irregularity by the width w of the density irregularity and the index d/D indicating the distinctness of the lightness change and introducing it to the correlation formula for calculating the probability of the density irregularity being conspicuous.

EXAMPLES AND COMPARATIVE EXAMPLES

Example B

The experimental procedure for determining the integers A, B and C in (b) will be described.

SUMMARY

An experiment is carried out in such a way that subjects evaluate the visibility of a density irregularity.

The correlation between the subjective evaluation value of the visibility and the amount of characteristic of original image data of the image used in the experiment (image without the density irregularity) is determined. The integers A, B and C that maximize the correlation are determined, and the above-described Δf is determined accordingly.

Detailed Conditions

Under the following conditions, an image having a dotted density irregularity was printed and presented to the subjects. Each subject was asked to report the conspicuity of the density irregularity by the "impression rank".

The reported impression rank was used as the subjective evaluation value of the visibility of the density irregularity.

The specific values and the like in the following description are examples that have been confirmed as suitable conditions for applying the present invention. The specific conditions may be changed as long as the correlation between the subjective evaluation value of the visibility of the density irregularity and the PF (described later) can be obtained.

Example Conditions of Observation by Subjects

Experimental environment where the image was presented: in a light booth

Observation distance: 850 mm

Subjects: 12 persons with no visual impairment

Characteristics of Test Image to be Presented to Subjects

An image of a natural scene with a single type of density irregularity is presented.

Output device: PX-H10000 of Seiko Epson Corp.

Controller: FALBARD AQUA

Output sheet: FA Proof coat (in presenting the image, a test image was put on four stacked sheets of J paper as an underlay)

Image size: 300 mm×300 mm

Color: Full color

Type of a background image: natural-scene image

Shape of the density irregularity: 18 types of belt-like density irregularities (see FIG. 32 to FIG. 34), all of which were horizontal bands or stripes (Circular density irregularities may be further added.)

FIG. 32 illustrates the indexes (d/D, w) respectively indicating the distinctness of the density irregularity and the width used in the experiment.

When a density irregularity occurs in an image with uniform density (which is the same as the case in which the density irregularity is intentionally produced), the distinctness of the edge of the density irregularity is represented by d/D, where D is the full width where the lightness changes in the lightness distribution in the transverse direction of the density irregularity, and d is the width where the changing lightness is at its peak.

The edge of the density irregularity is defined as the location at which the variation of lightness is 50% (i.e. $\Delta L^*/2$) (the variation of lightness $\Delta L^*$ at the peak being 100%). The edge of the density irregularity is assumed to appear only as a pair of lines around the density irregularity itself, and the width w of the density irregularity is defined as the distance between the edge lines mutually opposed in the transverse direction of the density irregularity.

Conditions of Measuring Lightness Contrast of Density Irregularity

When a density irregularity occurs in an image having uniform density of $L^*=50\pm10$, the lightness distribution in the transverse direction of the density irregularity is illustrated as in FIG. 33. The lightness difference of the density irregularity is represented as $\Delta L^*/L^* = |L^*1 - L^*2|/L^*2$, where $L^*1$ is the lightness of the "peak area" in FIG. 33, and $L^*2$ is the average lightness in the "peripheral areas" in FIG. 33.

Conditions of Subjective Evaluation of Visibility

First, the subjects look for a density irregularity that occurs in a presented natural-scene image.

Upon understanding the correct position of the density irregularity, the subjects evaluate the conspicuity thereof subjectively by a magnitude evaluation method.

The subjective evaluation value on the conspicuity of the density irregularity obtained by the magnitude evaluation method is a value rated in accordance with the following criteria by the subjects observing the density irregularity. Such a value is referred to as an "impression rank" in this description.

TABLE 7

| IMPRESSION RANK | CRITERION FOR DETERMINATION |
|---|---|
| 0 | UNRECOGNIZABLE AS IRREGULARITY |
| 1 | RECOGNIZABLE AS IRREGULARITY BUT UNNOTICEABLE (INCONSPICUOUS) |
| 2 | RATHER NOTICEABLE |
| 3 | NOTICEABLE |
| 4 | VERY NOTICEABLE |

The impression rank may be rated in 0.1 increments.

The subjects are allowed to use an impression rank of more than 4 when he/she finds a density irregularity that is "noticeable" to a greater extent after an evaluation as rank 4.

Figure 35A:
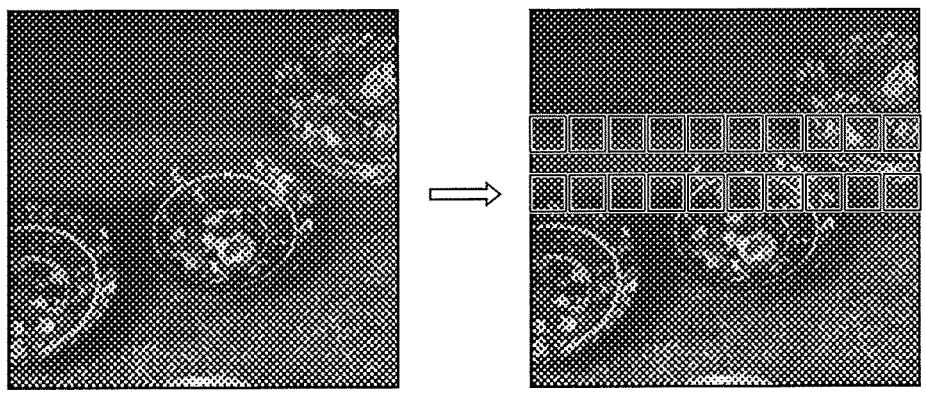
FIG. 35A illustrates dividing a test image into grid sections with the center at the edge of a density irregularity according to Example B of the present invention.

Calculation Method of PF Corresponding to Measured Subjective Evaluation Value, Method of Determining $\Delta f$ (1) A test image is divided into grid sections each having a side corresponding to a view angle of 2° and including the edge of the lightness change caused by the density irregularity at the center (FIG. 35A).

Figure 35B:
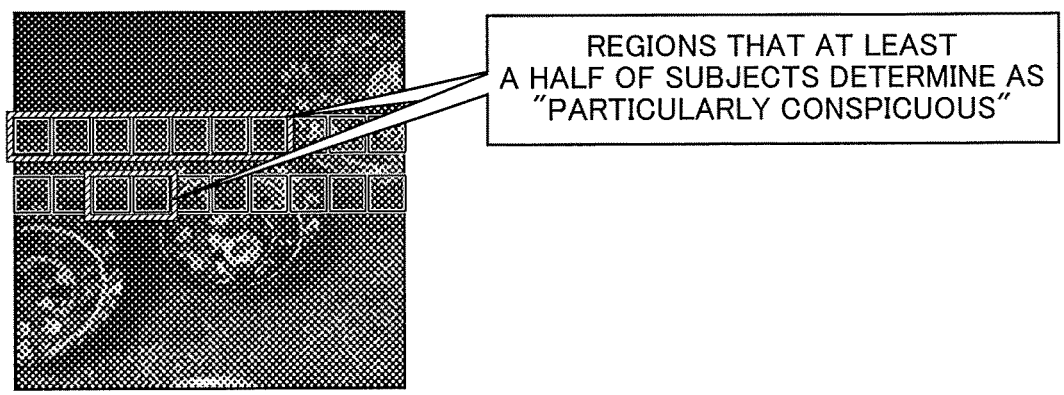
FIG. 35B illustrates selecting sections that include an edge portion determined as "particularly conspicuous"

(2) With respect to each of the test images used in the experiment, regions that at least a half of the subjects determine as "particularly conspicuous" are recorded Of the sections obtained in (1), sections that includes the edge determined as "particularly conspicuous" are selected as "regions of interest" (FIG. 35B).

The total number of edges included in the selected regions of interest is referred to as N (N=9 in FIG. 35B).

In this step, the edge of a horizontal band irregularity appears as vertically adjacent two lines. When the width w of the band irregularity is narrow, the vertically adjacent sections in (1) may sometimes overlap each other. (This is the case in which the width w of the density irregularity is less than a length corresponding to a view angle of 2°.)

Even when the sections overlap each other, the image is basically divided into grid sections with the center at the edge as described in (1).

However, when the width w of the density irregularity is less than a length corresponding to a view angle of 2°, the dividing sections may be arranged such that the peak of the density change comes at the center.

In this case, the total number N of edges that are included in the selected "regions of interest", which are the regions determined as "particularly conspicuous" by the subjects, is N=(the number of sections selected as the regions of interest)×2.

Figure 36:
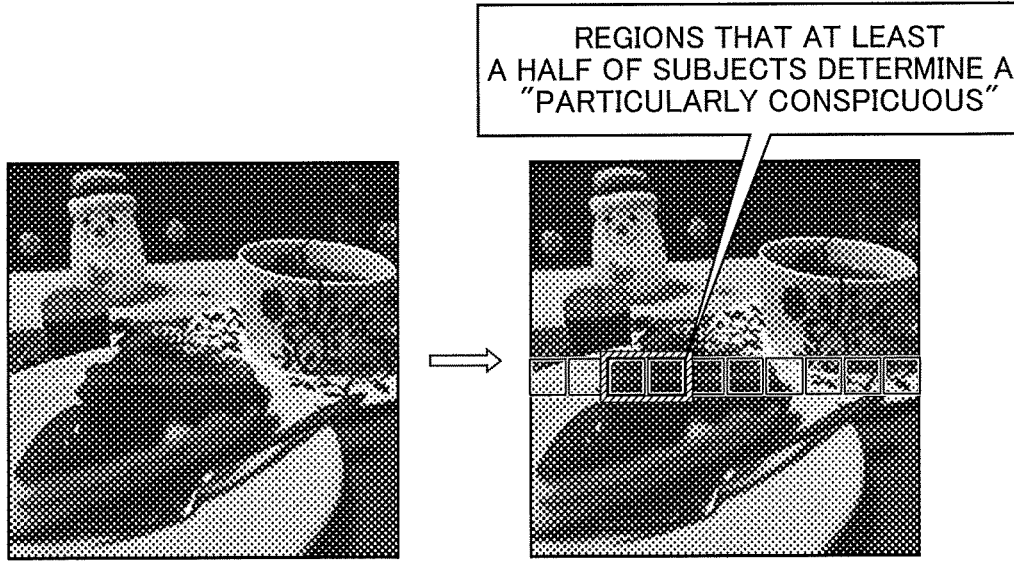
FIG. 36 illustrates dividing another test image into grid sections with the center at the edge of a density irregularity according to Example B of the present invention.

In the example of FIG. 36, the number of selected regions of interest is two, and the total number N of the edges included in the regions of interest is four.

Figure 37:
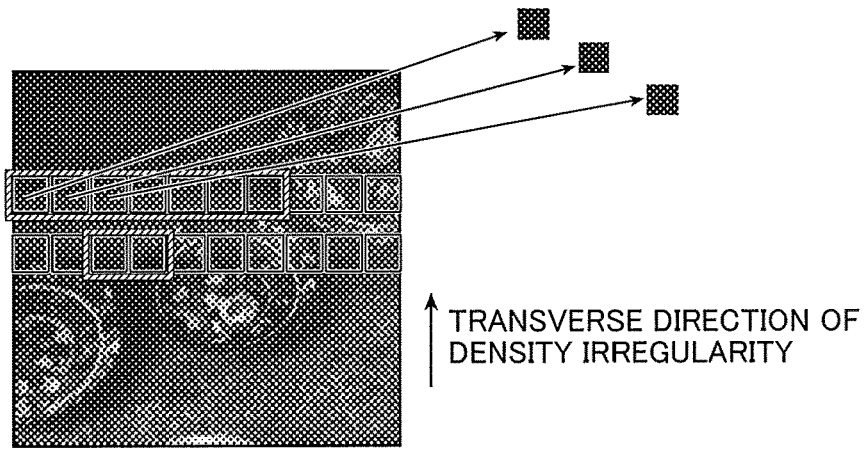
FIG. 37 illustrates extracting selected sections according to Example B of the present invention.

(3) From original image data having no density irregularity, the same regions of interest as those selected in (2) are extracted according to the grid determined in (1) having a side corresponding to a view angle of 2° (FIG. 37). In the example of FIG. 37, nine regions are extracted in total.

Figure 38:
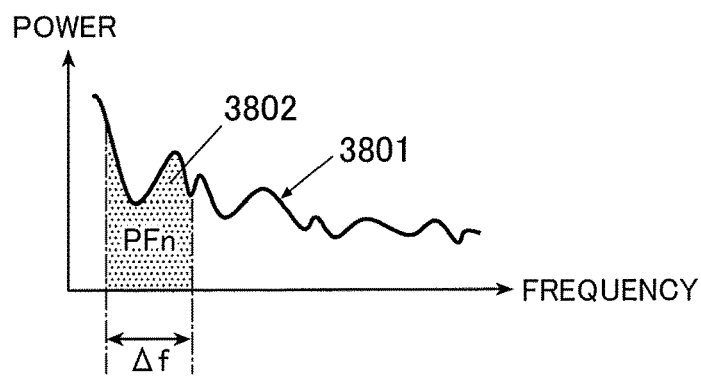
FIG. 38 is a graph illustrating an example of the calculated power spectrum of the spatial frequency of a lightness distribution and a domain of integration according to Example B of the present invention.

(4) Fourier transform is performed on each of the images of interest extracted in (3) so that the power spectrum of the spatial frequency of the lightness distribution is obtained (FIG. 38, 3801).

In this step, the power spectrum may be extracted only in the direction parallel to the transverse direction of the density irregularity. This can improve the accuracy of the present invention for band density irregularities.

(5) The power spectrums obtained in (4), which correspond to the respective images of interest extracted in (3), are integrated for the low-frequency band (FIG. 38, 3802).

The frequency band $\Delta f$ of the integration is defined as $0 \leq \Delta f < A/\lambda$ or $B/\lambda \leq \Delta f < C/\lambda$, where A, B, C are integers.

In the equations, $\lambda$ is the length corresponding to a view angle of 2° in the present experimental conditions. That is, in the present example, $\lambda = 2 \times$(observation distance)$\times \tan(1°) = 2 \times 850 \times \tan(1°)$ (mm).

In this step, A, B and C are arbitral values.

The integrated value obtained by the integration of the $n^{th}$ image of interest is referred to as PFn (FIG. 38, 3802).

(6) The average of all PFn is the amount of characteristic of the image.

(7) The calculation in (1) to (6) are carried out on all density irregularities in the test images used in the experiment, and respective PF are obtained.

Figure 39:
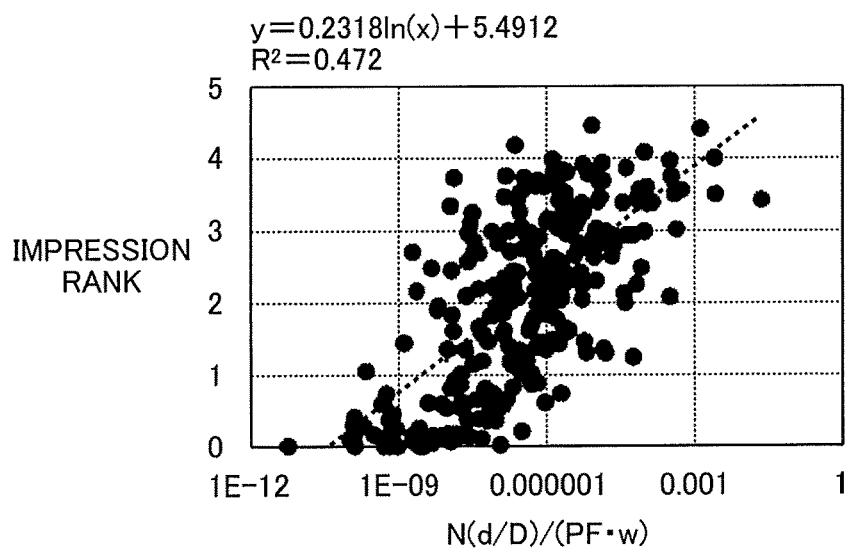
FIG. 39 is a correlation graph illustrating the relationship between the "impression rank" (subjective evaluation values on the visibility of density irregularity) and N·(d/D)/(PF·w) of a test image according to Example B of the present invention.

(8) The relationship between "impression rank" (the subjective evaluation value of the visibility of a density irregularity) and $N \cdot (d/D)/(PF \cdot w)$, which are obtained from the test images, are plotted as a correlation graph (FIG. 39).

(9) The integers A, B and C in (5) are selected to maximize the correlation coefficient of the correlation graph obtained in (8) (e.g. FIG. 39).

FIG. 39 is an example in which the zone $B/\lambda \leq \Delta f \leq C/\lambda$ is selected, and B and C are set to B=9 and C=20, i.e. $9/\lambda \leq \Delta f < 20/\lambda$.

Example B0

The following correlation formula is used as a common condition of the following Example B1 to B3 for the determination of the predicted conspicuity of the density irregularity.

First, the above-described Experiment A was carried out so that $\Delta f$ for calculating PF was determined, and the PF of respective images were calculated accordingly.

Then, the level of the density irregularity used in Experiment A was represented by the lightness contrast $\Delta L^*/L^*$ of the density irregularity that is measured in an image with a uniform density of $L^*=50$. The level was graded into ranges of $\Delta L^*/L^*$ of "less than 0.07", "0.07 to less than 0.15" and "0.15 or more", and the correlation formulae of the impression rank and $N \cdot x$ were obtained for the respective ranges, which were (impression rank)=(constant)×ln(N·x)+(constant), i.e. (impression rank)=(constant)×ln(N·(d/D)/(PF·w))+(constant), where x=(d/D)/(PF·w).

The formula with N=1, i.e. (impression rank)=(constant)×ln(x)+(constant), is used for the determination of the predicted conspicuity of the density irregularity.

However, when $\Delta L^*/L^*$ is equal to or greater than 0.15, t some feedback is given to the image forming apparatus without making the determination.

The final formulae obtained in the present example for the determination of the predicted conspicuity of the density irregularity are as follows.

When $0 \leq \Delta L^*/L^* < 0.07$, (impression rank)=0.2094 ln(x)+5.3334

When $0.07 \leq \Delta L^*/L^* < 0.15$, (impression rank)=0.256 ln(x)+6.3968

When the impression rank is greater than 1, the lightness density irregularity is determined as "conspicuous".

Example B1

In Example B1, the system for predicting occurrence of defective images is installed to an electrophotographic image forming apparatus, a sleeve-cyclic density irregularity that occurs due to deflection of a developing sleeve is selected as the target density irregularity, and the probability of the target density irregularity being conspicuous is calculated by means of the system for predicting occurrence of defective images.

Figure 40:
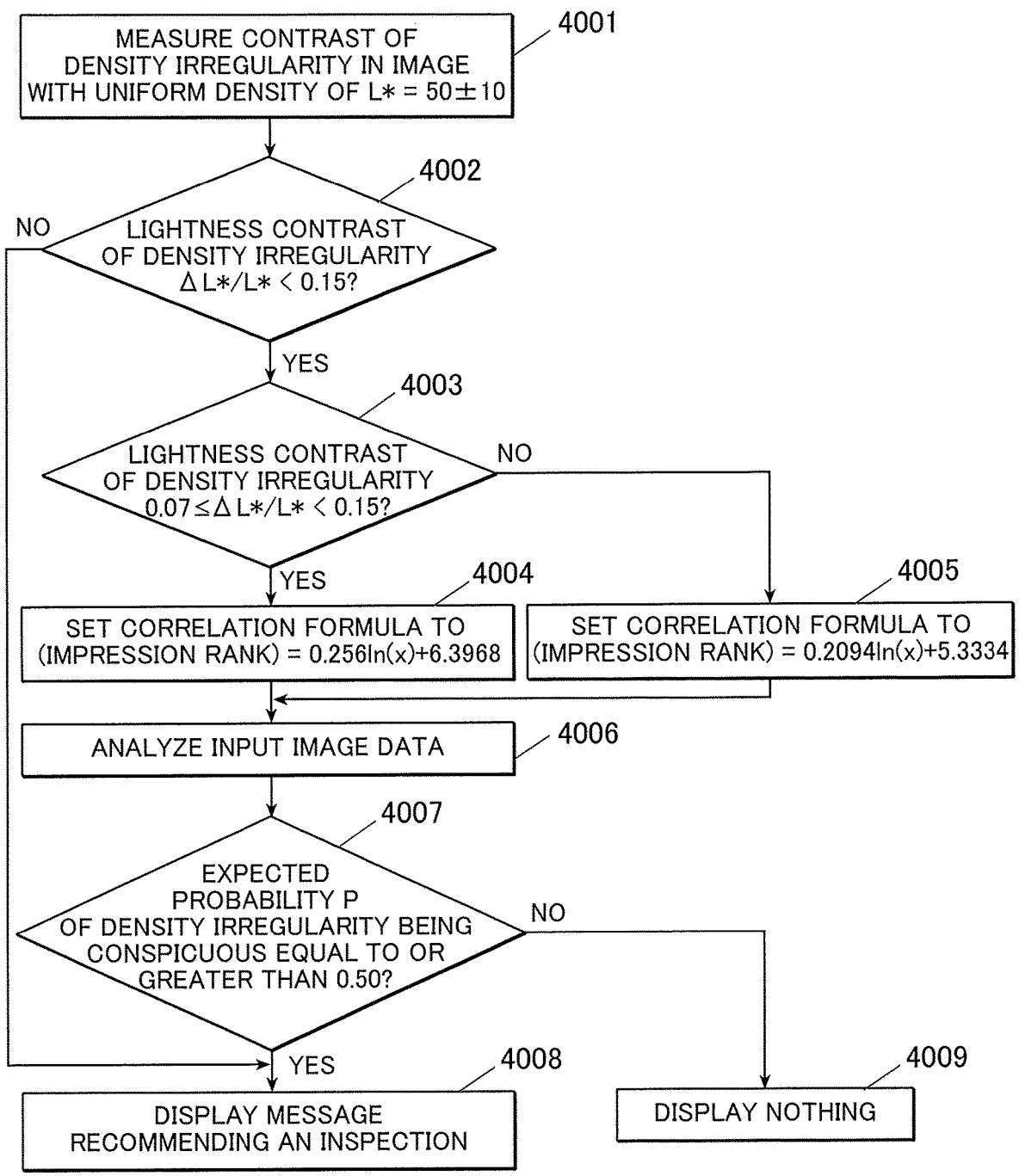
FIG. 40 is a flowchart of a control flow of displaying a message recommending an inspection according to Example B1 of the present invention.

Further, when the system for predicting occurrence of defective images determines that the probability of the density irregularity being conspicuous is equal to or greater than a predetermined value, it performs processing to display a message recommending an inspection to a user. The control flow of displaying the message recommending an inspection is illustrated in FIG. 40 (4001 to 4009).

Method for Calculating Expected Probability of Density Irregularity being Conspicuous
Conditions Conditions of target density irregularity: developing sleeve-cyclic irregularity d: 1 mm
D: 44 mm
w: view angle=4.2° (the view angle when 22 mm is observed at an observation distance of 300 mm)
(w represents a view angle in the present example.)
Observation distance: 300 mm
λ: 2×300×tan(1°)=10.47304

Procedures

A square having a side of 2=10.47 mm is extracted from input image data.

Figure 41:
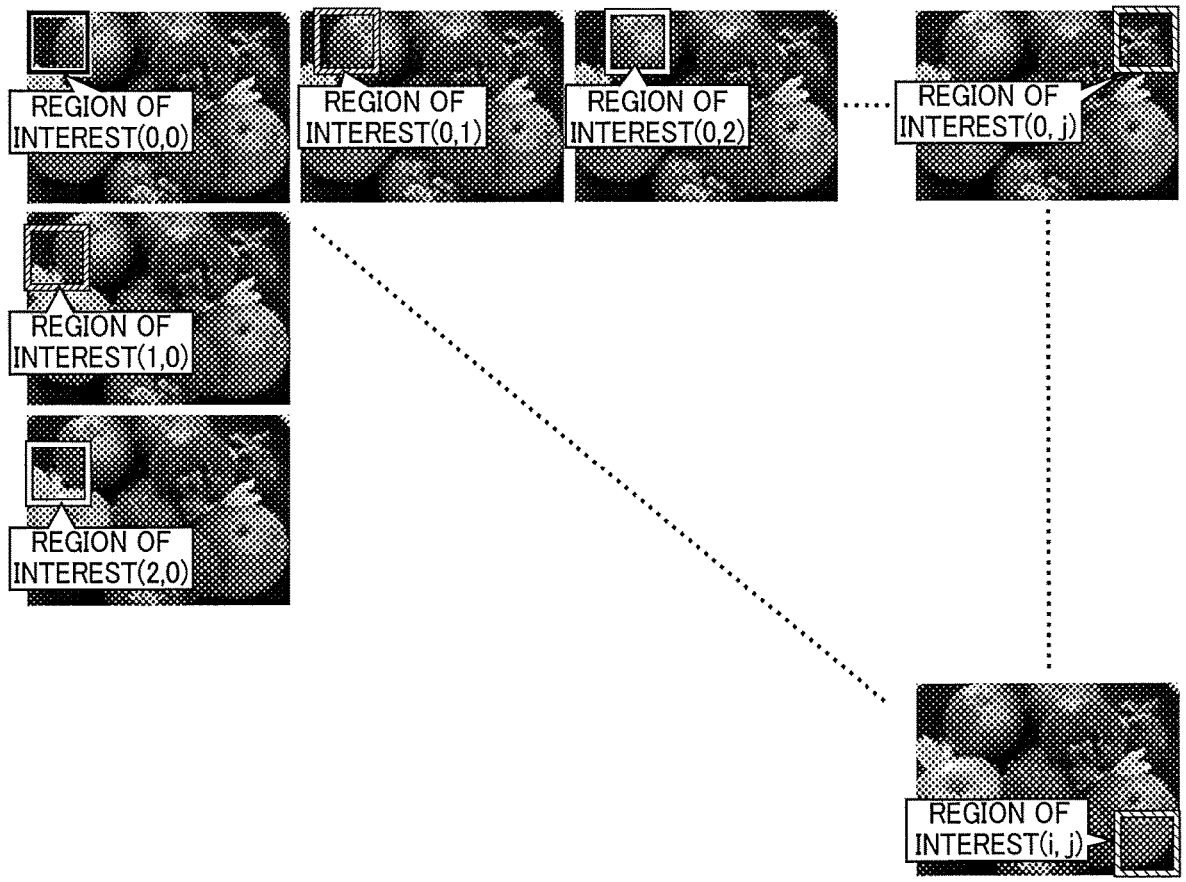
FIG. 41 illustrates the configuration of regions of interest of an input image according to Example B1 of the present invention.

The obtained square is referred to as a region of interest. A regions of interest to be obtained is then shifted by 1 px as illustrated in FIG. 41.

Then, two-dimensional Fourier transform is performed on the lightness distribution of the image of each region of interest so that the power spectrum of the spatial frequency of the lightness distribution is obtained. The power spectrum thus obtained is integrated for the range of the frequency band $\Delta f$ ($9/\lambda \leq \Delta f < 20/\lambda$) to give PF of the region of interest.

The value of PF when the impression rank is 1 is referred to as PF(1), and PF(1) was calculated using the formula in Example B0 and FIG. 40 (4004, 4005).

Figure 42:
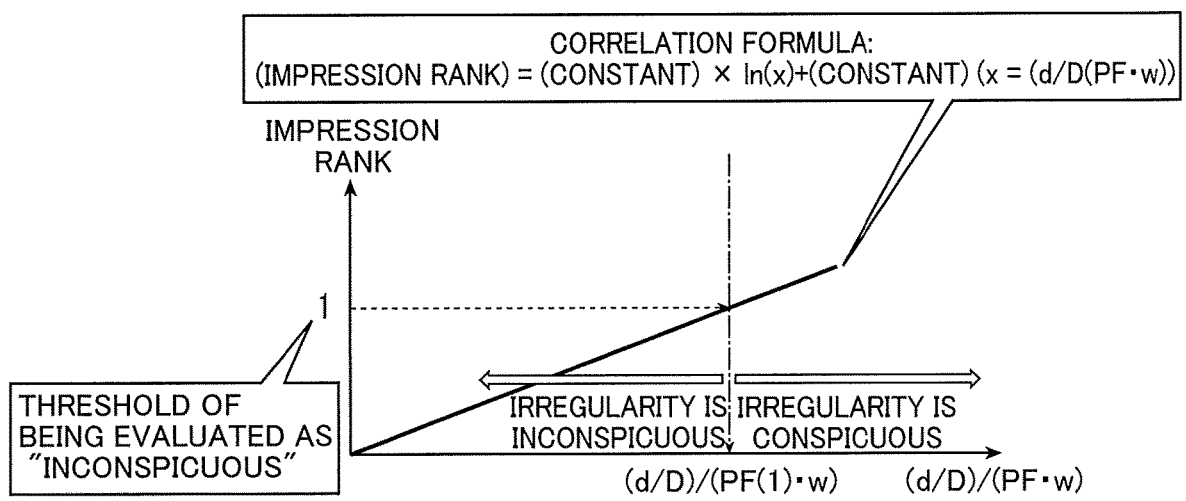
FIG. 42 is a graph illustrating the correlation between analysis result "(d/D)/(PF·W)" and "impression rank" according to Example B1 of the present invention.

The amounts of characteristic d, D and w of the target density irregularity and the value of PF obtained by the above-described procedure are substituted into x=(d/D)/(PF·w), and a determination as illustrated in FIG. 42 is made.

When (d/D)/(PF(1)·w)<(d/D)/(PF·w), it is determined that "the irregularity is conspicuous".

When (d/D)/(PF·w)≤(d/D)/(PF(1)·w), it is determined that "the irregularity is inconspicuous".

The expected probability P of the density irregularity being conspicuous when the input image is output is calculated as n/N, where n is the number of regions of interest in which the density irregularity is determined as conspicuous, and N is the total number of regions of interest. As illustrated in FIG. 40, when the probability P is equal to or greater than 0.50, the message recommending an inspection is displayed.

Example B2

In Example B2, the system for predicting occurrence of defective images is installed to an electrophotographic image forming apparatus, a sleeve-cyclic density irregularity that occurs due to deflection of a developing sleeve is selected as the target density irregularity, and the probability of the target density irregularity being conspicuous is calculated by means of the system for predicting occurrence of defective images.

Figure 43:
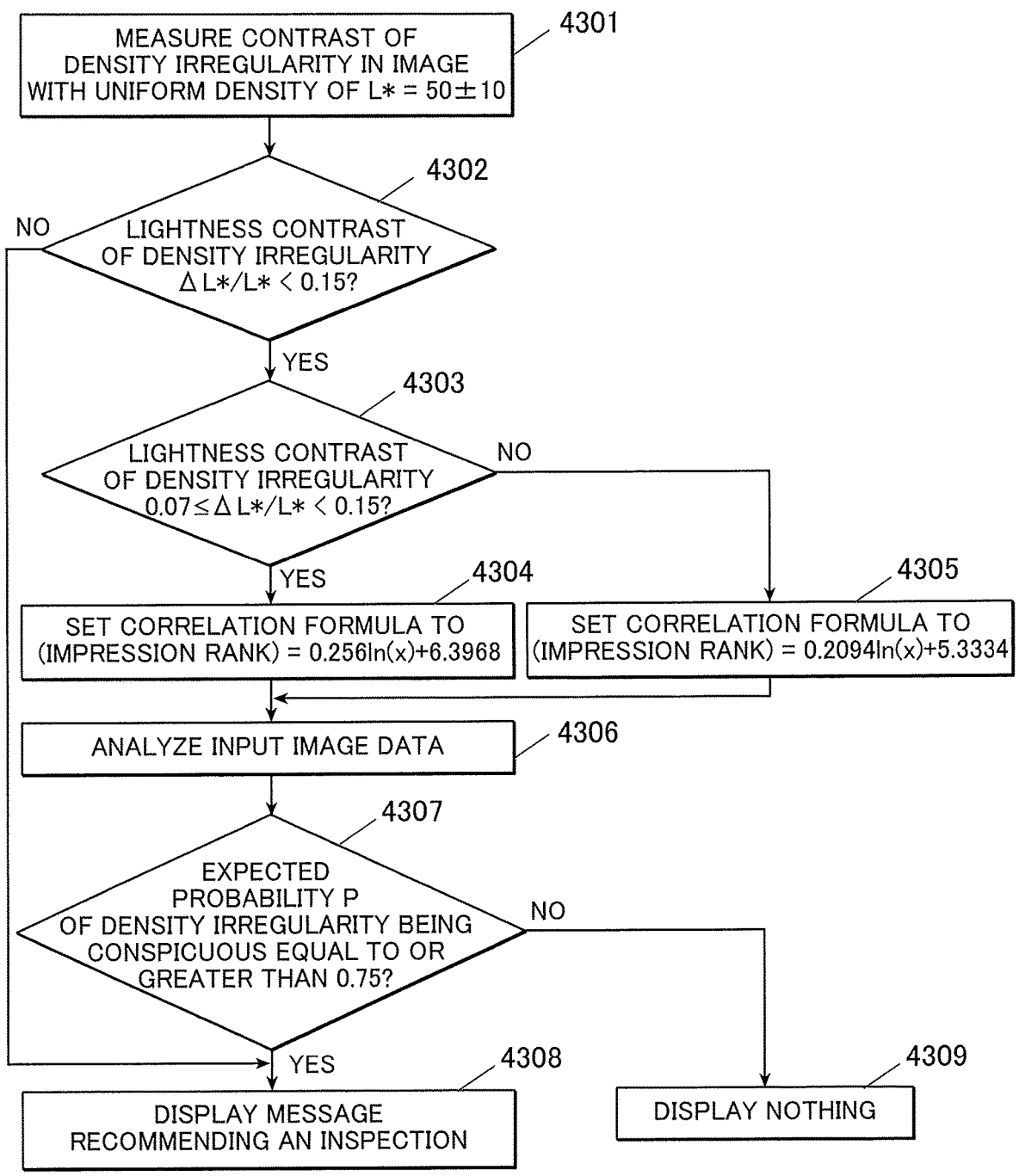
FIG. 43 is a flowchart of a control flow of displaying a message recommending an inspection according to Example B2 of the present invention.

Further, when the system for predicting occurrence of defective images determines that the probability of the density irregularity being conspicuous is equal to or greater than a predetermined value, a message recommending an inspection is displayed to a user. The control flow of displaying the message recommending an inspection is illustrated in FIG. 43 (4301 to 4309).

Figure 44:
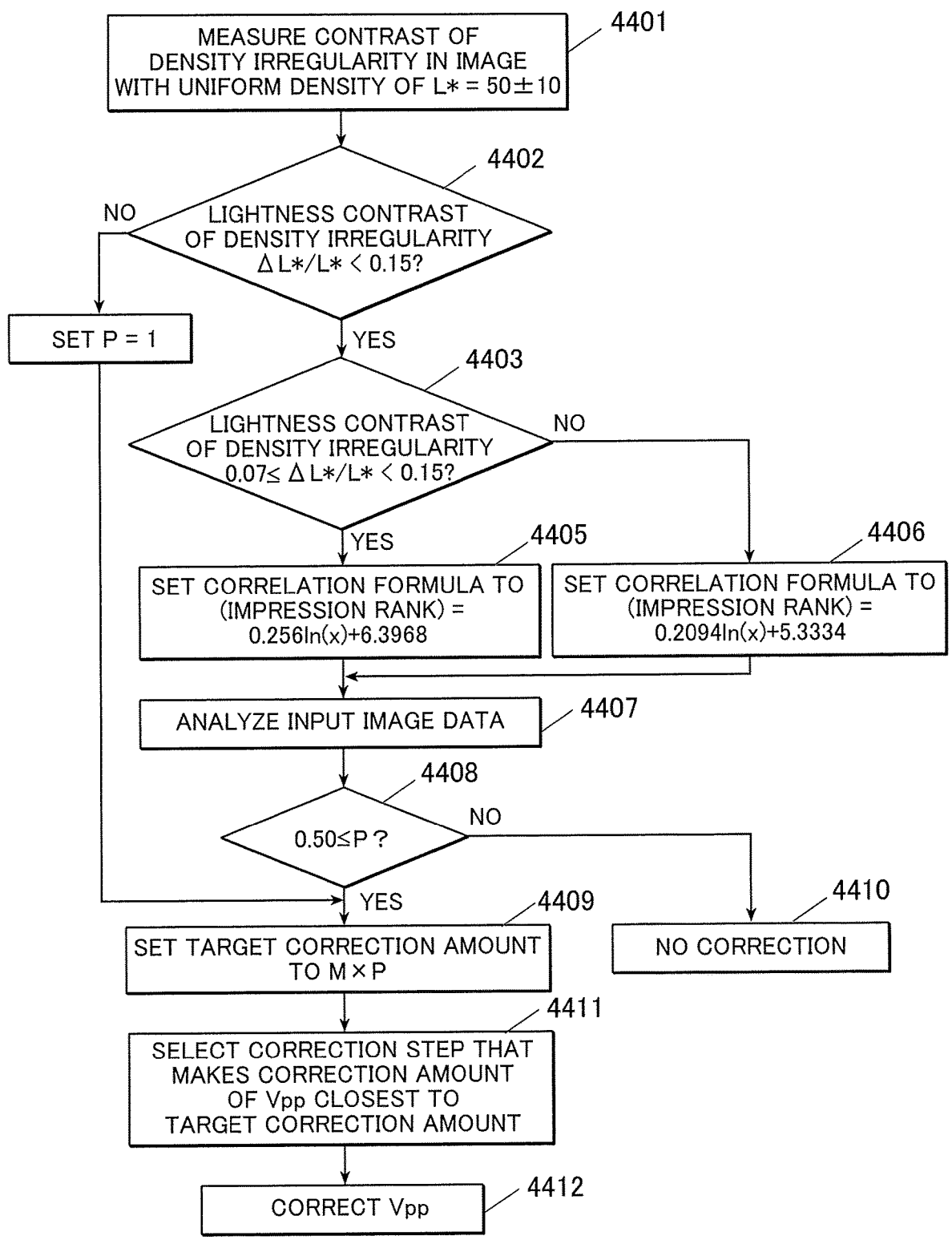
FIG. 44 is a flowchart of correcting developing conditions according to the expected probability of a density irregularity being conspicuous according to Example B2 of the present invention.

Further, when the system for predicting occurrence of defective images determines that the probability of the density irregularity being conspicuous is equal to or greater than a predetermined value, it performs processing to instruct the image forming unit of the image forming apparatus to correct the setting of image forming processing in order to reduce the density irregularity. The flow of correcting the developing conditions according to the expected probability of the density irregularity being conspicuous is illustrated in FIG. 44 (4401 to 4409).

Definition of Terms

Vpp: the peak value of the developing AC bias
P: the expected probability of a density irregularity being conspicuous
M: the maximum correction amount of Vpp Method for Calculating Expected Probability of Density Irregularity being Conspicuous
Conditions Same as in Example 1.

Procedures

The procedure to determine the integrated values PF of the power spectrums is the same as in Example B1.

After the power integrated values PF are determined, the expected probability of the irregularity being conspicuous is calculated in the following procedure.

Figure 45:
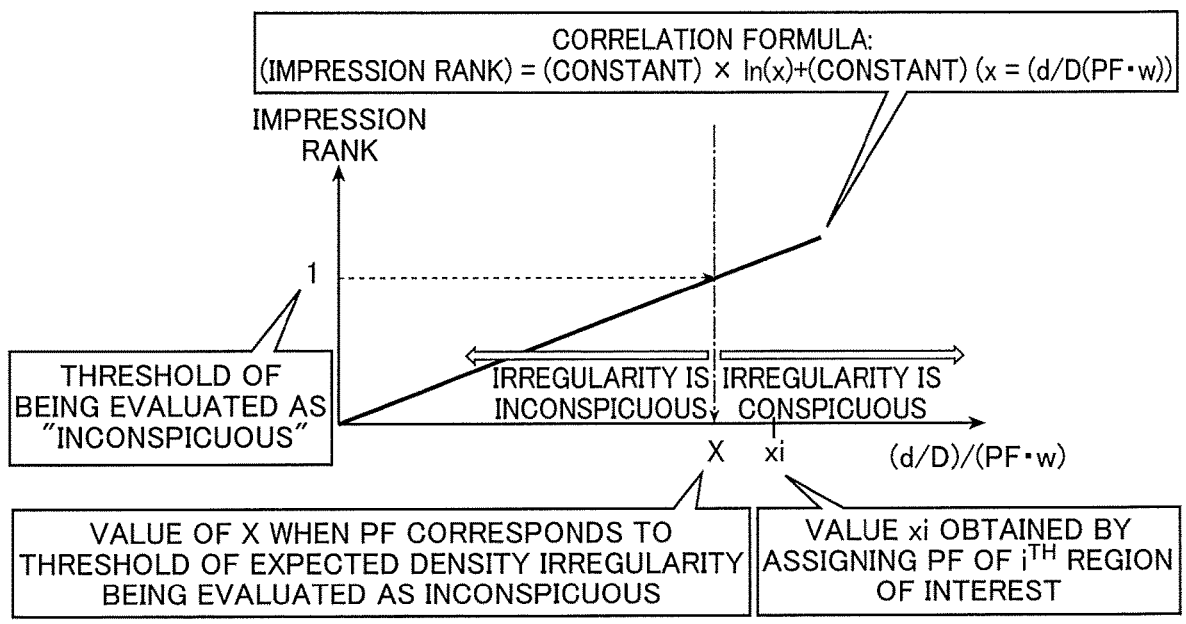
FIG. 45 is a graph illustrating the correlation between analysis result "(d/D)/(PF·w)" and "impression rank" according to Example B2 of the present invention, which is given in order to describe the procedure of calculating the expected probability of the density irregularity being conspicuous.

First, the value $x_i$ of x is obtained from the power integrated value PF of the $i^{th}$ region of interest, and the value X of x when the expected target density irregularity is at an impression rank of 1 is obtained (FIG. 45).

When $X-x_i \geq 0$, the expected probability $p_i$ of the irregularity being conspicuous is set to $p_i=0$.

When $X-x_i < 0$, the expected probability $p_i$ of the irregularity being conspicuous is set to $p_i = |X-x_i|/\lambda$.

The expected probability P of the irregularity being conspicuous is calculated as the average of $p_i$ (Mathematical Formula 1), where $p_i$ is a set of size N, and N is the total number of regions of interest in the entire input image.

Method for Determining Correction Value of Developing Ac Bias
Conditions

Table 8 shows a correction table of the peak value (Vpp) of the AC bias.

TABLE 8

| CORRECTION STEP | 0 | +1 | +2 | +3 |
|---|---|---|---|---|
| CORRECTION AMOUNT | 0 | +100 | +200 | +300 |
| Vpp (V) | 880 | 980 | 1080 | 1180 |
| REMARKS | NO CORRECTION | >>>EFFECTIVE FOR SLEEVE-CYCLIC DENSITY IRREGULARITY | | |

Maximum correction amount: M = 300 (V)

Procedures

The expected probability of the irregularity being conspicuous was calculated by the above-described method, which was referred to as P.

A target value of the correction amount of Vpp was set to M×P.

In the correction table of Vpp, a correction value closest to M×P was selected.

Table 9 shows four cases according to this procedure.

TABLE 9

| EXPECTED PROBABILITY P | 0.24 | 0.8 | 0.45 | 0.87 |
|---|---|---|---|---|
| M × P | 72 | 240 | 135 | 261 |
| CORRECTION STEP | +1 | +2 | +1 | +3 |
| CORRECTION AMOUNT (V) | 100 | 200 | 100 | 300 |
| CORRECTED Vpp (V) | 980 | 1080 | 980 | 1180 |

Example B3

In Example B3, the system for predicting occurrence of defective images is installed to an electrophotographic image forming apparatus, the following two types of density irregularities that are in trade-off relationship are selected as the target density irregularity, and the probability of the target density irregularities being conspicuous is calculated by means of the system for predicting occurrence of defective images.

One is a development-cyclic density irregularity which occurs due to deflection of the developing sleeve, and the other is a circular density irregularity referred to as a "firefly" attributing to carrier adhesion.

Figure 46:
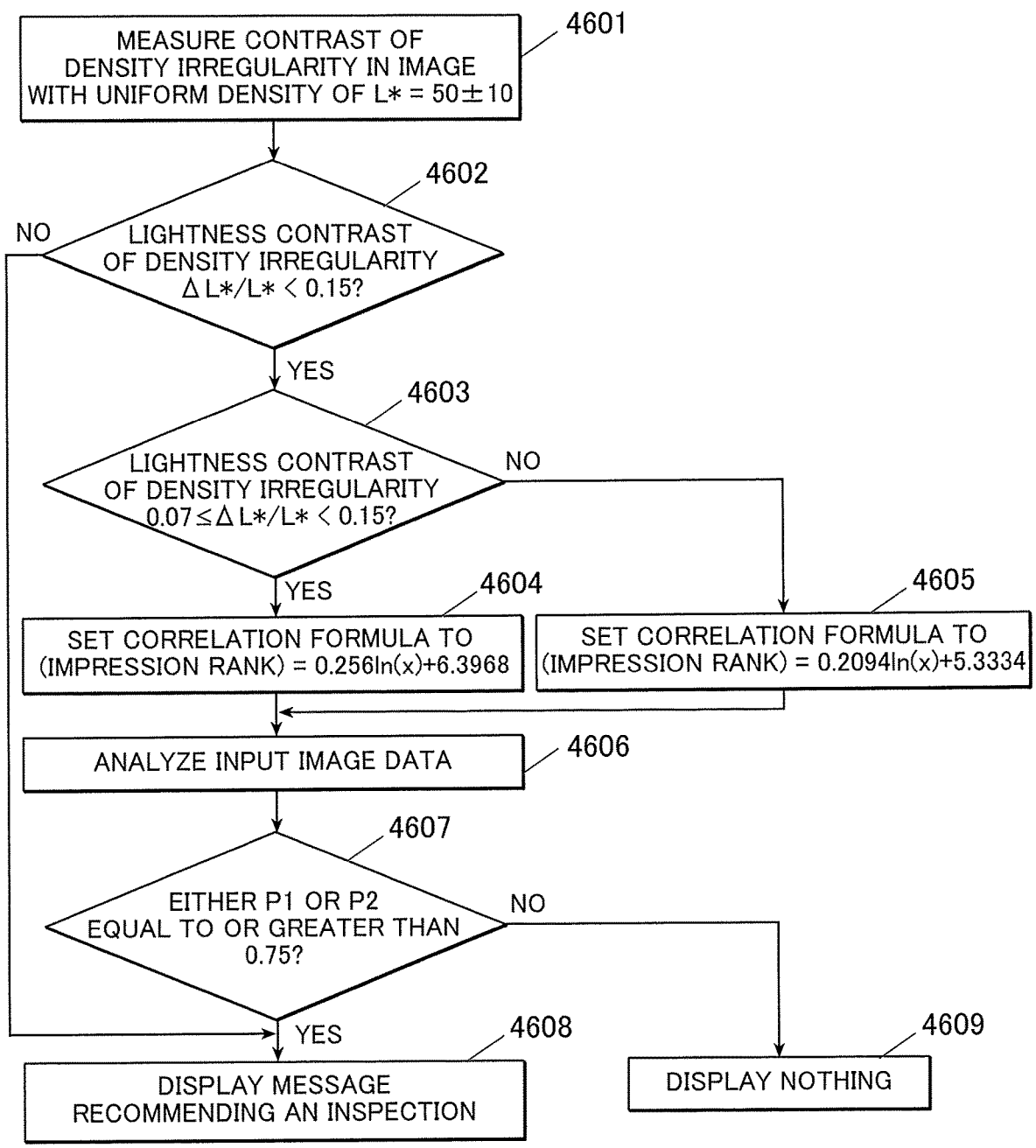
FIG. 46 is a flowchart illustrating a control flow of displaying a message recommending an inspection according to Example B3 of the present invention.

Further, when the system for predicting occurrence of defective images determines that the probability of the density irregularities being conspicuous is equal to or greater than a predetermined value, it performs processing to display a message recommending an inspection to a user. The control flow of displaying the message recommending an inspection is illustrated in FIG. 46 (4601 to 4609).

Figure 47:
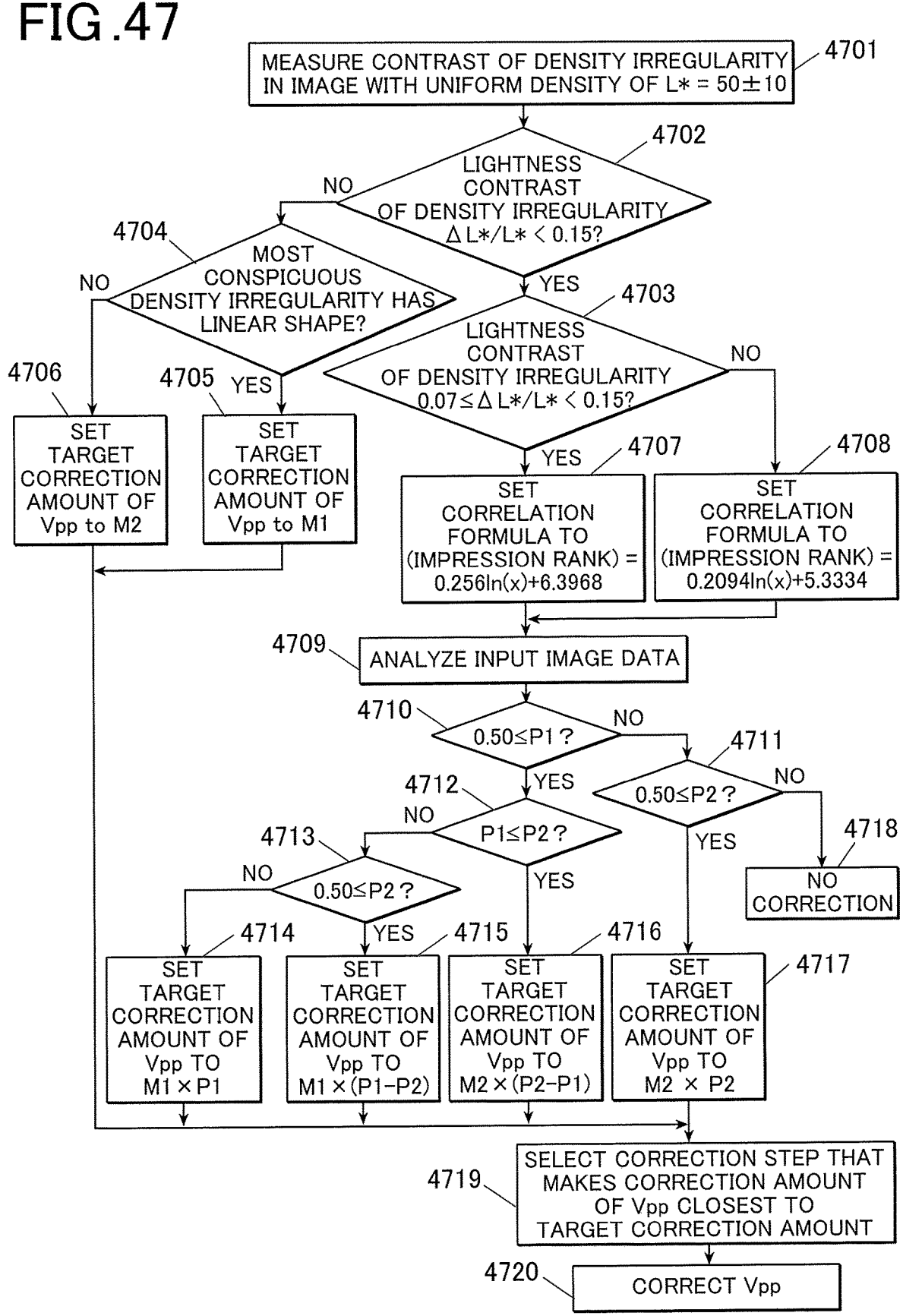
FIG. 47 is a flowchart of correcting developing conditions according to the expected probability of a density irregularity being conspicuous according to Example B3 of the present invention.

Further, the system for predicting occurrence of defective images calculates the probability of the density irregularities being conspicuous with respect to each of the widths w of the target density irregularities that are the above-described two types of density irregularities with different widths w. The system gives preference to a density irregularity having higher probability of being conspicuous to perform processing to instruct correction of the setting of image forming processing. FIG. 47 illustrates a flow of correcting the developing conditions according to the expected probability of the density irregularities being conspicuous (4701 to 4720).

Definition of Terms

Vpp: the peak value of the developing AC bias

Irregularity 1: a development-cyclic density irregularity which occurs due to deflection of the developing sleeve Irregularity 2: a circular density irregularity referred to as a "firefly" attributing to carrier adhesion P1: the expected probability of the irregularity 1 being conspicuous P2: the expected probability of the irregularity 2 being conspicuous M1: a correction amount of Vpp when a correction width becomes the maximum positive value M2: the correction amount of Vpp when the correction width becomes the maximum negative value Method for Calculating Expected Probability of Density Irregularity being Conspicuous The same method as in Example B2 was applied to the developing sleeve-cyclic density irregularity and the firefly.

The conditions of the target two types of density irregularities are as follows.

Conditions

Observation Distance: 300 mm $\lambda$: $2 \times 300 \times \tan(1°) = 10.47304$ ($\lambda = 2 \times$ (observation distance) $\times \tan(1°)$)

Table 10 shows the conditions of the target density irregularities.

TABLE 10

| DEVELOPING SLEEVE-CYCLIC IRREGULARITY | | FIREFLY | |
|---|---|---|---|
| D | 1 mm | D | 0.5 mm |
| D | 44 mm | D | 1 mm |
| w | VIEW ANGLE = 4.2° | w | VIEW ANGLE = 1° × (½) * |

* In this case, the value w of the firefly is set to ½ of the actual width of 0.5 mm, i.e. 0.5/2 mm, since the width of density irregularity called firefly is less than $\lambda$.

Figure 48A:
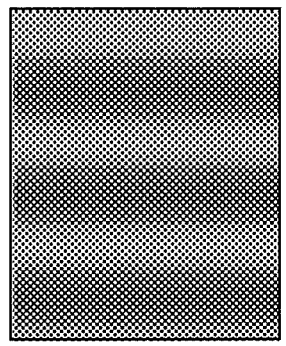
FIG. 48A illustrates an example of developing sleeve-cyclic irregularities.
Figure 48B:
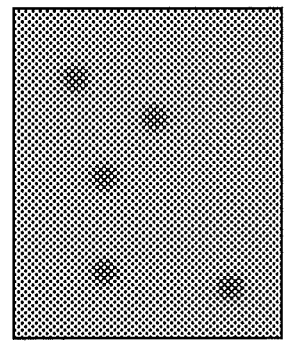
FIG. 48B illustrates an example of fireflies.

For a reference, FIG. 48A illustrates the visual appearance of a developing sleeve-cyclic density irregularities, and FIG. 48B illustrates the visual appearance of "fireflies" The fireflies appear in a circular shape with 1 mm diameter at random locations.

Method for Determining Correction Value of Developing Ac Bias

Conditions

Table 11 shows a correction table of the peak value (Vpp) of the AC bias.

TABLE 11

| | CORRECTION STEP | | | | | | |
|---|---|---|---|---|---|---|---|
| | −3 | −2 | −1 | 0 | +1 | +2 | +3 |
| CORRECTION AMOUNT | −300 | −200 | −100 | 0 | +100 | +200 | +300 |
| Vpp [V] | 580 | 680 | 780 | 880 | 980 | 1080 | 1180 |
| REMARKS | EFFECTIVE FOR CARRIER ADHESION | <<< | | NO CORRECTION | | >>> | EFFECTIVE FOR SLEEVE-CYCLIC DENSITY IRREGULARITY |

The correction amount when a correction width becomes the maximum positive value: M1=300 (V)

The correction amount when the correction width becomes the maximum negative value: M2=−300 (V)

Procedures

The expected probability of the irregularity 1 being conspicuous was calculated in the same manner as in Example B1, which is referred to as P1.

The expected probability of the irregularity 2 being conspicuous was calculated in the same manner as in Example B1 except that the size of the regions of interest obtained by diving an input image was set to a square having a side of 1 mm, which is referred to as P2.

According to the flow of FIG. 47, a target value of the correction amount of Vpp is determined, and a correction step is selected from the correction table of Table 11 so that the correction amount becomes the closest to the target value.

Table 12 shows five cases according to this procedure.

TABLE 12

|  | CASE 1 | CASE 2 | CASE 3 | CASE 4 | CASE 5 |
|---|---|---|---|---|---|
| P1 | 0.61 | 0.78 | 0.95 | 0.45 | 0.24 |
| P2 | 0.80 | 0.59 | 0.31 | 0.55 | 0.28 |
| TARGET VALUE OF CORRECTION AMOUNT (FORMULA) | M2 × (P2 − P1) | M1 × (P1 − P2) | M1 × P1 | M2 × P2 | NONE |
| TARGET VALUE OF CORRECTION AMOUNT (V) | −57 | 57 | 285 | −165 | 0 |
| CORRECTION STEP | −1 | +1 | +3 | −2 | 0 |
| CORRECTION AMOUNT (V) | −100 | +100 | +300 | −200 | 0 |
| CORRECTED Vpp (V) | 780 | 980 | 1180 | 680 | 880 |

P1: expected probability of irregularity 1 being conspicuous

P2: expected probability of irregularity 2 being conspicuous

M1: correction amount when positive correction width of Vpp reaches maximum

Comparative Example B1

As Comparative Example B1, an electrophotographic image forming apparatus without the system for predicting occurrence of defective images is disclosed.

Evaluation 1

The time required from input of job data to completion of inspection is compared between Example B1 to Example B3 and Comparative Example B1.

Conditions

The inspection is manually carried out.

Operation Condition of Image Forming Apparatus

Linear velocity: 100 ppm (velocity excluding the time required for adjusting and stabilizing an image)

The contents of print jobs are shown in Table 13.

TABLE 13

|  | JOB 1 | JOB 2 | JOB 3 |
|---|---|---|---|
| SIZE | A4 | A3 | POSTCARD |
| NUMBER OF PAGES | 5 | 5 | 2000 |
| NUMBER OF COPIES | 2000 | 2000 | 5 |

Results

Figure 49:
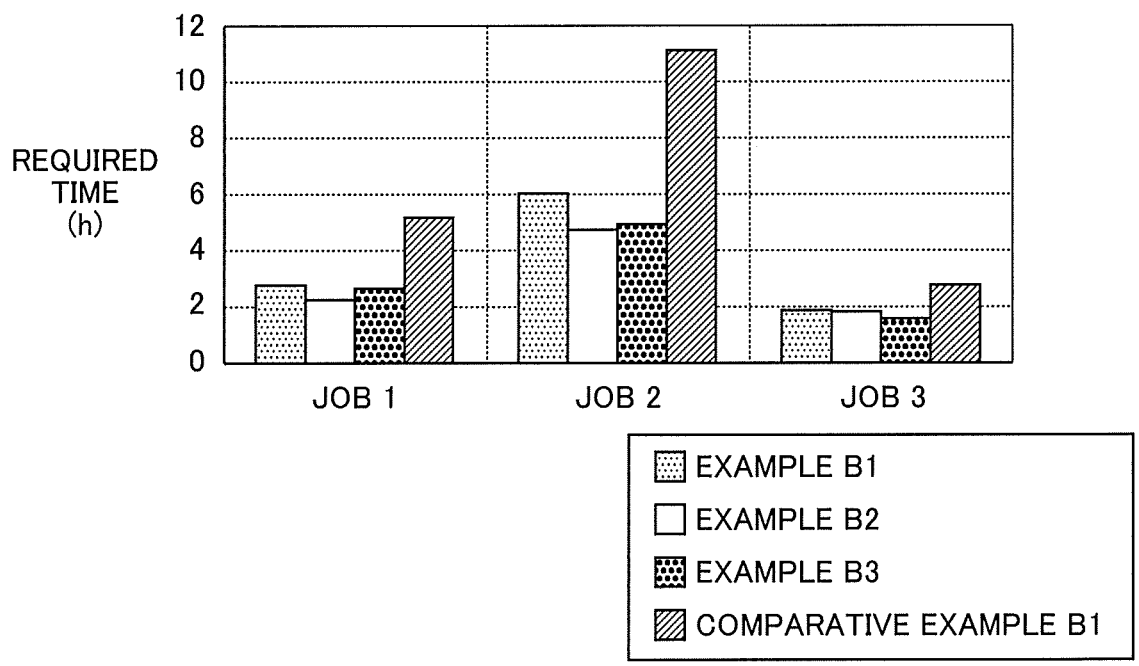
FIG. 49 is a graph illustrating the total time required for printing and inspection according to Example B1 to Example B3 of the present invention and Comparative Example B1.

The total time required for printing and inspection is shown in FIG. 49.

The time required was shorter in all of Example B1 to Example B3 than in Comparative Example B1.

In Example B1, the number of items inspected was larger than in Example B2 and Example B3. Further, the time required was shorter than in Comparative Example B1, although there was small difference from Comparative Example 1 in Job 1 in A4 size.

In Example B3, the system for predicting occurrence of defective images requires the longest calculation time, and there was small difference from Comparative Example B3 in Job 3 including many types of originals. However, the time required was still shorter than in the comparative example.

With regard to Job 2 including an original in larger A3 size, the time required in Example B1 to Example B3 was reduced to a large extent compared to Comparative Example B1.

Compared to the system of (A), the correction accuracy was improved to some extent. Due to the improved efficiency of the analysis of input image data, the total time required for the inspection was reduced to some extent in Example B2 and Example B3.

Example B4

In Example B4, the system for predicting occurrence of defective images is installed to an electrophotographic image forming apparatus, a sleeve-cyclic density irregularity that occurs due to deflection of a developing sleeve is selected as the target density irregularity, and the probability of the target density irregularity being conspicuous is calculated by means of the system for predicting occurrence of defective images.

Figure 50:
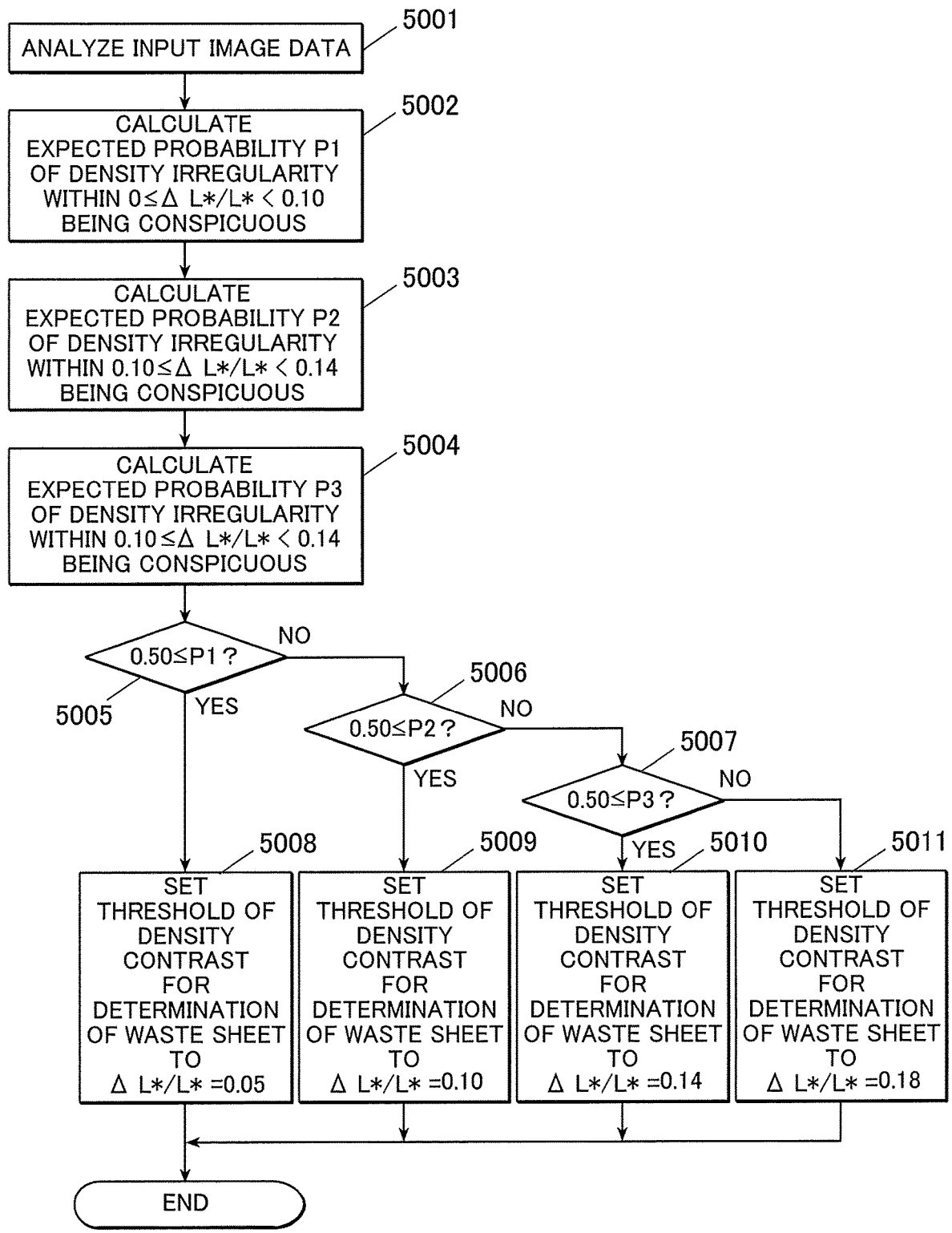
FIG. 50 is a flowchart of setting a threshold of the density difference for determining a density irregularity by means of a density-irregularity detection system according to Example B4 of the present invention.

The system for predicting occurrence of defective images has correlation indexes corresponding to various values of the lightness ratio $\Delta L^*/L^*$ of the density irregularity or the converted ratio thereof. The system uses the correlation indexes to calculate the probability of the density irregularity being conspicuous in an image to be formed by the image forming apparatus based on input image data. The system obtains the value of the lightness ratio $\Delta L^*/L^*$ or the converted ratio thereof when the probability is equal to or greater than a predetermined value and outputs it as the detection threshold for determination of the density irregularity (waste sheet: defective image) to the density-irregularity detection system that detects the density irregularity in an image formed by the image forming apparatus. FIG. 50 illustrates the flow of setting the threshold of density difference for determination of the density irregularity (waste sheet: defective image) by the density-irregularity detection system (5001 to 5011).

Method for Calculating Expected Probability of Density Irregularity being Conspicuous The conditions of the target density irregularity is shown in Table 14.

TABLE 14

| DEVELOPING SLEEVE-CYCLIC IRREGULARITY | |
|---|---|
| D | 1 mm |
| D | 44 mm |
| w | VIEW ANGLE = 4.2° |

The same method as in Example B2 is used to calculate the expected probability P of the density irregularity being conspicuous with respect to each input image. However, the following three correlation formulae are used in the calculation, and the probability P is calculated using all the following correlation formulae.

(Impression rank)=0.2262 ln(x)+5.6498(representing the correlation when 0≤ΔL*/L*<0.10)   Correlation formula (i):

(Impression rank)=0.2419 ln(x)+6.1986(representing the correlation when 0.10≤ΔL*/L*<0.14)   Correlation formula (ii):

(Impression rank)=0.2164 ln(x)+5.9743(representing the correlation when 0.14≤ΔL*/L*<0.18)   Correlation formula (iii):

Method for Determining Threshold of Density Difference for Determination of Density Irregularity The expected probabilities of the density irregularity being conspicuous determined using the correlation formulae (i), (ii) and (iii) are referred to respectively as P1, P2 and P3.

According to the flow of FIG. 50, the threshold of the density contrast for determination of a density irregularity (waste sheet: defective image) is determined.

Comparative Example B2

As Comparative Example B2, an electrophotographic image forming apparatus without the system for predicting occurrence of defective images is disclosed. The apparatus of Comparative Example 2 further includes a density-irregularity detection system.

The lightness contrast ΔL*/L* as the detection threshold for determination of the density irregularity (waste sheet: defective image) is 0.14.

Evaluation 2

In Example 4 and Comparative Example B2, the printed materials that have passed the automatic inspection by the density-irregularity detection system and the printed materials that have excluded by the density-irregularity detection system due to a density irregularity (waste sheet: defective image) were all subjected to visual observation to evaluate whether or not the density irregularity is conspicuous. The detection accuracy of the density-irregularity detection systems of Example B4 and Comparative Example B2 was thus evaluated.

Conditions

The inspection is carried out by the density-irregularity detection system.

The contents of printing jobs are shown in Table 15.

TABLE 15

| SIZE | A3 |
|---|---|
| NUMBER OF ORIGINALS | 5000 |
| NUMBER OF COPIES PER ORIGINAL | 1 |

In regard to determination whether the irregularity was conspicuous, when the determination differs between the automatic inspection by the density-irregularity detection system and the visual evaluation by a human being, the determination obtained by the automatic inspection was concluded as an error.

Procedures

With respect to the printed materials and the failed printed materials in the automatic inspection carried out by the density-irregularity detection system, the rate of incorrect determination of inspecting the density irregularity was calculated and estimated using the following Formula.

TABLE 16

| PRINTED MATERIALS THAT HAVE FAILED AUTOMATIC INSPECTION | TOTAL NUMBER OF SHEETS: A NUMBER OF SHEETS IN WHICH IRREGULARITY IS INCONSPICUOUS IN VISUAL OBSERVATION: B RATE OF INCORRECT DETERMINATION: B/A × 100 |
|---|---|
| PRINTED MATERIALS THAT HAVE PASSED AUTOMATIC INSPECTION | TOTAL NUMBER OF SHEETS: A' NUMBER OF SHEETS IN WHICH IRREGULARITY IS CONSPICUOUS IN VISUAL OBSERVATION: B' RATE OF INCORRECT DETERMINATION: B'/A' × 100 |

The results are shown in Table 17. The rate of incorrect determination was reduced in Example B4, which was lower than in Comparative Example B2.

TABLE 17

| | | EXAMPLE B4 | COMPARATIVE EXAMPLE B2 |
|---|---|---|---|
| PRINTED MATERIALS THAT HAVE FAILED AUTOMATIC INSPECTION | TOTAL NUMBER OF SHEETS (A) | 980 | 655 |
| | NUMBER OF SHEETS IN WHICH IRREGULARITY IS INCONSPICUOUS (B) | 12 | 118 |
| | RATE OF INCORRECT DETERMINATION (B/A)(%) | 1 | 18 |
| PRINTED MATERIALS THAT HAVE PASSED AUTOMATIC INSPECTION | TOTAL NUMBER OF SHEETS (A') | 4020 | 4345 |
| | NUMBER OF SHEETS IN WHICH IRREGULARITY IS CONSPICUOUS (B') | 0 | 313 |
| | RATE OF INCORRECT DETERMINATION (B'/A')(%) | 0 | 7 |

Although embodiments of the present invention have been described and illustrated in detail, the disclosed embodiments are made for purposes of illustration and example only and not limitation. The scope of the present invention should be interpreted by terms of the appended claims.

The entire disclosure of Japanese patent application No. 2017–038930, filed on Mar. 2, 2017, is incorporated herein by reference in its entirety.

What is claimed is:

1. A system for predicting occurrence of a defective image, comprising: an observation distance obtainer which obtains an observation distance of an image to be formed by an image forming apparatus,
   wherein the system (i) divides image data input to the image forming apparatus as an original of the image into regions of interest having a size determined based on the observation distance, (ii) analyzes a spatial frequency of a gradient distribution of the image with respect to each of the regions of interest, and (iii) calculates a probability of a target density irregularity being conspicuous in the image to be formed by the image forming apparatus based on the image data by using a correlation index between a result of the analysis and an evaluation value of the density irregularity.

2. The system for predicting occurrence of a defective image according to claim 1, wherein each of the regions of interest is a square having a side of a value λ which is a product of a twice of the observation distance and tan(1°).

3. The system for predicting occurrence of a defective image according to claim 2, wherein the system calculates a power spectrum of the spatial frequency of the gradient distribution with respect to each of the regions of interest of the image data by means of Fourier transform, and determines a value PF which is a value of the power integrated for a predetermined low-frequency band Δf.

4. The system for predicting occurrence of a defective image according to claim 3, wherein a length of the low-frequency band Δf is defined as an integral multiple of 1/λ.

5. The system for predicting occurrence of a defective image according to claim 3,
wherein the Fourier transform is two-dimensional Fourier transform, and
wherein the system obtains the power spectrum of frequency components in a transverse direction of the target density irregularity, and determines the value PF by integrating the obtained respective power for the low-frequency band Δf.

6. The system for predicting occurrence of a defective image according to claim 3,
wherein a value PF of a region of interest is defined as an amount of characteristic of the region of interest, and when the amount of characteristic is greater than a predetermined reference value, the system determines that the density irregularity is inconspicuous in the region of interest, and
wherein the system integrates determinations on the respective regions of interests to calculate the probability of the density irregularity being conspicuous in the image to be formed by the image forming apparatus based on the image data.

7. The system for predicting occurrence of a defective image according to claim 3,
wherein a product of a width w in the transverse direction of the target density irregularity and a value PF of a region of interest is defined as an amount of characteristic of the region of interest, and when the amount of characteristic is greater than a predetermined reference value, the system determines that the density irregularity is inconspicuous in the region of interest, and
wherein the system integrates determinations on the respective regions of interest to calculate the probability of the density irregularity being conspicuous in the image to be formed by the image forming apparatus based on the image data.

8. The system for predicting occurrence of a defective image according to claim 3,
wherein when a width w in the transverse direction of the target density irregularity is equal to or greater than the value λ, an amount of characteristic of a regions of interest is defined as a product of the width w and the value PF of the region of interest, and when the amount of characteristic is equal to or greater than a predetermined reference value, the system (i) determines that the density irregularity is inconspicuous in the region of interest and (ii) integrates determinations on the respective regions of interest to calculate the probability of the density irregularity being conspicuous in the image to be formed by the image forming apparatus based on the image data, and
wherein when the width w is less than the value λ, a product of a half of the width w, i.e. w/2, and a value PF of a region of interest is defined as an amount of characteristic of the regions of interest, and when the amount of characteristic is equal to or greater than a predetermined reference value, the system (i) determines that the density irregularity is inconspicuous in the region of interest and (ii) integrates determinations on the respective regions of interest to calculate the probability of the density irregularity being conspicuous in the image to be formed by the image forming apparatus based on the image data.

9. The system for predicting occurrence of a defective image according to claim 3,
wherein an amount of characteristic of a region of interest is defined as {(d/D)/(PF·w)}, where D is a full width in the transverse direction of the target density irregularity in which lightness or luminance changes, a width w is a distance between a pair of edges mutually opposed in the transverse direction of the density irregularity within the full width D, and d is a width of a peak within the width w,
wherein the system determines that the density irregularity is inconspicuous in the region of interest when the amount of characteristic is less than a predetermined reference value, and
wherein the system integrates determinations on the respective regions of interest to calculate the probability of the density irregularity being conspicuous in the image to be formed by the image forming apparatus based on the image data.

10. The system for predicting occurrence of a defective image according to claim 3,
where D is a full width in the transverse direction of the target density irregularity in which lightness or luminance changes, a width w is a distance between a pair of edges mutually opposed in the transverse direction of the density irregularity within the full width D, and d is a width of a peak within the width w,
wherein when the width w is equal to or greater than the value λ, an amount of characteristic of a region of interest is defined as {(d/D)/(PF·w)}, and when the amount of characteristic is less than a predetermined reference value, the system (i) determines that the density irregularity is inconspicuous in the region of interest and (ii) integrates determinations on the respective regions of interest to calculate the probability of the density irregularity being conspicuous in the image to be formed by the image forming apparatus based on the image data, and
wherein when the width w is less than the value λ, an amount of characteristic of a region of interest is defined as {(d/D)/(PF·(w/2))}, and when the amount of characteristic is less than a predetermined reference value, the system (i) determines that the density irregularity is inconspicuous in the region of interest and (ii) integrates determinations on the respective regions of interest to calculate the probability of the density irregularity being conspicuous in the image to be formed by the image forming apparatus based on the image data.

11. The system for predicting occurrence of a defective image according to claim 6,
wherein the correlation index comprises two or more correlation indexes that are stored corresponding to various values of lightness ratio ΔL*/L* of the density irregularity or a converted ratio thereof, and
wherein the system selects a correlation index to be used based on an input value of the lightness ratio ΔL*/L* or the converted ratio thereof.

12. The system for predicting occurrence of a defective image according to claim 6, wherein the probability P of the density irregularity being conspicuous in the image to be formed by the image forming apparatus based on the image data is calculated as n/N, where N is the total number of the regions of interest, and n is the number of regions of interest in which the density irregularity is determined as conspicuous.

13. The system for predicting occurrence of a defective image according to claim 6,
wherein when $X-x_i \leq 0$, an expected probability $p_i$ of the target irregularity being conspicuous is set to $p_i=0$, and when $X-x_i>0$, the expected probability $p_i$ of the target irregularity being conspicuous is set to $p_i=(X-x_i)/\lambda$,
where X is the reference value, and $x_i$ is the amount of characteristic of an $i^{th}$ region of interest, and
wherein the probability of the density irregularity being conspicuous in the image to be formed by the image forming apparatus based on the image data is calculated as an average of $p_i$, where $p_i$ is a set of size N, and N is the total number of the regions of interest.

14. The system for predicting occurrence of a defective image according to claim 9,
wherein when $X-x_i \geq 0$, an expected probability $p_i$ of the target irregularity being conspicuous is set to $p_i=0$, and when $X-x_i<0$, the expected probability $p_i$ of the target irregularity being conspicuous is set to $p_i=|X-x_i|/X$,
where X is the reference value, and $x_i$ is the amount of characteristic of an $i^{th}$ region of interest, and
wherein the probability of the density irregularity being conspicuous in the image to be formed by the image forming apparatus based on the image data is calculated as an average of $p_i$, where $p_i$ is a set of size N, and N is the total number of the regions of interest.

15. The system for predicting occurrence of a defective image according to claim 1, wherein when the system determines that the probability of the density irregularity being conspicuous is equal to or greater than a predetermined value, the system displays a message recommending an inspection to a user.

16. The system for predicting occurrence of a defective image according to claim 1, wherein when the system determines that the probability of the density irregularity being conspicuous is equal to or greater than a predetermined value, the system instructs an image forming unit of the image forming apparatus to correct a setting of image forming processing in order to reduce the density irregularity.

17. The system for predicting occurrence of a defective image according to claim 16, a value closest to M×P is selected from among settable values as a correction amount of the setting of the image forming processing to be instructed to the image forming unit, where P is the probability of the density irregularity being conspicuous, and M is a maximum correction amount.

18. The system for predicting occurrence of a defective image according to claim 7,
wherein the target density irregularity comprises two or more types of density irregularities that are different in the width w, and
wherein the system calculates the probability of the density irregularity being conspicuous with respect to each width w of the density irregularities and gives preference to a density irregularity having high probability of being conspicuous to instruct correction of the setting of the image forming processing.

19. The system for predicting occurrence of a defective image according to claim 9,
wherein the target density irregularity comprises two or more types of density irregularities that are different in at least one of the full width D and the width d, and
wherein the system (i) calculates the probability of the density irregularity with respect to each combination of the full width D and the width d of the density irregularities, and (ii) gives preference to a density irregularity having high probability of being conspicuous to instruct correction of the setting of the image forming processing.

20. The system for predicting occurrence of a defective image according to claim 9,
wherein the target density irregularity comprises two or more types of density irregularities that are different in at least one of the full width D, the width w and the width d, and
wherein the system (i) calculates the probability of the density irregularity being conspicuous with respect to each combination of the full width D, the width w and the width d of the density irregularities, and (ii) gives preference to a density irregularity having high probability of being conspicuous to instruct correction of the setting of the image forming processing.

21. The system for predicting occurrence of a defective image according to claim 1,
wherein the correlation index comprises two or more correlation indexes that are stored corresponding to various values of lightness ratio $\Delta L^*/L^*$ of the density irregularity or a converted ratio thereof,
wherein the system uses the correlation indexes to calculate respective probabilities of the density irregularity being conspicuous in the image to be formed by the image forming apparatus based on the image data, and
wherein the system (i) retrieves a value of the lightness ratio $\Delta L^*/L^*$ or the converted ratio thereof that is used when a corresponding probability is equal to or greater than a predetermined value and (ii) outputs the retrieved value as a detection threshold for determination of the density irregularity to a density irregularity detection system which detects the density irregularity in the image actually formed by the image forming apparatus.

22. The system for predicting occurrence of a defective image according to claim 2, wherein when a width in a transverse direction and a width in a longitudinal direction of the target density irregularity are both less than the value $\lambda$, the system (i) analyzes the spatial frequency of the gradient distribution of the image in accordance with a size of a density irregularity specific to the image forming apparatus with respect to the input image data and (ii) calculates the probability of the density irregularity of the size being conspicuous in the image to be formed by the image forming apparatus based on the image data by using the correlation index between the result of the analysis and the evaluation value of the density irregularity.

23. The system for predicting occurrence of a defective image according to claim 22,
wherein, in analyzing the spatial frequency of the gradient distribution of the image in accordance with the size of the density irregularity specific to the image forming apparatus,
the system (1) replaces the density irregularity with circular gradient distribution according to two-dimensional Gaussian distribution and having a diameter equal to one cycle of the density irregularity, (2) carries out Fourier transform on image data, the image data being drawn with the Gaussian distribution of (1), so as to obtain a power spectrum of the spatial frequency of the circular gradient distribution, (3) extracts a frequency band ranging from where power is at a peak to where the power is at a predetermined value within the power spectrum of (2) except for a DC component or extracts the frequency at a peak, and (4) divides the image data to make regions of interest, each having a size fitting the Gaussian distribution of (1), calculates the power spectrum of the spatial frequency of gradient distribution by carrying out the Fourier transform on the whole divided regions of interest, and obtains a value F obtained by integrating the power by the frequency band extracted in (3) or a value F of the power at the frequency extracted in (3).

24. The system for predicting occurrence of a defective image according to claim 23,
wherein the system (5) determines that the density irregularity is inconspicuous when the value F of each region of interest in (4) is larger than a predetermined reference value, and (6) calculates the probability of the conspicuous density irregularity in the image formed by the image forming apparatus based on the image data by combining the determination of (5) in regard to each region of interest.

25. A non-transitory computer readable medium storing a program for predicting occurrence of a defective image, the program causing a computer to perform:
obtaining an observation distance of an image to be formed by an image forming apparatus;
dividing image data input to the image forming apparatus as an original of the image into regions of interest having a size determined based on the observation distance;
analyzing a spatial frequency of a gradient distribution of the image with respect to each of the regions of interest; and
calculating a probability of a target density irregularity being conspicuous in the image to be formed by the image forming apparatus based on the image data by using a correlation index between a result of the analysis and an evaluation value of the density irregularity.

26. The non-transitory computer readable medium according to claim 25, wherein each of the regions of interest is a square having a side of a value $\lambda$ which is a product of a twice of the observation distance and $\tan(1°)$.

27. The non-transitory computer readable medium according to claim 26, the program causing the computer to perform:
calculating a power spectrum of the spatial frequency of the gradient distribution with respect to each of the regions of interest of the image data by means of Fourier transform, and determining a value PF which is a value of the power integrated for a predetermined low-frequency band $\Delta f$.

28. The non-transitory computer readable medium according to claim 27, wherein a length of the low-frequency band $\Delta f$ is defined as an integral multiple of $1/\lambda$.

29. The non-transitory computer readable medium according to claim 27,
wherein the Fourier transform is two-dimensional Fourier transform, and
wherein the program causes the computer to perform obtaining the power spectrum of frequency components in a transverse direction of the target density irregularity, and determining the value PF by integrating the obtained respective power for the low-frequency band $\Delta f$.

30. The non-transitory computer readable medium according to claim 27,
wherein a value PF of a region of interest is defined as an amount of characteristic of the region of interest, and when the amount of characteristic is greater than a predetermined reference value, the program causes the computer to perform determining that the density irregularity is inconspicuous in the region of interest, and
wherein the program causes the computer to perform integrating determinations on the respective regions of interests to calculate the probability of the density irregularity being conspicuous in the image to be formed by the image forming apparatus based on the image data.

31. The non-transitory computer readable medium according to claim 27,
wherein a product of a width w in the transverse direction of the target density irregularity and a value PF of a region of interest is defined as an amount of characteristic of the region of interest, and when the amount of characteristic is greater than a predetermined reference value, the program causes the computer to perform determining that the density irregularity is inconspicuous in the region of interest, and
wherein the program causes the computer to perform integrating determinations on the respective regions of interest to calculate the probability of the density irregularity being conspicuous in the image to be formed by the image forming apparatus based on the image data.

32. The non-transitory computer readable medium according to claim 27,
wherein when a width w in the transverse direction of the target density irregularity is equal to or greater than the value $\lambda$, an amount of characteristic of a regions of interest is defined as a product of the width w and the value PF of the region of interest, and when the amount of characteristic is equal to or greater than a predetermined reference value, the program causes the computer to perform (i) determining that the density irregularity is inconspicuous in the region of interest and (ii) integrating determinations on the respective regions of interest to calculate the probability of the density irregularity being conspicuous in the image to be formed by the image forming apparatus based on the image data, and
wherein when the width w is less than the value $\lambda$, a product of a half of the width w, i.e. w/2, and a value PF of a region of interest is defined as an amount of characteristic of the regions of interest, and when the amount of characteristic is equal to or greater than a predetermined reference value, the program causes the computer to perform (i) determining that the density irregularity is inconspicuous in the region of interest and (ii) integrating determinations on the respective regions of interest to calculate the probability of the density irregularity being conspicuous in the image to be formed by the image forming apparatus based on the image data.

33. The non-transitory computer readable medium according to claim 27,
wherein an amount of characteristic of a region of interest is defined as $\{(d/D)/(PF \cdot w)\}$, where D is a full width in the transverse direction of the target density irregularity in which lightness or luminance changes, a width w is a distance between a pair of edges mutually opposed in the transverse direction of the density irregularity within the full width D, and d is a width of a peak within the width w, wherein the program causes the computer to perform determining that the density irregularity is inconspicuous in the region of interest when the amount of characteristic is less than a predetermined reference value, and wherein the program causes the computer to perform integrating determinations on the respective regions of interest to calculate the probability of the density irregularity being conspicuous in the image to be formed by the image forming apparatus based on the image data.

34. The non-transitory computer readable medium according to claim 27, where D is a full width in the transverse direction of the target density irregularity in which lightness or luminance changes, a width w is a distance between a pair of edges mutually opposed in the transverse direction of the density irregularity within the full width D, and d is a width of a peak within the width w, wherein when the width w is equal to or greater than the value $\lambda$, an amount of characteristic of a region of interest is defined as $\{(d/D)/(PF \cdot w)\}$, and when the amount of characteristic is less than a predetermined reference value, the program causes the computer to perform (i) determining that the density irregularity is inconspicuous in the region of interest and (ii) integrating determinations on the respective regions of interest to calculate the probability of the density irregularity being conspicuous in the image to be formed by the image forming apparatus based on the image data, and wherein when the width w is less than the value $\lambda$, an amount of characteristic of a region of interest is defined as $\{(d/D)/(PF \cdot (w/2))\}$, and when the amount of characteristic is less than a predetermined reference value, the program causes the computer to perform (i) determining that the density irregularity is inconspicuous in the region of interest and (ii) integrating determinations on the respective regions of interest to calculate the probability of the density irregularity being conspicuous in the image to be formed by the image forming apparatus based on the image data.

35. The non-transitory computer readable medium according to claim 30, wherein the correlation index comprises two or more correlation indexes that are stored corresponding to various values of lightness ratio $\Delta L^*/L^*$ of the density irregularity or a converted ratio thereof, and wherein the program causes the computer to perform selecting a correlation index to be used based on an input value of the lightness ratio $\Delta L^*/L^*$ or the converted ratio thereof.

36. The non-transitory computer readable medium according to claim 30, wherein the probability P of the density irregularity being conspicuous in the image to be formed by the image forming apparatus based on the image data is calculated as n/N, where N is the total number of the regions of interest, and n is the number of regions of interest in which the density irregularity is determined as conspicuous.

37. The non-transitory computer readable medium according to claim 30, wherein when $X-x_i \leq 0$, an expected probability pi of the target irregularity being conspicuous is set to pi=0, and when $X-x_i>0$, the expected probability pi of the target irregularity being conspicuous is set to $pi=(X-x_i)/\lambda$, where X is the reference value, and xi is the amount of characteristic of an $i^{th}$ region of interest, and wherein the probability of the density irregularity being conspicuous in the image to be formed by the image forming apparatus based on the image data is calculated as an average of pi, where pi is a set of size N, and N is the total number of the regions of interest.

38. The non-transitory computer readable medium according to claim 33, wherein when $X-x_i \geq 0$, an expected probability pi of the target irregularity being conspicuous is set to pi=0, and when $X-x_i<0$, the expected probability pi of the target irregularity being conspicuous is set to $pi=|X-x_i|/\lambda$, where X is the reference value, and xi is the amount of characteristic of an $i^h$ region of interest, and wherein the probability of the density irregularity being conspicuous in the image to be formed by the image forming apparatus based on the image data is calculated as an average of pi, where pi is a set of size N, and N is the total number of the regions of interest.

39. The non-transitory computer readable medium according to claim 25, wherein when the program causes the computer to perform determining that the probability of the density irregularity being conspicuous is equal to or greater than a predetermined value, the program causes the computer to perform displaying a message recommending an inspection to a user.

40. The non-transitory computer readable medium according to claim 25, wherein when the program causes the computer to perform determining that the probability of the density irregularity being conspicuous is equal to or greater than a predetermined value, the program causes the computer to perform instructing an image forming unit of the image forming apparatus to correct a setting of image forming processing in order to reduce the density irregularity.

41. The non-transitory computer readable medium according to claim 40, a value closest to M×P is selected from among settable values as a correction amount of the setting of the image forming processing to be instructed to the image forming unit, where P is the probability of the density irregularity being conspicuous, and M is a maximum correction amount.

42. The non-transitory computer readable medium according to claim 31, wherein the target density irregularity comprises two or more types of density irregularities that are different in the width w, and wherein the program causes the computer to perform calculating the probability of the density irregularity being conspicuous with respect to each width w of the density irregularities and giving preference to a density irregularity having high probability of being conspicuous to instruct correction of the setting of the image forming processing.

43. The non-transitory computer readable medium according to claim 33, wherein the target density irregularity comprises two or more types of density irregularities that are different in at least one of the full width D and the width d, and wherein the program causes the computer to perform (i) calculating the probability of the density irregularity with respect to each combination of the full width D and the width d of the density irregularities and (ii) giving preference to a density irregularity having high probability of being conspicuous to instruct correction of the setting of the image forming processing.

44. The non-transitory computer readable medium according to claim 33,
wherein the target density irregularity comprises two or more types of density irregularities that are different in at least one of the full width D, the width w and the width d, and
wherein the program causes the computer to perform (i) calculating the probability of the density irregularity being conspicuous with respect to each combination of the full width D, the width w and the width d of the density irregularities and (ii) giving preference to a density irregularity having high probability of being conspicuous to instruct correction of the setting of the image forming processing.

45. The non-transitory computer readable medium according to claim 25,
wherein the correlation index comprises two or more correlation indexes that are stored corresponding to various values of lightness ratio $\Delta L^*/L^*$ of the density irregularity or a converted ratio thereof,
wherein the program causes the computer to perform using the correlation indexes to calculate respective probabilities of the density irregularity being conspicuous in the image to be formed by the image forming apparatus based on the image data, and
wherein the program causes the computer to perform (i) retrieving a value of the lightness ratio $\Delta L^*/L^*$ or the converted ratio thereof that is used when a corresponding probability is equal to or greater than a predetermined value and (ii) outputting the retrieved value as a detection threshold for determination of the density irregularity to a density irregularity detection program which detects the density irregularity in the image actually formed by the image forming apparatus.

46. The non-transitory computer readable medium according to claim 26, wherein when a width in a transverse direction and a width in a longitudinal direction of the target density irregularity are both less than the value $\lambda$, the program causes the computer to perform (i) analyzing the spatial frequency of the gradient distribution of the image in accordance with a size of a density irregularity specific to the image forming apparatus with respect to the input image data and (ii) calculating the probability of the density irregularity of the size being conspicuous in the image to be formed by the image forming apparatus based on the image data by using the correlation index between the result of the analysis and the evaluation value of the density irregularity.

47. The non-transitory computer readable medium according to claim 46,
wherein, in analyzing the spatial frequency of the gradient distribution of the image in accordance with the size of the density irregularity specific to the image forming apparatus,
the program causes the computer to perform (1) replacing the density irregularity with circular gradient distribution according to two-dimensional Gaussian distribution and having a diameter equal to one cycle of the density irregularity,
(2) carrying out Fourier transform on image data, the image data being drawn with the Gaussian distribution of (1), so as to obtain a power spectrum of the spatial frequency of the circular gradient distribution,
(3) extracting a frequency band ranging from where power is at a peak to where the power is at a predetermined value within the power spectrum of (2) except for a DC component or extracts the frequency at a peak, and
(4) dividing the image data to make regions of interest, each having a size fitting the Gaussian distribution of (1), calculating the power spectrum of the spatial frequency of gradient distribution by carrying out the Fourier transform on the whole divided regions of interest, and obtaining a value F obtained by integrating the power by the frequency band extracted in (3) or a value F of the power at the frequency extracted in (3).

48. The non-transitory computer readable medium according to claim 47,
wherein the program causes the computer to perform (5) determining that the density irregularity is inconspicuous when the value F of each region of interest in (4) is larger than a predetermined reference value, and
(6) calculating the probability of the conspicuous density irregularity in the image formed by the image forming apparatus based on the image data by combining the determination of (5) in regard to each region of interest.

* * * * *